United States Patent
Machida et al.

(10) Patent No.: US 11,656,459 B2
(45) Date of Patent: May 23, 2023

(54) DISPLAY APPARATUS WITH A GLASSES TYPE FRAME AND AN IMAGE DISPLAY DEVICE

(71) Applicant: SONY CORPORATION, Tokyo (JP)

(72) Inventors: Akio Machida, Kanagawa (JP);
Kenichi Takahashi, Kanagawa (JP);
Hidehiko Takanashi, Kanagawa (JP);
Kenji Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 109 days.

(21) Appl. No.: 14/867,284

(22) Filed: Sep. 28, 2015

(65) Prior Publication Data

US 2016/0018658 A1   Jan. 21, 2016

Related U.S. Application Data

(63) Continuation of application No. 13/467,779, filed on May 9, 2012, now abandoned.

(30) Foreign Application Priority Data

Jun. 1, 2011   (JP) .............................. JP2011-123511

(51) Int. Cl.
*G02B 27/01* (2006.01)
*G09G 3/34* (2006.01)
(Continued)

(52) U.S. Cl.
CPC ......... *G02B 27/0172* (2013.01); *G02B 6/005* (2013.01); *G02B 27/0176* (2013.01);
(Continued)

(58) Field of Classification Search
CPC ............ G02B 27/0172; G02B 27/0176; G02B 6/005; G02B 2027/0118;
(Continued)

(56) References Cited

U.S. PATENT DOCUMENTS

| 4,690,508 A | 9/1987 | Jacob |
| 6,507,359 B1 | 1/2003 | Muramoto et al. |

(Continued)

FOREIGN PATENT DOCUMENTS

| CN | 1957269 | 5/2007 |
| CN | 101167010 | 4/2008 |

(Continued)

OTHER PUBLICATIONS

Official Action (with English translation) for Chinese Patent Application No. 201210165810.3 dated Aug. 22, 2016, 29 pages.
(Continued)

*Primary Examiner* — Stephen G Sherman
(74) *Attorney, Agent, or Firm* — Sheridan Ross P.C.

(57) ABSTRACT

A display apparatus includes: (i) a glasses-type frame that is mounted on the head of an observer; and (ii) an image display device that is attached to the frame, wherein the image display device includes (A) an image forming device, and (B) an optical device on which light emitted from the image forming device is incident, in which the light is guided, and from which the light is emitted, a light control device that adjusts an amount of external light incident from the outside is provided in a region of the optical device from which light is emitted, and the light control device includes two opposite transparent substrates, electrodes that are provided on the substrates, and an electrophoretic dispersion liquid that is sealed between the two substrates.

20 Claims, 43 Drawing Sheets

(51) Int. Cl.
*G02F 1/167* (2019.01)
*F21V 8/00* (2006.01)
*G02F 1/1335* (2006.01)
*G06T 19/00* (2011.01)

(52) U.S. Cl.
CPC ........ *G02F 1/133524* (2013.01); *G02F 1/167* (2013.01); *G09G 3/344* (2013.01); *G09G 3/3406* (2013.01); *G02B 2027/0118* (2013.01); *G02B 2027/0178* (2013.01); *G02F 2201/44* (2013.01); *G06T 19/006* (2013.01); *G09G 2360/144* (2013.01)

(58) Field of Classification Search
CPC ....... G02B 2027/0178; G02F 1/133524; G02F 1/167; G02F 2201/44; G09G 3/3406; G09G 3/344; G09G 2360/144; G06T 19/006
See application file for complete search history.

(56) References Cited

U.S. PATENT DOCUMENTS

| | | | |
|---|---|---|---|
| 2002/0075552 A1* | 6/2002 | Poll | G02F 1/161 359/275 |
| 2005/0057701 A1 | 3/2005 | Weiss | |
| 2005/0180687 A1* | 8/2005 | Amitai | G02B 6/0018 385/31 |
| 2006/0033992 A1 | 2/2006 | Solomon | |
| 2006/0227408 A1* | 10/2006 | Miles | G02B 5/06 359/296 |
| 2007/0091445 A1* | 4/2007 | Amitai | G02B 6/0056 359/630 |
| 2007/0159673 A1* | 7/2007 | Freeman | G02B 27/145 359/19 |
| 2008/0024430 A1* | 1/2008 | Roh | G02F 1/167 345/107 |
| 2008/0218434 A1* | 9/2008 | Kelly | G02B 27/01 345/8 |
| 2009/0245730 A1* | 10/2009 | Kleemann | G02B 5/1861 385/37 |
| 2010/0149073 A1 | 6/2010 | Chaum et al. | |
| 2010/0177114 A1 | 7/2010 | Nakashima | |
| 2010/0245211 A1* | 9/2010 | Iba | G02B 17/086 345/8 |
| 2011/0007277 A1 | 1/2011 | Solomon | |
| 2011/0102483 A1 | 5/2011 | Kanamori | |
| 2011/0164294 A1 | 7/2011 | Shimizu | |
| 2011/0211345 A1* | 9/2011 | De Boer | G02F 1/133603 362/235 |
| 2011/0310491 A1* | 12/2011 | Takagi | G02B 27/0172 359/633 |
| 2012/0008188 A1 | 1/2012 | Telfer et al. | |
| 2012/0050141 A1* | 3/2012 | Border | G02B 27/017 345/8 |
| 2012/0069599 A1* | 3/2012 | Cornelissen | G02B 6/0051 362/613 |
| 2012/0306940 A1 | 12/2012 | Machida et al. | |

FOREIGN PATENT DOCUMENTS

| | | | |
|---|---|---|---|
| EP | 1808722 | 7/2007 | |
| JP | H10-301055 | 11/1998 | |
| JP | 2000206459 A * | 7/2000 | ............ H04N 13/31 |
| JP | 2004-061833 | 2/2004 | |
| JP | 2004-061840 | 2/2004 | |
| JP | 2004-101197 | 4/2004 | |
| JP | 2004-299506 | 10/2004 | |
| JP | 2006-154437 | 6/2006 | |
| JP | 2006-162767 | 6/2006 | |
| JP | 2006-243154 | 9/2006 | |
| JP | 2007-094175 | 4/2007 | |
| JP | 2008-539457 | 11/2008 | |
| JP | 2009-516862 | 4/2009 | |
| JP | 2009-145513 | 7/2009 | |
| JP | 2010-521347 | 6/2010 | |
| JP | 2010-145674 | 7/2010 | |
| JP | 2010-256500 | 11/2010 | |
| WO | WO 98/15868 | 4/1998 | |
| WO | WO 2005/024969 | 3/2005 | |

OTHER PUBLICATIONS

Official Action (with English translation) for Chinese Patent Application No. 201210165810.3 dated Mar. 25, 2016, 23 pages.
Extended European Search Report for European Patent Application No. 16151698.4 dated May 13, 2016, 7 pages.
Official Action (with English translation) for Chinese Patent Application No. 201210165810.3 dated Jul. 21, 2015, 36 pages.
Article 94(3) Communication for European Patent Application No. 16151698.4, dated Feb. 15, 2019, 6 pages.
Extended European Search Report for European Patent Application No. 12164576.6 dated Jun. 21, 2013, 8 pages.
Official Action for European Patent Application No. 12164576.6 dated Oct. 17, 2013, 5 pages.
Official Action for U.S. Appl. No. 13/467,779 dated Jan. 3, 2014, 20 pages.
Official Action for U.S. Appl. No. 13/467,779 dated Jun. 18, 2014, 24 pages.
Official Action for U.S. Appl. No. 13/467,779 dated Jan. 9, 2015, 28 pages.
Official Action for U.S. Appl. No. 13/467,779 dated May 28, 2015, 32 pages.

* cited by examiner

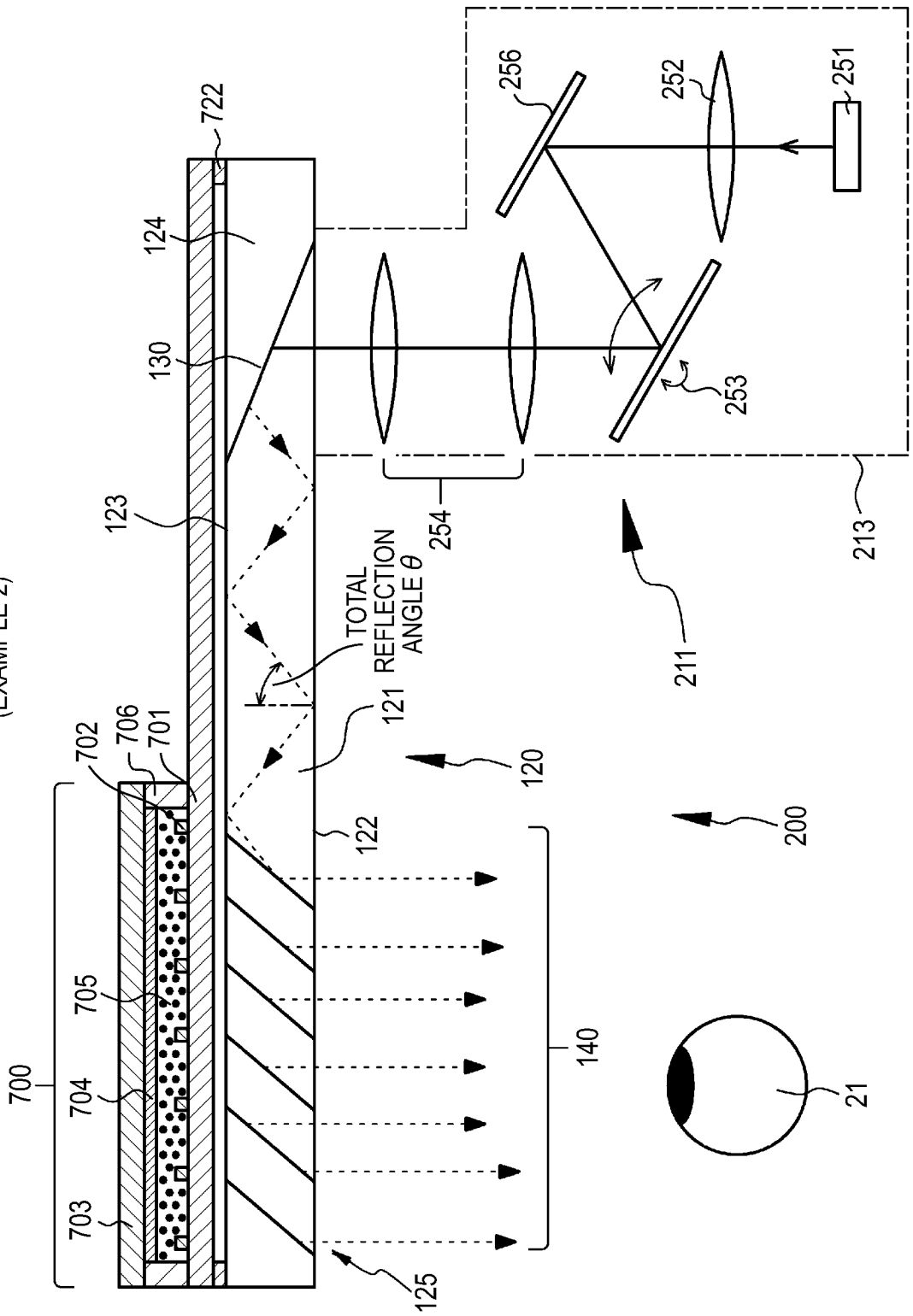

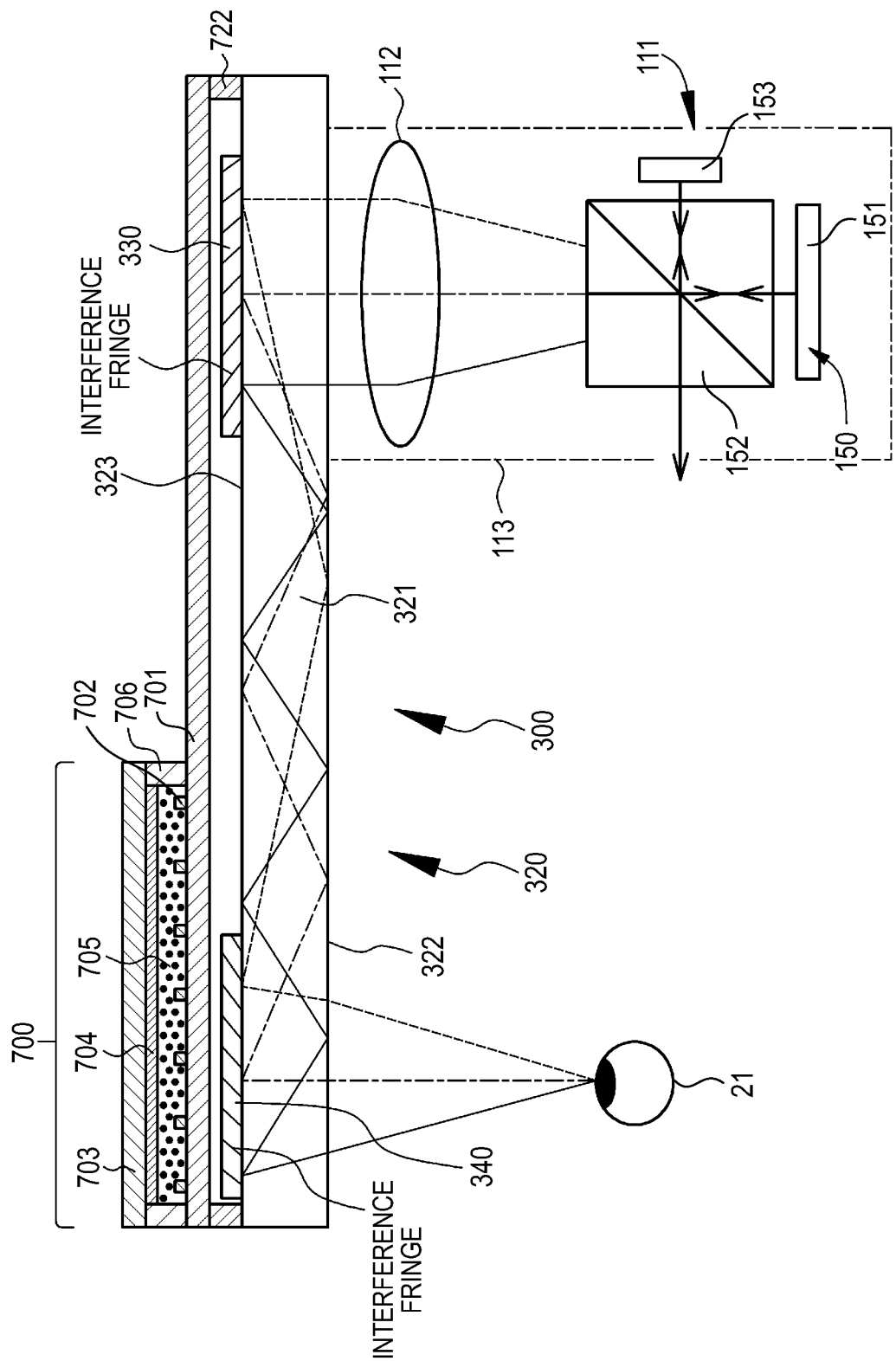

(EXAMPLE 5)

(EXAMPLE 7)

(EXAMPLE 8)

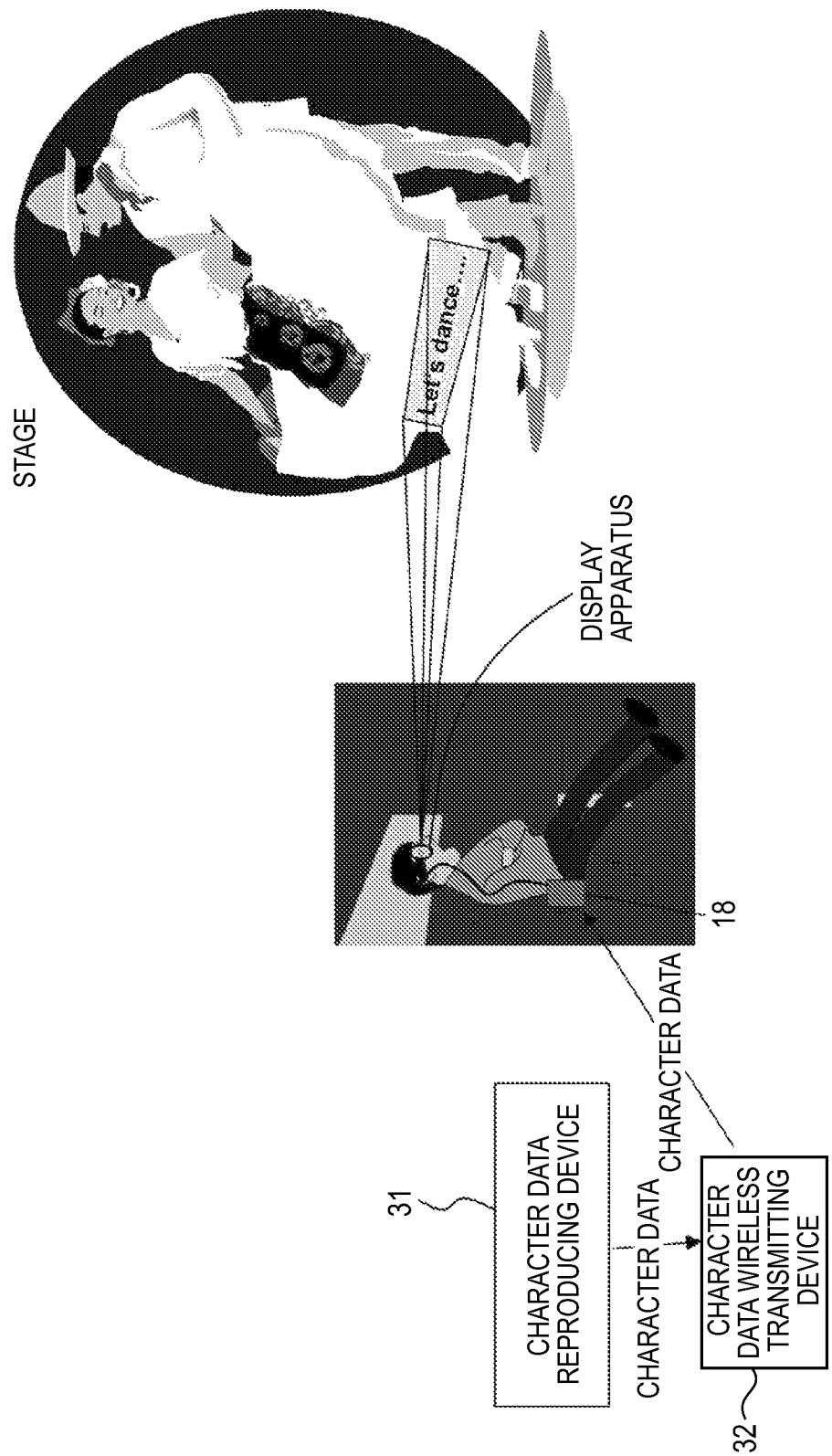

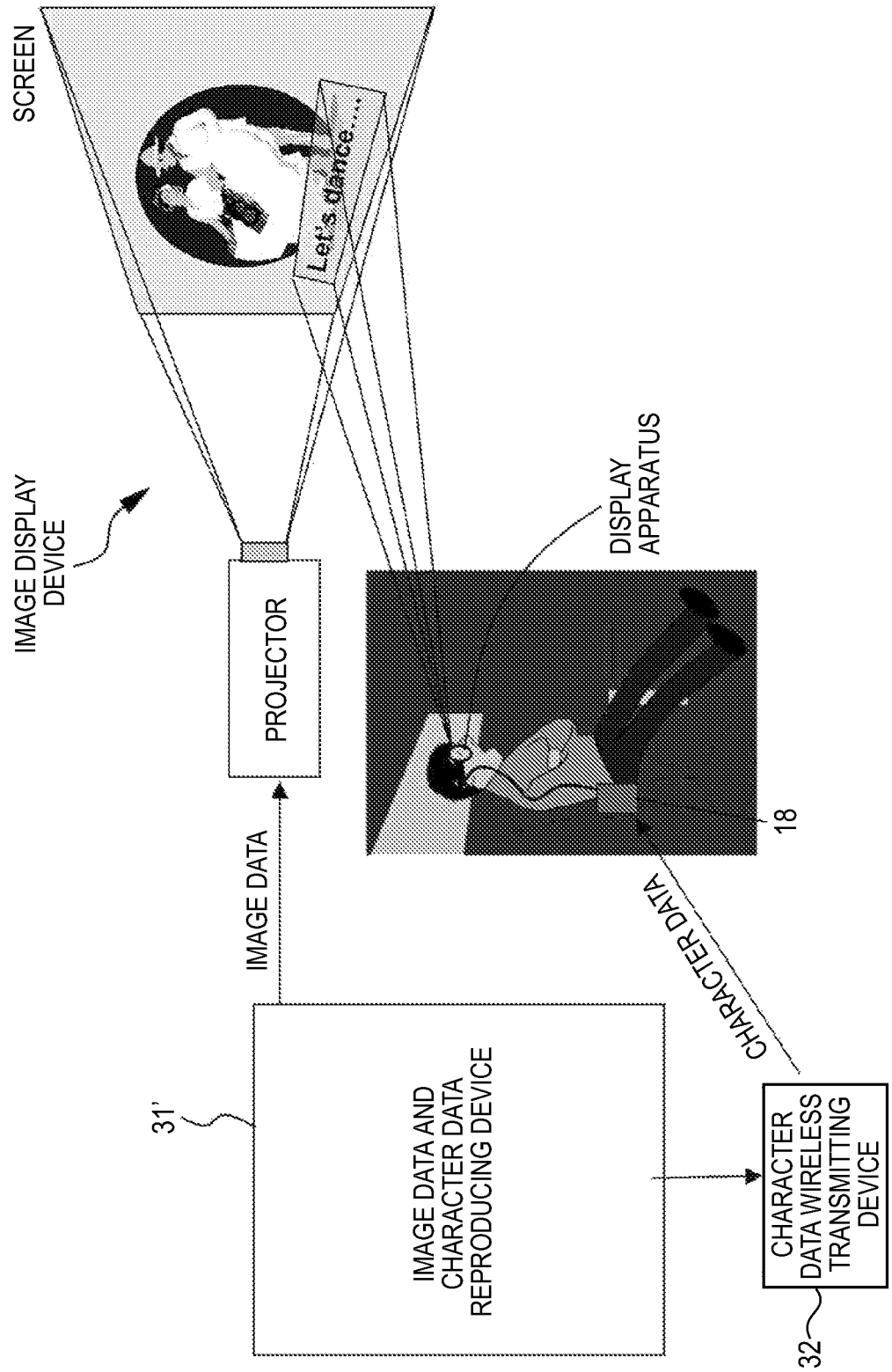

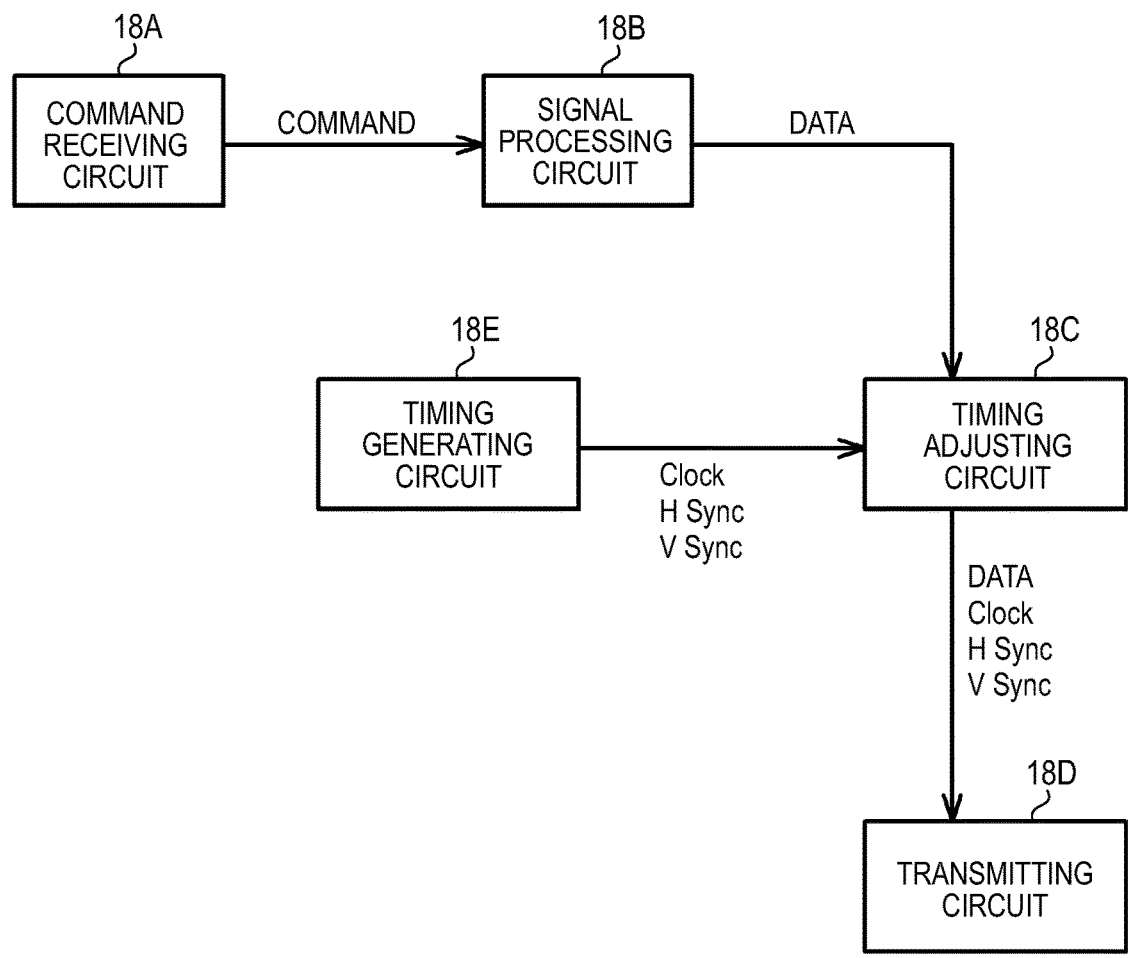

FIG.19A
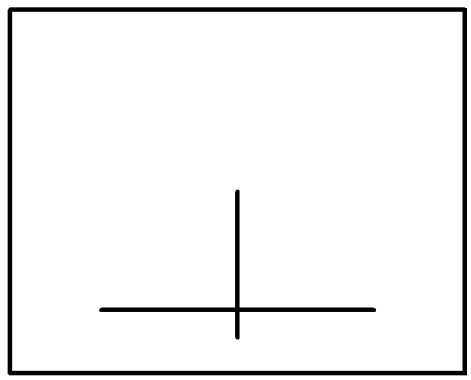 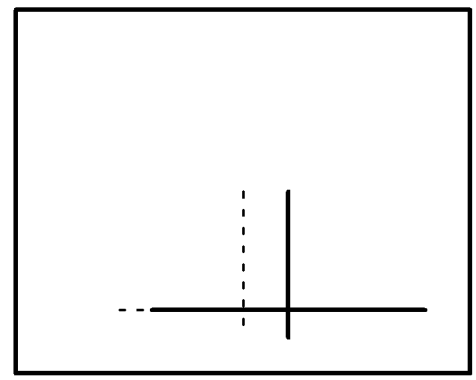
FIG.19B
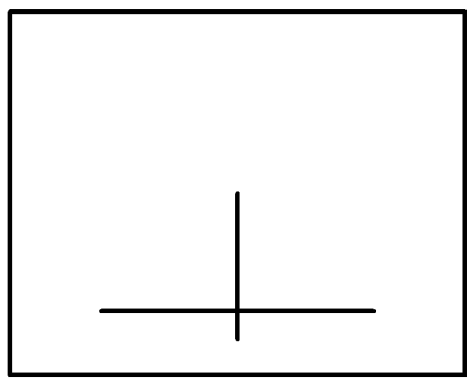 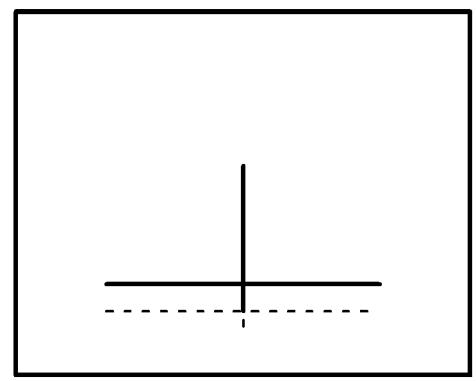
FIG.19C
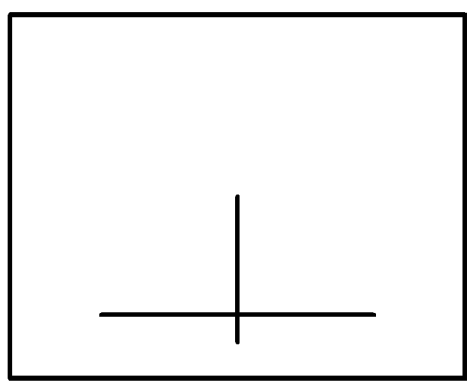 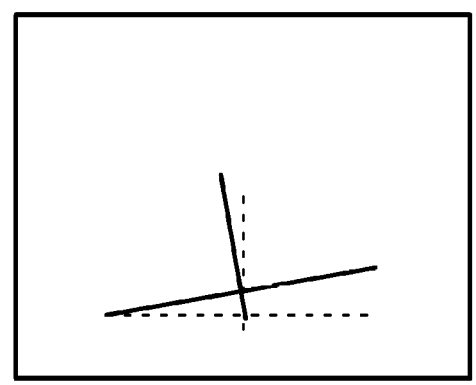

(EXAMPLE 11)

(EXAMPLE 11)

(EXAMPLE 12)

| DESIGNATION IDENTIFICATION CODE | TOTAL DISPLAY TIME | BRIGHTNESS INFORMATION | DATA |
|---|---|---|---|
| 01 | 10 | 60 | AAAAAAAAAA |
| 02 | 20 | 60 | BBBBBBBBBB |
| 03 | 15 | 80 | CCCCCCCCCC |
| 04 | 20 | 50 | DDDDDDDDDD |

(EXAMPLE 17)

(EXAMPLE 18)

[PRINCIPLE DIAGRAM]

[EXAMPLE 19]

FIG.36A
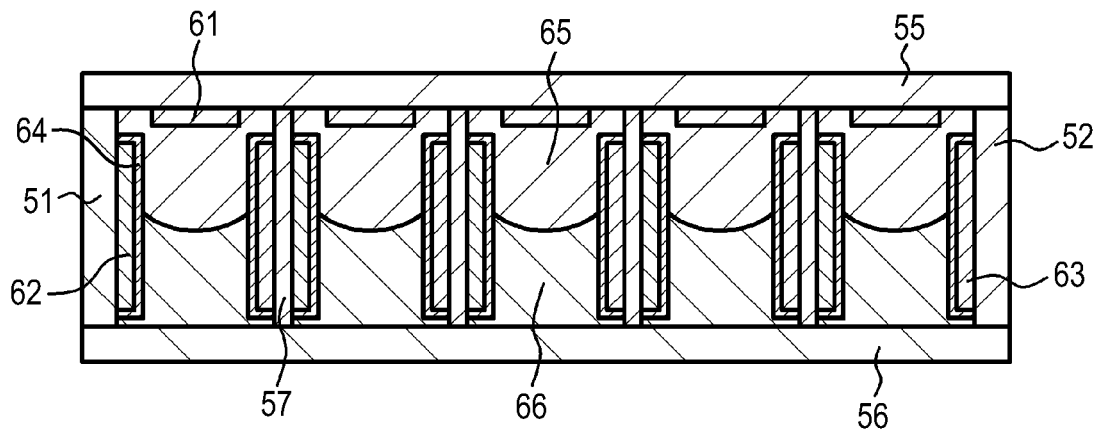
FIG.36B
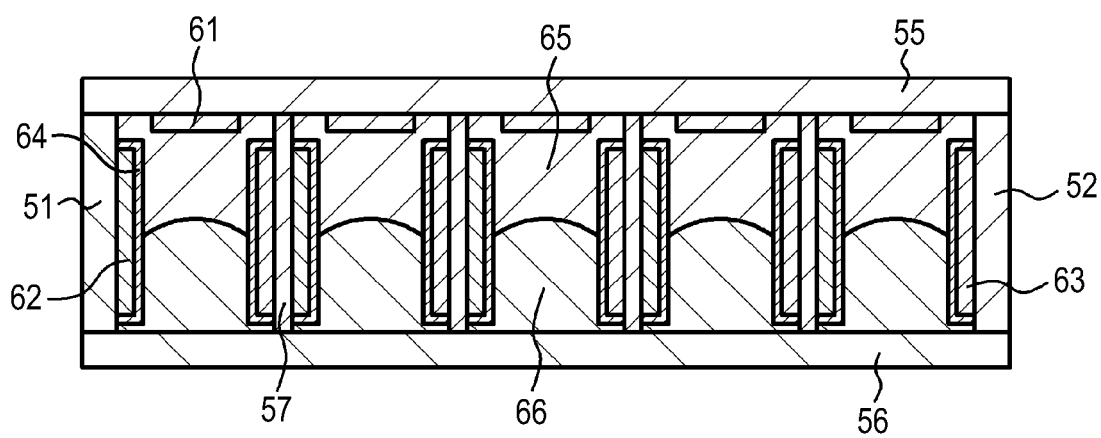
FIG.36C
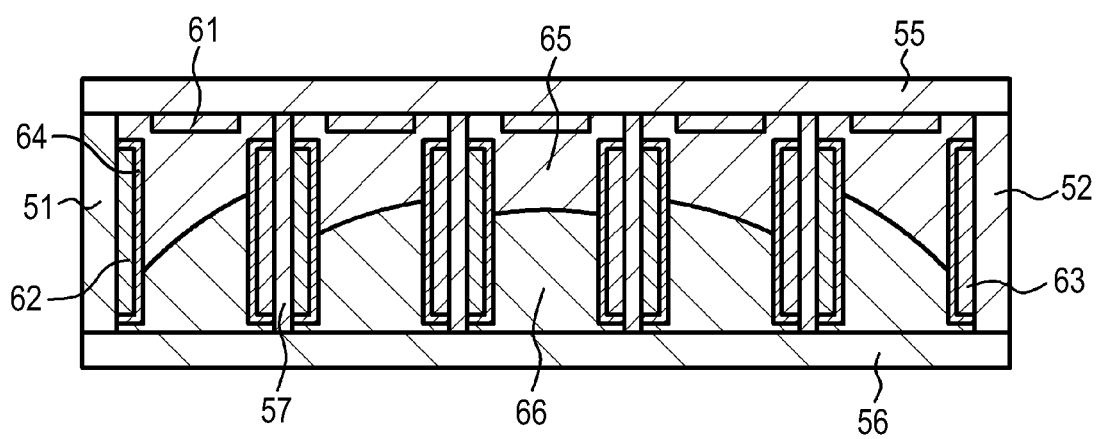
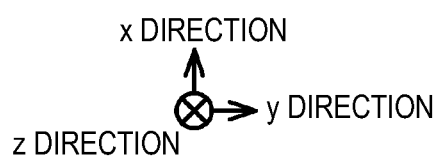

x DIRECTION
y DIRECTION
z DIRECTION

[EXAMPLE 20]

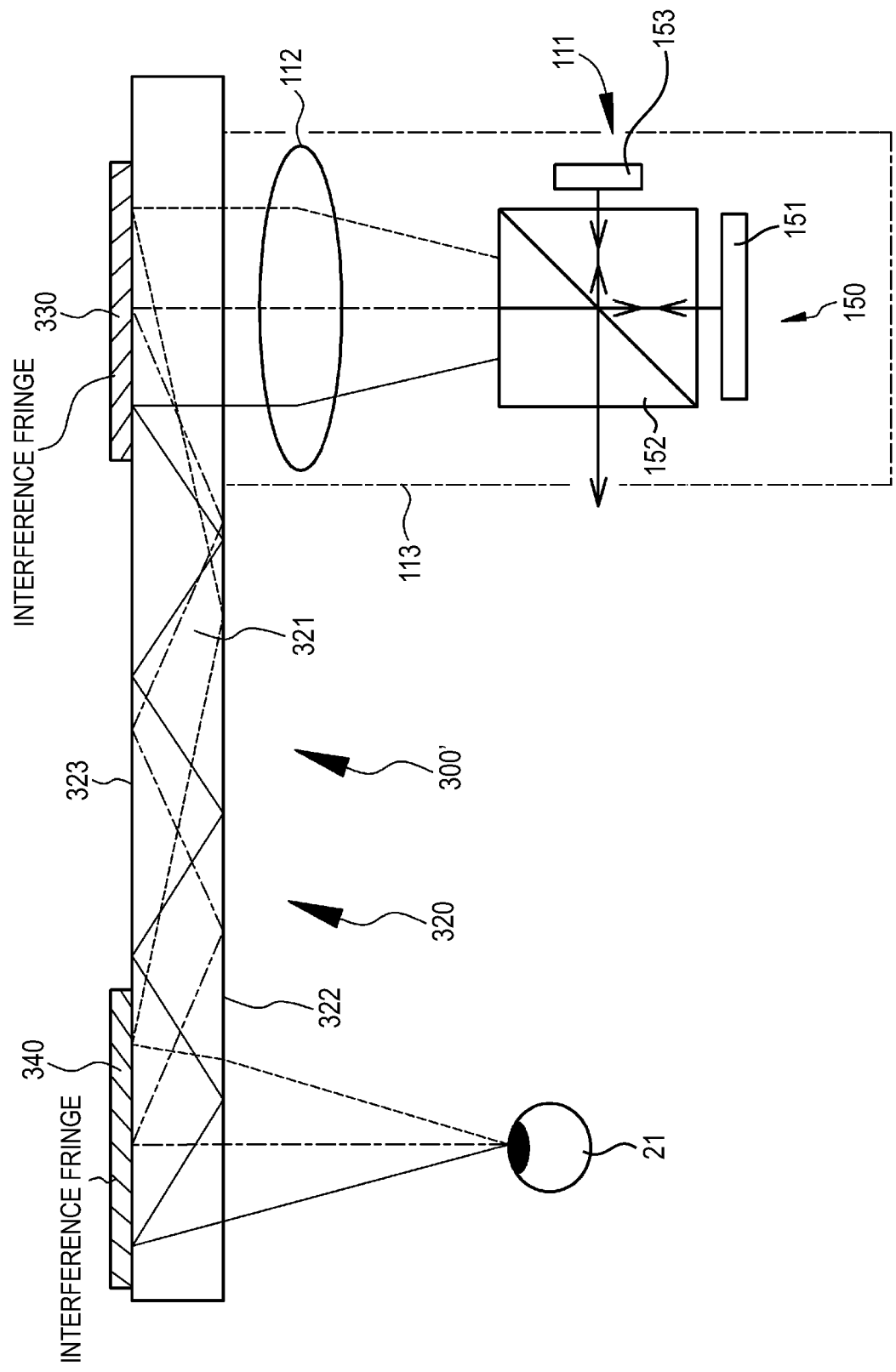

DISPLAY APPARATUS WITH A GLASSES TYPE FRAME AND AN IMAGE DISPLAY DEVICE

CROSS REFERENCES TO RELATED APPLICATIONS

This application is a continuation of U.S. Patent Application Ser. No. 13/467,779, filed May 9, 2012 which claims priority to Japanese Application No. JP 2011-123511, filed in the Japan Patent Office on Jun. 1, 2011, the entire disclosures of which are hereby incorporated herein by reference.

BACKGROUND

The present disclosure relates to a display apparatus and more particularly, to a display apparatus using a head-mounted display (HMD).

In recent years, an augmented reality technology (AR technology) has drawn attention which combines virtual objects or various kinds of information, which is additional information, as electronic information with a real environment (or a portion thereof) and presents the combined information. In order to achieve the augmented reality technology, for example, a head-mounted display has been examined as a device for presenting visual information. The head-mounted display is expected to be applied for job support in the reality environment. For example, the head-mounted display may be applied for the provision of route guidance information and the provision of technique information to the engineer who performs, for example, maintenance. In particular, the head-mounted display is very convenient since the hands are free. In addition, even when enjoying a video or an image while moving outdoors, the user can see the video or the image and an external environment at the same time. Therefore, the user can move smoothly.

For example, JP-A-2006-162767 discloses a virtual image display device (image display device) in which a virtual image optical system changes a two-dimensional image formed by an image forming device into an enlarged virtual image such that the observer can observe the virtual image.

As shown in FIG. 45, which is a conceptual diagram, an image display device 100' includes an image forming device 111 including a plurality of pixels which are arranged in a two-dimensional matrix, a collimating optical system 112 that converts light emitted from the pixels of the image forming device 111 into parallel light, and an optical device (light guide unit) 120 on which the parallel light converted by the collimating optical system 112 is incident, in which the light is guided, and from which the light is emitted. The optical device 120 includes a light guide plate 121 in which incident light propagates while being totally reflected and from which the light is emitted, a first deflection unit 130 (for example, a single-layer light reflecting film) that reflects light incident on the light guide plate 121 so as to be totally reflected in the light guide plate 121, and a second deflection unit 140 (for example, a multi-layer light reflecting film having a multi-layer structure) that allows the light, which propagates in the light guide plate 121 while being totally reflected, to be emitted from the light guide plate 121. For example, when an HMD is formed by the image display device 100', it is possible to reduce the weight and size of the apparatus. Reference numerals denoting the other components shown in FIG. 45 are referred to by those in an image display device according to Example 1 shown in FIG. 1.

In addition, for example, JP-A-2007-94175 discloses a virtual image display device (image display device) using a hologram diffraction grating in which a virtual image optical system changes a two-dimensional image formed by an image forming device into an enlarged virtual image such that the observer can observe the virtual image.

As shown in FIG. 46, which is a conceptual diagram, an image display device 300' basically includes an image forming device 111 that displays an image, a collimating optical system 112, and an optical device (light guide unit) 320 on which light displayed on the image forming device 111 is incident and which guides the light to a pupil 21 of the observer. The optical device 320 includes a light guide plate 321 and first and second diffraction grating members 330 and 340 which are reflective volume hologram diffraction gratings provided on the light guide plate 321. Light emitted from each pixel of the image forming device 111 is incident on the collimating optical system 112, and a plurality of parallel light components with different incident angles on the light guide plate 321 are generated by the collimating optical system 112 and are then incident on the light guide plate 321. The parallel light components are incident on a first surface 322 of the light guide plate 321 and are then emitted therefrom. The first diffraction grating member 330 and the second diffraction grating member 340 are attached to a second surface 323 of the light guide plate 321 that is parallel to the first surface 322 of the light guide plate 321. Reference numerals denoting the other components shown in FIG. 46 are referred to by those in an image display device according to Example 3 shown in FIG. 6.

When images are displayed on the image display devices 100' and 300', the observer can view an external image overlapping the displayed image.

However, sufficiently high contrast is not likely to be given to the image observed by the observer when the brightness of a surrounding environment in which the image display devices 100' and 300' are located is very high or depending on the content of the displayed image. For example, JP-A-2004-101197 discloses means for solving the problem. In the technique disclosed in JP-A-2004-101197, a liquid crystal shutter controls the amount of light which is incident from the outside.

SUMMARY

However, in the technique disclosed in JP-A-2004-101197, since the liquid crystal shutter controls the amount of light which is incident from the outside, power consumption increases and half the amount of external light incident on the image display device 100' or 300' is blocked by the liquid crystal shutter using the polarizing plate. In addition, any solution to the demand for the control of the amount of light which is incident from the outside depending on the illuminance of a surrounding environment in which the image display device 100' or 300' is located is not disclosed.

Therefore, it is desirable to provide a display apparatus capable of giving high contrast to the image observed by the observer, reducing power consumption, and sufficiently increasing the amount of external light incident on an image display device. In addition, it is desirable to provide a display apparatus capable of giving high contrast to the image observed by the observer and optimizing the observation state of the image depending on the illuminance of a surrounding environment in which the display apparatus is located.

A display apparatus (more particularly, a head-mounted display (HMD)) according to any of first to fifth embodiments of the present disclosure includes: (i) a glasses-type frame that is mounted on the head of an observer; and (ii) an image display device that is attached to the frame. The image display device includes: (A) an image forming device; and (B) an optical device on which light emitted from the image forming device is incident, in which the light is guided, and from which the light is emitted. A light control device that adjusts the amount of external light incident from the outside is provided in a region of the optical device from which light is emitted.

In the display apparatus according to the first embodiment of the present disclosure, the light control device includes: two opposite transparent substrates; electrodes that are provided on the substrates; and an electrophoretic dispersion liquid that is sealed between the two substrates.

The display apparatus according to the second embodiment of the present disclosure further includes an illuminance sensor (for convenience, in some cases, which is referred to as an "environmental illuminance measuring sensor") that measures the illuminance of an environment in which the display apparatus is located. The transmittance of the light control device is controlled on the basis of the measurement result of the illuminance sensor (environmental illuminance measuring sensor).

The display apparatus according to the third embodiment of the present disclosure further includes an illuminance sensor (environmental illuminance measuring sensor) that measures the illuminance of an environment in which the display apparatus is located. The brightness of an image formed by the image forming device is controlled on the basis of the measurement result of the illuminance sensor (environmental illuminance measuring sensor).

The display apparatus according to the fourth embodiment of the present disclosure further includes an illuminance sensor (for convenience, in some cases, which is referred to as a "transmitted light illuminance measuring sensor") that measures illuminance on the basis of light passing through the light control device from an external environment. The transmittance of the light control device is controlled on the basis of the measurement result of the illuminance sensor (transmitted light illuminance measuring sensor).

The display apparatus according to the fifth embodiment of the present disclosure further includes an illuminance sensor (transmitted light illuminance measuring sensor) that measures illuminance on the basis of light passing through the light control device from an external environment. The brightness of an image formed by the image forming device is controlled on the basis of the measurement result of the illuminance sensor (transmitted light illuminance measuring sensor).

In the display apparatus according to the first embodiment of the present disclosure, since the light control device includes two opposite transparent substrates, the electrodes provided on the substrates, and the electrophoretic dispersion liquid sealed between the two substrates, it is possible to provide a display apparatus capable of giving high contrast to the image observed by the observer, reducing power consumption, and sufficiently increasing the amount of external light incident on the image display device. In the display apparatuses according to the second to fifth embodiments of the present disclosure, the transmittance of the light control device is controlled on the basis of the measurement result of the illuminance sensor (environmental illuminance measuring sensor). The brightness of the image formed by the image forming device is controlled on the basis of the measurement result of the illuminance sensor (environmental illuminance measuring sensor). The transmittance of the light control device is controlled on the basis of the measurement result of the illuminance sensor (transmitted light illuminance measuring sensor). The brightness of the image formed by the image forming device is controlled on the basis of the measurement result of the illuminance sensor (transmitted light illuminance measuring sensor). Therefore, it is possible to provide a display apparatus capable of giving high contrast to the image observed by the observer and optimizing the observation state of the image depending on the illuminance of a surrounding environment in which the display apparatus is located.

Additional features and advantages are described herein, and will be apparent from the following Detailed Description and the figures.

BRIEF DESCRIPTION OF THE FIGURES

FIG. 5 is a conceptual diagram illustrating an image display device in a display apparatus according to Example 2;

FIG. 6 is a conceptual diagram illustrating an image display device in a display apparatus according to Example 3;

FIG. 15 is a conceptual diagram illustrating the use state of the display apparatus according to Example 9;

FIG. 16 is a conceptual diagram illustrating the use state of the display apparatus according to Example 9;

FIG. 17 is a conceptual diagram illustrating a control device of the display apparatus according to Example 9;

FIGS. 18A and 18B are diagrams illustrating an example of an image signal in Examples 9 and 10;

FIGS. 19A, 19B, and 19C are schematic diagrams illustrating the shift of images displayed by image display devices for the left eye and the right eye;

FIGS. 36A to 36C are schematic cross-sectional views illustrating the behavior of the liquid lens according to Example 19 taken along the line C-C of FIG. 35;

FIG. 46 is a conceptual diagram illustrating an image display device in a modification of the display apparatus according to the related art.

DETAILED DESCRIPTION

Figure 1:
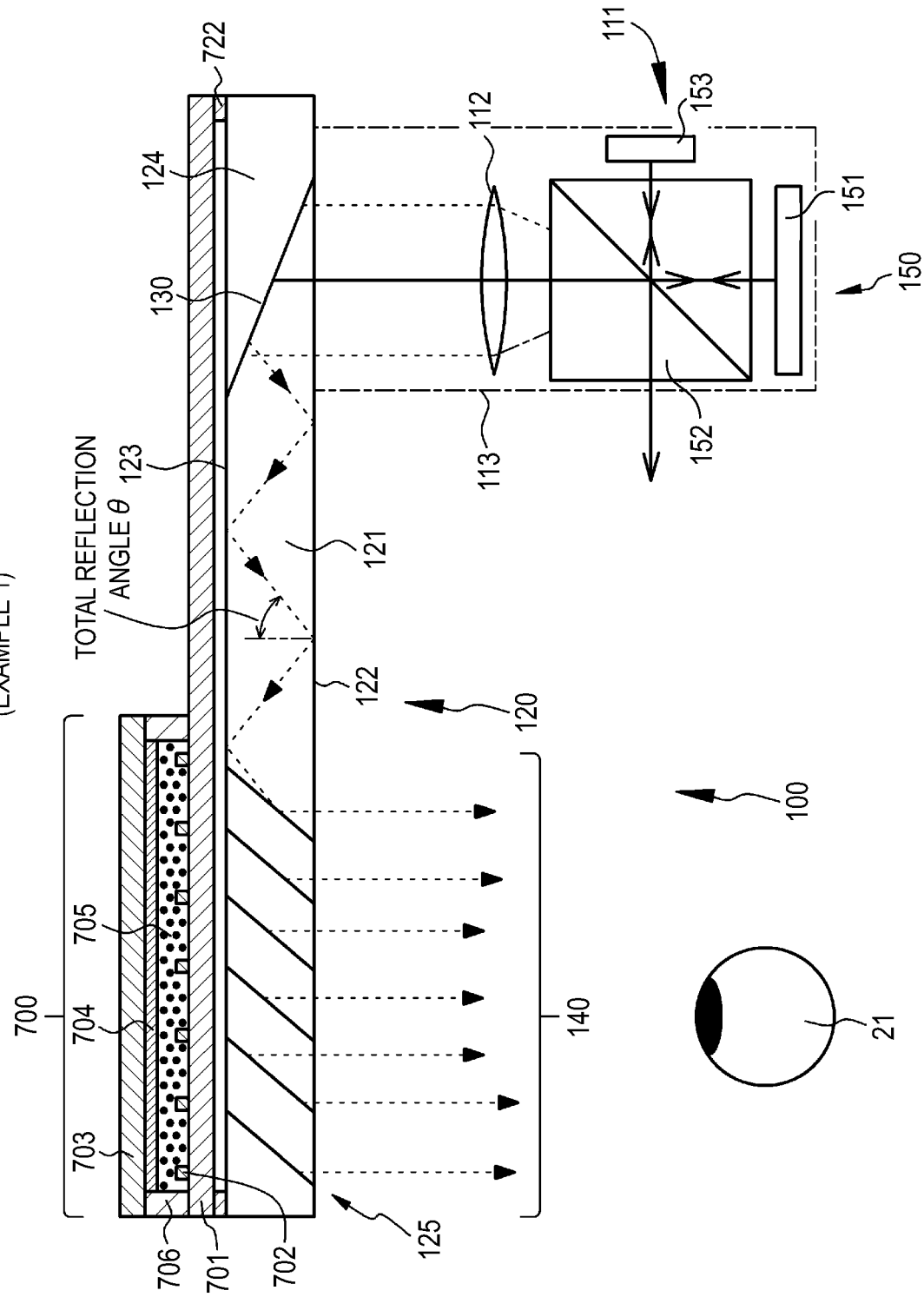
FIG. 1 is a conceptual diagram illustrating an image display device in a display apparatus according to Example 1.

Hereinafter, the present disclosure will be described on the basis of examples with reference to the accompanying drawings. However, the present disclosure is not limited to the examples, and various numerical values or materials are illustrative. The present disclosure will be described in the following order.

1. Overall description of display apparatuses according to first to fifth embodiments of the present disclosure 2. Example 1 (Display apparatus according to the first embodiment of the present disclosure)

3. Example 2 (Modification of Example 1)

4. Example 3 (Another modification of Example 1)

5. Example 4 (Still another modification of Example 1)

6. Example 5 (Yet another modification of Example 1)

7. Example 6 (Modifications of Examples 1 to 5)

8. Example 7 (Display apparatuses according to the first to third embodiments of the present disclosure)

9. Example 8 (Display apparatuses according to the first, fourth, and fifth embodiments of the present disclosure)

10. Example 9 (1A-th and 1B-th display apparatuses according to embodiments of the present disclosure)

11. Example 10 (1C-th display apparatus according to embodiment of the present disclosure)

12. Example 11 (Modifications of Examples 9 and 10)

13. Example 12 (Modification of Example 11)

14. Example 13 (3A-th display apparatus according to embodiment of the present disclosure)

15. Example 14 (3B-th display apparatus according to embodiment of the present disclosure)

16. Example 15 (3C-th display apparatus according to embodiment of the present disclosure)

17. Example 16 (3D-th display apparatus according to embodiment of the present disclosure)

18. Example 17 (2A-th display apparatus according to embodiment of the present disclosure)

19. Example 18 (2B-th display apparatus according to embodiment of the present disclosure)

20. Example 19 (2C-th display apparatus according to embodiment of the present disclosure)

21. Example 20 (2D-th display apparatus according to embodiment of the present disclosure)

22. Example 21 (Modifications of Examples 17 to 20)

23. Example 22 (Modifications of Examples 17 to 21) and others

Overall Description of Display Apparatuses According to First to Fifth Embodiments of the Present Disclosure The structure of the display apparatus according to the second embodiment of the present disclosure, the structure of the display apparatus according to the third embodiment of the present disclosure, the structure of the display apparatus according to the fourth embodiment of the present disclosure, and the structure of the display apparatus according to the fifth embodiment of the present disclosure may be arbitrarily combined with each other. That is, for example, the structures of the display apparatuses according to the second to fifth embodiments of the present disclosure may be combined with each other as follows: a combination of the structure of the display apparatus according to the second embodiment of the present disclosure and the structure of the display apparatus according to the third embodiment of the present disclosure; a combination of the structure of the display apparatus according to the second embodiment of the present disclosure and the structure of the display apparatus according to the fourth embodiment of the present disclosure; a combination of the structure of the display apparatus according to the second embodiment of the present disclosure and the structure of the display apparatus according to the fifth embodiment of the present disclosure; a combination of the structure of the display apparatus according to the third embodiment of the present disclosure and the structure of the display apparatus according to the fourth embodiment of the present disclosure; a combination of the structure of the display apparatus according to the third embodiment of the present disclosure and the structure of the display apparatus according to the fifth embodiment of the present disclosure; a combination of the structure of the display apparatus according to the fourth embodiment of the present disclosure and the structure of the display apparatus according to the fifth embodiment of the present disclosure; a combination of the structure of the display apparatus according to the second embodiment of the present disclosure, the structure of the display apparatus according to the third embodiment of the present disclosure, and the structure of the display apparatus according to the fourth embodiment of the present disclosure; a combination of the structure of the display apparatus according to the second embodiment of the present disclosure, the structure of the display apparatus according to the third embodiment of the present disclosure, and the structure of the display apparatus according to the fifth embodiment of the present disclosure; a combination of the structure of the display apparatus according to the second embodiment of the present disclosure, the structure of the display apparatus according to the fourth embodiment of the present disclosure, and the structure of the display apparatus according to the fifth embodiment of the present disclosure; a combination of the structure of the display apparatus according to the third embodiment of the present disclosure, the structure of the display apparatus according to the fourth embodiment of the present disclosure, and the structure of the display apparatus according to the fifth embodiment of the present disclosure; and a combination of the structure of the display apparatus according to the second embodiment of the present disclosure, the structure of the display apparatus according to the third embodiment of the present disclosure, the structure of the display apparatus according to the fourth embodiment of the present disclosure, and the structure of the display apparatus according to the fifth embodiment of the present disclosure.

A display apparatus according to the first embodiment of the present disclosure may further include an illuminance sensor (environmental illuminance measuring sensor) that measures illuminance in an environment in which the display apparatus is located and control the transmittance of a light control device on the basis of the measurement result of the illuminance sensor (environmental illuminance measuring sensor).

The display apparatus according to the first embodiment of the present disclosure including the above-mentioned preferred embodiment may further include an illuminance sensor (environmental illuminance measuring sensor) that measures illuminance in an environment in which the display apparatus is located and control the brightness of an image formed by an image forming device on the basis of the measurement result of the illuminance sensor (environmental illuminance measuring sensor).

The display apparatus according to the first embodiment of the present disclosure including the above-mentioned preferred embodiment may further include a second illuminance sensor (in some cases, which is referred to as a "transmitted light illuminance measuring sensor" for convenience) that measures illuminance on the basis of light passing through a light control device from an external environment, and control the transmittance of the light control device on the basis of the measurement result of the second illuminance sensor (transmitted light illuminance measuring sensor).

The display apparatus according to the first embodiment of the present disclosure including the above-mentioned preferred embodiment may further a second illuminance sensor (transmitted light illuminance measuring sensor) that measures illuminance on the basis of light passing through a light control device from an external environment, and control the brightness of an image formed by an image forming device on the basis of the measurement result of the second illuminance sensor (transmitted light illuminance measuring sensor).

In the display apparatus including the second illuminance sensor (transmitted light illuminance measuring sensor) according to the first embodiment of the present disclosure or the display apparatus including the illuminance sensor (transmitted light illuminance measuring sensor) according to the fourth or fifth embodiment of the present disclosure, the illuminance sensor or the second illuminance sensor (transmitted light illuminance measuring sensor) may be arranged closer to an observer than the optical device.

In the display apparatus according to the first embodiment of the present disclosure or the display apparatuses according to the second to fifth embodiments of the present disclosure including the above-mentioned various preferred embodiments, the maximum transmittance of the light control device may be equal to or more than 50% and the minimum transmittance of the light control device may be equal to or less than 30%. For example, the upper limit of the maximum transmittance of the light control device may be 99% and the lower limit of the minimum transmittance of the light control device may be 1%.

In the display apparatuses according to the first to fifth embodiments of the present disclosure including the above-mentioned various preferred embodiments and structures, when the measurement result of the illuminance sensor (environmental illuminance measuring sensor) is equal to or more than a predetermined value (for convenience, in some cases, which is referred to as a "first measured illuminance value"), the transmittance of the light control device may be equal to or less than a predetermined value (which for convenience, in some cases, is referred to as "first transmittance"). Alternatively, when the measurement result of the illuminance sensor (environmental illuminance measuring sensor) is equal to or less than a predetermined value (which for convenience, in some cases, is referred to as a "second measured illuminance value"), the transmittance of the light control device may be equal to or more than a predetermined value (which for convenience, in some cases, is referred to as "second transmittance"). In addition, in terms of the illuminance of the environmental illuminance measuring sensor, when the measurement result of the transmitted light illuminance measuring sensor is not desired illuminance, or when it is necessary to finely adjust illuminance, the transmittance of the light control device may be adjusted while the value of the second illuminance sensor (transmitted light illuminance measuring sensor) is monitored. For example, the first measured illuminance value may be 10 lux, the first transmittance may be in the range of 1% to 30%, the second measured illuminance value may be 0.01 lux, and the second transmittance may be in the range of 51% to 99%. When the measured illuminance value of the environmental illuminance measuring sensor is equal to or less than $1 \times 10^{-3}$ lux, for example, it is preferable to increase the driving voltage of the light control device to reduce the driving time, thereby increasing the transmittance of the light control device as quickly as possible.

In the display apparatuses according to the first to fifth embodiments of the present disclosure including the above-mentioned various preferred embodiments and structures, the light control device may impart a desired color to light passing through the light control device. In this case, the color imparted by the light control device may be variable or the color imparted by the light control device may be fixed. However, in the former case, for example, a light control device that is colored red, a light control device that is colored green, and a light control device that is colored blue may be laminated. In the latter case, the color imparted by the light control device is not particularly limited, but may be, for example, brown.

In the display apparatuses according to the first to fifth embodiments of the present disclosure including the above-mentioned various preferred embodiments and structures, the light control device may be removably provided in a region of the optical device from which light is emitted, or the light control device may be fixed to the region. In order to provide the light control device so as to be removable, for example, the light control device may be attached to the optical device by screws made of transparent plastic, and may be connected to a control circuit (for example, which is included in a control device for controlling the image forming device) for controlling the transmittance of the light control device through a connector and wiring lines. In order to provide the light control device so as to be removable, for example, the light control device may be attached to a frame by screws made of transparent plastic; a groove may be formed in the frame and the light control device may be fitted to the groove; or a magnet may be attached to the frame, the light control device may be attached to the frame with the magnet, a slide portion may be provided in the frame, and the light control device may be fitted to the slide portion. In addition, a connector may be attached to the light control device and the light control device may be electrically connected to a control circuit (for example, which is included in the control device for controlling the image forming device) for controlling the transmittance of the light control device through the connector and wiring lines.

In the display apparatuses according to the first to fifth embodiments of the present disclosure including the above-mentioned various preferred embodiments and structures, the optical device may include: (a) a light guide plate in which incident light propagates while being totally reflected and from which the light is emitted; (b) a first deflection unit that deflects light incident on the light guide plate so as to be totally reflected in the light guide plate; and (c) a second deflection unit that deflects the light, which propagates in the light guide plate while being totally reflected, a plurality of times so as to be emitted from the light guide plate. Here, the term "total reflection" means total internal reflection or total reflection inside the light guide plate, which holds for the following description. In this case, the second deflection unit may be disposed in a projection image of the light control device, or the light control device may be disposed in a projection image of the second deflection unit. In addition, the second deflection unit may be covered with one of the substrates forming the light control device.

In the display apparatus according to the first embodiment of the present disclosure including the above-mentioned various preferred embodiments and structures, as described above, the light control device includes: two opposite transparent substrates (a first substrate and a second substrate); electrodes (a first electrode and a second electrode) that are provided on the two substrates; and an electrophoretic dispersion liquid that is sealed between the two substrates. The electrophoretic dispersion liquid includes a large number of charged electrophoretic particles and a dispersion medium with a color different from that of the electrophoretic particles. For example, in a case in which the first electrode is patterned and the second electrode is not patterned (a so-called solid electrode structure), when the electrophoretic particles are negatively charged, a negative voltage is applied to the first electrode, and a positive voltage is applied to the second electrode, the negatively-charged electrophoretic particles migrate so as to cover the second electrode. Therefore, the transmittance of the light control device is reduced. On the contrary, when a positive voltage is applied to the first electrode and a negative voltage is applied to the second electrode, the electrophoretic particles migrate so as to cover the first electrode. Therefore, the transmittance of the light control device increases. When the voltage is applied to the electrodes in this way, it is possible to control the transmittance of the light control device. The voltage may be a DC voltage or an AC voltage. The shape of the patterned first electrode may be determined by various experiments as long as the patterned first electrode has a shape capable of uniformizing the transmittance value of the light control device when the electrophoretic particles migrate so as to cover the first electrode to increase the transmittance of the light control device.

For convenience, in some cases, one of the two opposite substrates is referred to as a "first substrate" and the other substrate opposite to the first substrate is referred to as a "second substrate". In addition, for convenience, if necessary, the patterned or non-patterned electrode provided on the first substrate is referred to as the "first electrode" and the non-patterned electrode provided on the second substrate is referred to as the "second electrode". For example, the first substrate and the second substrate may be insulating members, such as transparent glass substrates or plastic substrates. Transparent plastic substrates made of the following materials may be given as an example of the plastic substrate: polyethylene terephthalate, polyethylene naphthalate, polycarbonate, polyether sulfone, polystyrene, polyethylene, polypropylene, polyphenylene sulfide, polyvinylidene fluoride, tetraacetylcellulose, bromophenoxide, aramids, polyimides, polystyrenes, polyarylates, polysulfones and polyolefins. When the first substrate and the second substrate are transparent plastic substrates, a barrier layer made of an inorganic material or an organic material may be formed on the inner surface of the substrate.

For example, so-called transparent electrodes may be used as the first electrode and the second electrode. Specifically, the first electrode and the second electrode may be made of indium-tin composite oxide (including, for example, ITO (indium tin oxide) Sn-doped $In_2O_3$, crystalline ITO, and amorphous ITO), fluorine-doped $SnO_2$ (FTO), IFO (F-doped $In_2O_3$), antimony-doped $SnO_2$ (ATO), $SnO_2$, ZnO (including Al-doped ZnO or B-doped ZnO), indium-zinc composite oxide (IZO (Indium Zinc Oxide)), spinel-type oxide, oxide having a $YbFe_2O_4$ structure, and conductive polymers, such as polyaniline, polypyrrole, and polythiophene. However, the material forming the first electrode and the second electrode is not limited thereto. Among them, two or more kinds of materials may be combined with each other. The first electrode may be made of metal materials, such as gold, silver, copper, and aluminum, or alloys in addition to the materials forming the transparent electrode. The first electrode and the second electrode may be formed on by a physical vapor deposition method (PVD method), such as a vacuum deposition method or a sputtering method, various chemical vapor deposition methods (CVD methods), and various coating methods. The electrode may be patterned by an arbitrary method, such as an etching method, a lift-off method, or methods using various masks.

An insulating layer may be formed on the electrode, if necessary. The insulating layer may be made of, for example, a colorless transparent insulating resin. Specifically, for example, the insulating layer may be made of an acrylic resin, an epoxy resin, a fluorine resin, a silicon resin, a polyimide resin, or a polystyrene resin.

For the ratio of the electrophoretic particles with respect to the dispersion liquid (dispersion medium) in the electrophoretic dispersion liquid, the ratio of the electrophoretic particles with respect to 100 parts by mass of the dispersion liquid (dispersion medium) may be, for example, from 0.1 parts by mass to 15 parts by mass, and preferably 1 part by mass to 10 parts by mass. Examples of the dispersion liquid (dispersion medium) in which the electrophoretic particles are dispersed include colorless transparent liquids having high insulating properties, in particular, non-polar dispersion media, and more specifically, aliphatic hydrocarbons, aromatic hydrocarbons, halogenated hydrocarbon, and silicone oil. Herein, examples of the aliphatic hydrocarbons include pentane, hexane, cyclohexane, heptane, octane, nonane, decane, dodecane, ligroin, solvent naphtha, kerosene, normal paraffin, and isoparaffin. Further, examples of the aromatic hydrocarbons include benzene, toluene, xylene, and alkylbenzene. Examples of the silicone oil include various dimethyl polysiloxanyl including modified silicone oil. More specific examples thereof include ISOPAR G, H, L, and M, and EXXOL D30, D40, D80, D110, and D130, all manufactured by Exxon Mobil Corporation, IP SOLVENT 1620, 2028, and 2835, all manufactured by Idemitsu Petrochemical Co., Ltd., SHELLSOL 70, 71, 72, A, and AB, all manufactured by Shell Chemicals in Japan, and NAPHTHESOL L, M, and H, all manufactured by Nippon Petrochemical Co., Ltd. In addition, these may be used alone or as a mixture of two or more kinds thereof.

A structure in which an electrophoretic dispersion liquid is microencapsulated may be adopted. The microcapsules can be obtained by a well-known method such as an interfacial polymerization method, an in-situ polymerization method, and a coacervation method. Materials constituting the microcapsule are required to have characteristics to transmit sufficient light, and specific examples thereof include a urea-formaldehyde resin, a melamine-formaldehyde resin, a polyester resin, a polyurethane resin, a polyamide resin, a polyethylene resin, a polystyrene resin, a polyvinyl alcohol resin, gelatin, or a copolymer thereof. The method for placing the microcapsules on a substrate is not particularly limited, and examples thereof include an ink jet method. In addition, for the purpose of preventing the positional deviation of the microcapsules placed on the substrate, the microcapsules may be fixed on the substrate using an optically transmissive resin binder. Examples of the optically transmissive resin binder include water-soluble polymers, and specifically, polyvinyl alcohol, polyurethane, polyester, acrylic resins, and silicone resins.

It is not particularly necessary to use a charge control agent in the electrophoretic particles, but in the case where a positive charge control agent is used in order to charge the electrophoretic particles positively, examples of the positive charge control agent include nigrosine-based dyes such as Nigrosine Base EX (manufactured by Orient Chemical Industries Co., Ltd.), quaternary ammonium salts such as P-51 (manufactured by Orient Chemical Industries Co., Ltd.) and Copy Charge PX VP435 (manufactured by Hoechst Japan), alkoxylated amines, alkylamides, molybdic acid chelate pigments, imidazole compounds such as PLZ1001 (manufactured by Shikoku Chemicals Corporation), and transparent or white onium compounds. Further, an onium compound can be freely selected from primary to quaternary onium compounds, and it is chosen from an ammonium compound, a sulfonium compound, and a phosphonium compound. For example, the substituent that is bonded to a nitrogen, sulfur, or phosphorus atom is an alkyl group or an aryl group, and for the salt, halogen-based elements typically such as chlorine, hydroxyl groups, carboxylic acid groups, or the like are suitable as a counter ion, but are not limited thereto. Among these, primary to tertiary amine salts and quaternary ammonium salts are particularly preferred. In the case where a negative charge control agent is used in order to charge the electrophoretic particles negatively, examples of the negative charge control agent include metal complexes such as BONTRON S-22, BONTRON S-34, BONTRON E-81, and BONTRON E-84 (all manufactured by Orient Chemical Industry Co., Ltd.), and Spiron Black TRH (manufactured by Hodogaya Chemical Co., Ltd.), thioindigo-based pigments, quaternary ammonium salts such as Copy Charge NX VP434 (manufactured by Hoechst Japan), calixarene compounds such as BONTRON E-89 (manufactured by Orient Chemical Industry Co., Ltd.), boron compounds such as LR147 (manufactured by Japan Carlit Co., Ltd.), fluorine compounds such as magnesium fluoride and carbon fluoride, known metallic soaps such as aluminum stearate, calcium stearate, aluminum laurate, barium laurate, sodium oleate, zirconium octylate, and cobalt naphthenate, salicylic acid-based metal complexes of azine compounds, and phenol-based condensed products. The addition amount of the charge control agent may be, for example, 100 parts by mass to 300 parts by mass with respect to 100 parts by mass of the electrophoretic particles.

As the dispersion liquid (dispersion medium) constituting the electrophoretic dispersion liquid, sorbitan fatty acid esters (for example, sorbitan monooleate, sorbitan monolaurate, sorbitan sesquioleate, and sorbitan trioleate); polyoxyethylene sorbitan fatty acid esters (for example, polyoxyethylene sorbitan monostearate and polyoxyethylene sorbitan monooleate); polyethylene glycol fatty acid esters (for example, polyoxyethylene monostearate and polyethylene glycol diisostearate); polyoxyethylene alkyl phenyl ethers (for example, polyoxyethylene nonylphenyl ether and polyoxyethylene octylphenyl ether); or nonionic surfactants such as aliphatic diethanol amides can be used. Further, examples of the polymer-based dispersant include a styrene-maleic acid resin, a styrene-acrylic resin, rosin, urethane-based polymer compounds BYK-160, 162, 164, and 182 (all manufactured by Big Chemie Inc.), urethane-based dispersants EFKA-47 and LP-4050 (both manufactured by EFKA Co., Ltd.), a polyester-based polymer compound Solsperse 24,000 (manufactured by Zeneca Inc.), and an aliphatic diethanolamide-based polymer compound Solsperse 17000 (manufactured by Zeneka Inc.). In addition, other examples of the polymer-based dispersant include monomers such as lauryl methacrylate, stearyl methacrylate, 2-ethylhexyl methacrylate, and cetyl methacrylate, which are capable of forming a moiety that solvates in a dispersion medium, random copolymers of monomers such as methyl methacrylate, ethyl methacrylate, isopropyl methacrylate, styrene, and vinyl toluene, and monomers having polar functional groups, which are capable of forming a moiety that does not easily solvate in a dispersion medium, and graft copolymers disclosed in JP-A-3-188469. Examples of the polar monomers having functional groups include monomers having acidic functional groups, such as acrylic acid, methacrylic acid, itaconic acid, fumaric acid, maleic acid, and styrene sulfonic acid; monomers having basic functional groups, such as dimethylaminoethyl methacrylate, diethylaminoethyl methacrylate, vinyl pyridine, vinyl pyrrolidine, vinyl piperidine, and vinyl lactam; salts thereof; styrene-butadiene copolymers, and block copolymers of styrene and long-chain alkyl methacrylate disclosed in JP-A-60-10263. Further, a dispersant such as graft copolymers disclosed in JP-A-3-188469 may be added. The addition amount of the dispersant may be, for example, 0.01 parts by mass to 5 parts by mass with respect to 100 parts by mass of the electrophoretic particles. In order to generate the electrophoresis of the electrophoretic particles more effectively, an ionic surfactant may be added. Specific examples of an anionic surfactant include sodium dodecyl benzene sulfonate, sodium dodecyl sulfate, sodium alkyl naphthalene sulfonate, and sodium dialkyl sulfosuccinate. Further, specific examples of a cationic surfactant include alkyl benzene dimethyl ammonium chloride, alkyl trimethyl ammonium chloride, and distearyl ammonium chloride. In addition, an ionic additive that is soluble in a non-polar dispersion medium, such as a trifluoroacetic sulfonyl imide salt, trifluoroacetate, and trifluoroasulfate, may be added. The addition amount of the ionic additive may be, for example, 1 part by mass to 10 parts by mass with respect to 100 parts by mass of the electrophoretic particles.

Examples of the electrophoretic particles include carbon black (black), various metal oxides, phthalocyanine dyes (cyan color), Direct Blue 199 (ProJet Cyan 1 color), Magenta 377 (magenta color), Reactive Red 29 (magenta color), Reactive Red 180 (magenta color), and azo dyes (which are yellow, and include, for example, Yellow 104, Ilford AG, Rue de l'Industrie, CH-1700 Fribourg, Switzerland).

In the display apparatus according to the second to fifth embodiments of the present disclosure including the above-mentioned various preferred embodiments and structures, the light control device may be used as the light control device of the display apparatus according to the first embodiment of the present disclosure, but the present disclosure is not limited thereto. The following may be used as the light control device: a liquid crystal shutter; an electrodeposition-type (electrodeposition and electric field deposition) optical shutter using an electrodeposition and disassociation phenomenon generated by the reversible redox reaction of metal (for example, silver particles); an optical shutter using a change in the color of the material generated by the redox reaction of an electrochromic material; and an optical shutter that controls transmittance using an electrowetting phenomenon. In the display apparatus according to the first to fifth embodiments of the present disclosure including the above-mentioned various preferred embodiments and structures, the optical device and the light control device may be arranged in this order from the observer, or the light control device and the optical device may be arranged in this order from the observer. In the display apparatus according to the first to fifth embodiments of the present disclosure including the above-mentioned various preferred embodiments and structures, the illuminance sensor (environmental illuminance measuring sensor or the transmitted light illuminance measuring sensor) may be a known illuminance sensor, and the illuminance sensor may be controlled by a known control circuit.

In the display apparatus according to the first to fifth embodiments of the present disclosure including the above-mentioned various preferred embodiments and structures (hereinafter, in some cases, which is simply referred to as a "display apparatus according to an embodiment of the present disclosure"), the optical device may be a semi-transmissive (see-through) type. Specifically, at least portions of the optical device that face both eyes of the observer may be semi-transmissive (see-through) and the outside landscape may be seen through the portions of the optical device. The display apparatus may include one image display device or two image display devices.

The first deflection unit may reflect light incident to the light guide plate, and the second deflection unit may transmit and reflect light, which propagates in the light guide plate while being totally reflected, a plurality of times. In this case, the first deflection unit may serve as a reflective mirror, and the second deflection unit may serve as a semi-transmissive mirror.

In this structure, the first deflection unit is made of, for example, a metal material containing an alloy and may be a light reflecting film (a kind of mirror) that reflects light incident on the light guide plate or a diffraction grating (for example, a hologram diffraction grating film) that diffracts light incident on the light guide plate. In addition, the second deflection unit may be a multi-layer structure in which many multi-layer dielectric films are laminated, a half mirror, a polarized beam splitter, or a hologram diffraction grating film. The first deflection unit or the second deflection unit is provided in the light guide plate (incorporated into the light guide plate). In the first deflection unit, parallel light incident on the light guide plate is reflected or diffracted such that the parallel light incident on the light guide plate is totally reflected inside the light guide plate. On the other hand, in the second deflection unit, the parallel light which propagates in the light guide plate while being totally reflected is reflected or diffracted a plurality of times, and the reflected or diffracted light is emitted as parallel light from the light guide plate.

Alternatively, the first deflection unit may diffract light incident on the light guide plate, and the second deflection unit may diffract light, which propagates in the light guide plate while being totally reflected, a plurality of times. In this case, the first deflection unit and the second deflection unit may be diffraction grating devices. Furthermore, the diffraction grating devices may be reflective diffraction grating devices or transmissive diffraction grating devices. Alternatively, one of the diffraction grating devices may be a reflective diffraction grating device, and the other diffraction grating device may be a transmissive diffraction grating device. An example of the reflective diffraction grating device may be a reflective volume hologram diffraction grating. For convenience of explanation, the first deflection unit, which is a reflective volume hologram diffraction grating, may be referred to as a "first diffraction grating member", and the second deflection unit, which is a reflective volume hologram diffraction grating, may be referred to as a "second diffraction grating member".

The image display device according to the embodiment of the present disclosure may display a monochromatic (for example, green) image. However, in the display of a color image, in order to allow the first diffraction grating member or the second diffraction grating member to respond to the diffraction and reflection of P kinds of (for example, P=3 and three kinds of light components, that is, red, green, and blue light components) of light having P kinds of different wavelength bands (or wavelengths), the first diffraction grating member or the second diffraction grating member may be configured by laminating P diffraction grating layers which are reflective volume hologram diffraction gratings. In each of the diffraction grating layers, interference fringes corresponding to one kind of wavelength band (or wavelength) are formed. Alternatively, in order to respond to the diffraction and reflection of P kinds of light having P kinds of different wavelength bands (or wavelengths), P kinds of interference fringes may be formed in the first diffraction grating member or the second diffraction grating member which is a single-layer diffraction grating layer. Alternatively, the angle of view may be divided into, for example, three equal portions and the first diffraction grating member or the second diffraction grating member may be formed by laminating diffraction grating layers corresponding to the divided angles of view. The use of these structures makes it possible to increase diffraction efficiency and a diffraction acceptance angle and optimize the diffraction angle when light in each wavelength band (or with each wavelength) is diffracted and reflected by the first diffraction grating member or the second diffraction grating member.

The first diffraction grating member and the second diffraction grating member may be made of, for example, a photopolymer material. The material forming the first diffraction grating member and the second diffraction grating member, which are reflective volume hologram diffraction gratings, and the basic structure thereof may be the same as those of the reflective volume hologram diffraction grating according to the related art. The reflective volume hologram diffraction grating means a hologram diffraction grating that diffracts and reflects only +1-order diffracted light. Interference fringes are formed in the diffraction grating member from the inside to the surface thereof. However, a method of forming the interference fringes may be the same as a forming method according to the related art. Specifically, for example, a member (for example, a photopolymer material) forming the diffraction grating member may be irradiated with object light in a first predetermined direction and may be simultaneously irradiated with reference light in a second predetermined direction, and interference fringes formed by the object light and the reference light may be recorded in the member forming the diffraction grating member. The first predetermined direction, the second predetermined direction, and the wavelengths of the object light and the reference light may be appropriately selected to obtain desired pitched between the interference fringes and the desired inclination angle (slant angle) of the interference fringes on the surface of the diffraction grating member. The slant angle of the interference fringes means the angle formed between the surface of the diffraction grating member (or the diffraction grating layer) and the interference fringes. When each of the first diffraction grating member and the second diffraction grating member has a laminated structure of P diffraction grating layers, which are reflective volume hologram diffraction gratings, the P diffraction grating layers may be individually formed and laminated (bonded) with, for example, an ultraviolet-curable resin adhesive, thereby obtaining the laminate of the P diffraction grating layers. Alternatively, one layer diffraction grating layer may be formed using an adhesive photopolymer material, and an adhesive photopolymer material may be sequentially attached thereon to manufacture the diffraction grating layers, thereby forming the P diffraction grating layers.

Alternatively, in the image display device according to the embodiment of the present disclosure, the optical device may be a semi-transmissive mirror on which light emitted from the image forming device is incident and from which light is emitted to the pupil of the observer. In addition, light emitted from the image forming device may propagate through air and may be incident on the semi-transmissive mirror. For example, light may propagate in a transparent member (specifically, a member that is made of the same material as that forming the light guide plate, which will be described below), such as a glass plate or a plastic plate, and may be incident on the semi-transmissive mirror. The semi-transmissive mirror may be attached to the image forming device through the transparent member, or the semi-transmissive mirror may be attached to the image forming device through a member which is different from the transparent member.

In the image display device according to the embodiment of the present disclosure including the above-mentioned various preferred embodiments and structures, the image forming device may include a plurality of pixels which are arranged in a two-dimensional matrix. For convenience of explanation, the configuration of the image forming device is referred to as an "image forming device according to a first configuration".

Examples of the image forming device according to the first configuration may include: an image forming device including a reflective spatial light modulation device and a light source; an image forming device including a transmissive spatial light modulation device and a light source; and an image forming device including light emitting devices, such as organic EL (Electro Luminescence) devices, inorganic EL devices, or light emitting diodes (LEDs). Among the above-described image forming devices, the image forming device including the reflective spatial light modulation device and the light source is preferable. Examples of the spatial light modulation device may include a light valve, for example, a transmissive or reflective liquid crystal display device, such as an LCOS (Liquid Crystal On Silicon), and a digital micromirror device (DMD). A light emitting device may be used as an example of the light source. Furthermore, the reflective spatial light modulation device may include a liquid crystal display device and a polarizing beam splitter that reflects a portion of light emitted from the light source and guides the light to the liquid crystal display device, and transmits a portion of the light reflected by the liquid crystal display device to be guided to an optical system. Examples of the light emitting device forming the light source may include a red light emitting device, a green light emitting device, a blue light emitting device, and a white light emitting device. Alternatively, red light, green light, and blue light emitted from the red light emitting device, the green light emitting device, and the blue light emitting device may be mixed with each other using a light pipe and the luminance of the mixed light may be uniformized, thereby obtaining white light. Examples of the light emitting device may include a semiconductor laser device, a solid-state laser, and an LED. The number of pixels may be determined on the basis of the specifications required for the image display device. Specifically, examples of the number of pixels may include 320×240, 432×240, 640×480, 1024×768, and 1920×1080.

Alternatively, in the image display device according to the embodiment of the present disclosure including the above-mentioned preferred embodiments and structures, the image forming device may include a light source and a scanning unit that performs scanning with parallel light emitted from the light source. For convenience of explanation, the configuration of the image forming device is referred to as an "image forming device according to a second configuration".

A light emitting device may be given as an example of the light source of the image forming device according to the second configuration. Specifically, a red light emitting device, a green light emitting device, a blue light emitting device, and a white light emitting device may be given as examples of the light source. Alternatively, red light, green light, and blue light emitted from the red light emitting device, the green light emitting device, and the blue light emitting device may be mixed with each other using a light pipe and the luminance of the mixed light may be uniformized, thereby obtaining white light. A semiconductor laser device, a solid-state laser, and an LED may be given as examples of the light emitting device. The number of pixels (virtual pixels) in the image forming device according to the second configuration may be determined on the basis of the specifications required for the image display device. For example, specifically, the number of pixels (virtual pixels) may be 320×240, 432×240, 640×480, 1024×768, and 1920×1080. In addition, in the display of a color image, when the light source includes a red light emitting device, a green light emitting device, and a blue light emitting device, it is preferable to use a cross prism for color composition. Examples of the scanning unit may include MEMS (Micro Electro Mechanical Systems) including a micromirror that can be rotated in a two-dimensional direction and a galvanomirror, which perform horizontal scanning and vertical scanning with light emitted from the light source.

In the image forming device according to the first configuration or the image forming device according to the second configuration, light that is changed to a plurality of parallel light beams by an optical system (an optical system that emits parallel light and is referred to as a "parallel light emission optical system" in some cases; specifically, for example, a collimator optical system or a relay optical system) is incident on the light guide plate. However, requirements for the parallel light beams are based on a need that light wave-front information when light is incident on the light guide plate is maintained after the light is emitted from the light guide plate through the first deflection unit and the second deflection unit. In order to generate a plurality of parallel light beams, specifically, for example, a light emitting unit of the image forming device may be disposed at a place (position) corresponding to the focal length of the parallel light emission optical system. The parallel light emission optical system has a function of converting the positional information of the pixel into angular information in the optical system of the optical device. An example of the parallel light emission optical system may be an optical system which has a positive optical power as a whole and includes a convex lens, a concave lens, a free-form surface prism, and a hologram lens or a combination thereof. A light shielding member having an opening portion may be provided between the parallel light emission optical system and the light guide plate to prevent undesirable light emitted from the parallel light emission optical system from being incident on the light guide plate.

The light guide plate has two parallel surfaces (first and second surfaces) that extend in parallel to the axis line (X-axis) of the light guide plate. When a surface of the light guide plate on which light is incident is referred to as a light guide plate incident surface and a surface of the light guide plate from which light is emitted is referred to as a light guide plate emission surface, the light guide plate incident surface and the light guide plate emission surface may be formed by the first face, the light guide plate incident surface may be formed by the first surface, and the light guide plate emission surface may be formed by the second surface. The light guide plate may be made of glass including quartz glass or optical glass, such as BK7, and a plastic material (for example, PMMA, a polycarbonate resin, an acrylic resin, an amorphous polypropylene-based resin, or a styrene-based resin including an AS resin). The shape of the light guide plate is not limited to a flat plate, but the light guide plate may have a curved shape.

In the display apparatus according to the embodiment of the present disclosure, the frame may include a front portion that is arranged in front of the observer and two temple portions that are pivotally attached to both ends of the front portion through hinges. A temple tip cover portion is attached to the tip of each temple portion. The image display device is attached to the frame. Specifically, the image forming device may be attached to, for example, the temple portion. The front portion and the two temple portions may be integrally formed. That is, in the entire structure of the display apparatus according to the embodiment of the present disclosure, the frame has substantially the same structure as general glasses. The frame including a pad may be made of the same material as that forming the general glasses. For example, the frame is made of metal, alloys, plastic, and combinations thereof. The front portion may be attached to a nose pad. That is, in the entire structure of the display apparatus according to the embodiment of the present disclosure, an assembly of the frame and the nose pad has substantially the same structure as the general eyeglasses except that there is no rim. The nose pad may have a known configuration and structure.

In the display apparatus according to the embodiment of the present disclosure, in term of the design or ease of mounting, it is desirable that wiring lines (for example, signal lines and power lines) from one or two image forming devices extend to from the tip of the temple tip cover portion to the outside through the temple portions and the temple tip cover portion and be connected to a control device (a control circuit or a control unit). Furthermore, each image forming device may include a headphone portion, and a wiring line for the headphone portion from each image forming device may extend from the tip of the temple tip cover portion to the headphone portion through the temple portion and the temple tip cover portion. Examples of the headphone portion may include an inner-ear-type headphone portion and a canal-type headphone portion. Specifically, it is preferable that the wiring line for the headphone portion extend from the tip of the temple tip cover portion to the headphone portion so as to go around the rear of the auricle (external ear). In addition, an imaging device may be attached to the center of the front portion. Specifically, the imaging device includes a solid-state imaging device, which is a CCD or a CMOS sensor, and a lens. Wiring lines from the imaging device may be connected to one image display device (or the image forming device) through, for example, the front portion. Furthermore, the wiring lines may be included in wiring lines extending from the image display device (or the image forming device).

Modifications of the display apparatus according to the embodiment of the present disclosure including the above-mentioned various embodiments and structures will be described below.

However, in a case in which the display apparatus includes an image display device for the right eye and an image display device for the left eye which are attached to the frame and the observer views an overlap image of an external image and an image, such as a caption displayed on the image display device, when there is a large difference between the convergence angle (the intersection angle between the horizontal plane and a beam, which holds true for the following description) of the external image (real image) and the convergence angle of the image (virtual image displayed on the image display device), the observer is fatigued. That is, it is necessary to adjust the convergence angle depending on the observation position of the observer relative to an observation target, such as a theater or a screen.

The visual cells of the human eyes include two kinds of cells, that is, pyramidal cells and rod cells. The pyramidal cells capable of acquiring information with high resolution are distributed at the central fovea with high density, and eyesight is good at that position. On the other hand, it has been known that eyesight in the vicinity of the retina in which the rod cells are distributed is less than that at the center of the retina. Therefore, eyesight is good at a portion at which the observer gazes, but is poor in the vicinity of that portion. When an image, such as a caption, overlaps the external image and the distance between the display positions of the external image at which the observer gazes and the displayed image is long, it is difficult to view the image. On the contrary, when the observer gazes at the displayed image, it is difficult to view the external image. For example, when the position of an actor who speaks lines on the stage is distant from the display position of a caption of the lines and the positions overlap each other, the above-mentioned problems arise.

When the color of the external image is close to the color of the displayed image, such as a caption, or when the external image is complicated or fine (in other words, when the spatial frequency of the external image is high), it is difficult to view the image. For example, Japanese Patent No. 3744984 discloses a means for solving the problems. In plays and movies, the actors do not constantly speak the lines. When the means disclosed in Japanese Patent No. 3744984 is applied to caption display, the caption is constantly displayed on the information display device, which results in an increase in the power consumption of the information display device.

Therefore, in order to optimize the convergence angle depending on the observation position of the observer relative to an observation target, in the display apparatus including two image display devices for the left and right eyes which are attached to the frame, an image signal to the image forming device forming at least one of the image display devices may be controlled to adjust the convergence angle depending on the observation position of the observer. For convenience, such a display apparatus is referred to as a "1A-th display apparatus according to the embodiment of the present disclosure".

In the 1A-th display apparatus according to the embodiment of the present disclosure or 2A-th to 2D-th display apparatuses according to the embodiments of the present disclosure, which will be described below, the convergence angle is adjusted depending on the observation position of the observer. That is, the convergence angle is adjusted according to the distance from the display apparatus to the observation target. In this way, the distance between the observation target and the observer (audience) can be equal to the virtual image distance of the image displayed by the image display device, or the distance can be as equal to the virtual image distance as possible. Therefore, the observer (audience) who views the observation target can naturally view (observe) the image displayed by the image display device, with little change or modification in the focus. As a result, the observer is less likely to be fatigued. In other words, as long as this state is achieved, the distance between the observation target and the observer (audience) is equal to the virtual image distance of the image displayed by the image display device.

In order to optimize the display position in the display apparatus depending on the observation position of the observer with respect to the observation target, in the display apparatus including two image display devices for the left and right eyes which are attached to the frame, the input of the image signal to the image forming device forming at least one of the image display devices is controlled to adjust the position of the image displayed on the optical device forming the at least one image display device depending on the observation position of the observer. For convenience, such a display apparatus is referred to as a "1B-th display apparatus according to an embodiment of the present disclosure".

In the 1B-th display apparatus according to the embodiment of the present disclosure, the position of the image displayed on the optical device is adjusted depending on the observation position of the observer. Therefore, when the observer views the image overlapped with the external image, the external image at which the observer gazes is not far away from the display position of the image and it is possible to easily view the image.

In order to achieve a display apparatus capable of reducing energy consumption, after a predetermined period of time has elapsed from the input of the image signal to the image forming device, the image forming device stops the formation of an image. For convenience, such a display apparatus is referred to a "1C-th display apparatus according to an embodiment of the present disclosure".

In the 1C-th display apparatus according to the embodiment of the present disclosure, after a predetermined period of time has elapsed from the input of the image signal to the image forming device, the image forming device stops the formation of the image. That is, after a predetermined period of time has elapsed, the operation mode of the display apparatus is changed to the power saving mode, or the standby and idle mode. Therefore, it is possible to prevent the unnecessary power consumption of the display apparatus.

Alternatively, in order to optimize the convergence angle depending on the observation position of the observer with respect to the observation target, in the display apparatus including two image display devices for the left and right eyes which are attached to the frame, each of the image display devices further includes an optical system (parallel light emission optical system) that converts light emitted from the image forming device into parallel light. At least one of the image display devices (that is, the image display device for the right eye, the image display device for the left eye, or the two image display devices for the right and left eyes, which holds for the following description) further includes a moving device that moves the optical axis of the image forming device and the optical axis of the optical system in the horizontal direction relative to each other. The moving device moves the optical axis of the image forming device and the optical axis of the optical system in the horizontal direction relative to each other, depending on the observation position of the observer, thereby adjusting the convergence angle. For convenience, such a display apparatus is referred to as a "2A-th display apparatus according to an embodiment of the present disclosure".

Alternatively, in order to optimize the convergence angle depending on the observation position of the observer with respect to the observation target, in the display apparatus including two image display devices for the left and right eyes which are attached to the frame, each of the image display devices further includes an optical system (parallel light emission optical system) that converts light emitted from the image forming device into parallel light. At least one of the image display devices further includes a rotating device that rotates the image forming device and the optical system. The rotating device rotates the image forming device and the optical system, depending on the observation position of the observer, to change the incident angle of the parallel light which is emitted from the optical system and is then incident on the optical device with respect to the optical device, thereby adjusting the convergence angle. For convenience, such a display apparatus is referred to as a "2B-th display apparatus according to an embodiment of the present disclosure".

Alternatively, in order to optimize the convergence angle depending on the observation position of the observer with respect to the observation target, in the display apparatus including two image display devices for the left and right eyes which are attached to the frame, the optical system forming at least one of the image display devices includes a liquid lens and operates the liquid lens, depending on the observation position of the observer, thereby adjusting the convergence angle. For convenience, such a display apparatus is referred to as a "2C-th display apparatus according to an embodiment of the present disclosure".

Alternatively, in order to optimize the convergence angle depending on the observation position of the observer with respect to the observation target, in the display apparatus including two image display devices for the left and right eyes which are attached to the frame, the optical system forming at least one of the image display devices includes a liquid prism and operates the liquid prism, depending on the observation position of the observer, thereby adjusting the convergence angle. For convenience, such a display apparatus is referred to as a "2D-th display apparatus according to an embodiment of the present disclosure".

In the 1A-th display apparatus or the 1B-th display apparatus according to the embodiment of the present disclosure, the input of the image signal to the image forming device forming at least one of the image display devices may be controlled to achieve an arbitrary combination of the movement of the image displayed on the optical device forming the at least one image display device in the horizontal direction, the movement thereof in the vertical direction, and the rotation thereof. In the movement of the image, for example, a non-display region for moving the image may be provided in the optical device.

In the 2A-th to 2D-th display apparatuses according to the embodiments of the present disclosure, the input of the image signal to the image forming device forming at least one of the image display devices may be controlled to adjust the convergence angle. The input of the image signal to the image forming device forming at least one of the image display devices may be controlled to achieve an arbitrary combination of the movement of the image displayed on the optical device forming the at least one image display device in the horizontal direction, the movement thereof in the vertical direction, and the rotation thereof. In the movement of the image, for example, a non-display region for moving the image may be provided in the optical device. As such, when the position of the image displayed on the optical device forming at least one of the image display devices is controlled to adjust the optical positions of the two image display devices, specifically, the position of the image displayed on the optical device forming at least one of the image display devices may be controlled such that the images displayed by the image display device for the left eye and the image display device for the right eye coincide with each other at a desired virtual image distance or a desired virtual image position. Specifically, the observer may wear the display apparatus, and a display position correcting signal may be added to the original image signal such that images displayed by the image display device for the left eye and the image display device for the right eye coincide with each other at a desired virtual image distance or a desired virtual image position. In addition, the display position correcting signal may be stored in the display apparatus (specifically, a control device included in the display apparatus). The use of this structure makes it possible to adjust the position of the image displayed on the optical device depending on the observation position of the observer. When the observer views the image overlapping an external image, the external image at which the observer gazes is not away from the display position of the image. Therefore, it is possible to easily view the image.

In the 1A-th display apparatus or the 1B-th display apparatus according to the embodiment of the present disclosure including the above-mentioned preferred embodiments, in addition to the image signal input to the image forming device, information (hereinafter, referred to as "observer observation position information") about the observation position of the observer may be transmitted from the outside to the display apparatus, or the display apparatus may further include a position measuring unit that measures the observation position of the observer.

In the 2A-th to 2D-th display apparatuses according to the embodiments of the present disclosure including the above-mentioned preferred embodiments, in addition to the image signal input to the image forming device, the observer observation position information may be given to the display apparatus in advance. Alternatively, the observer observation position information may be transmitted from the outside to the display apparatus, or the display apparatus may further include a position measuring unit that measures the observation position of the observer.

In the structure in which the observer observation position information is transmitted from the outside to the display apparatus, the observer observation position information may be wirelessly transmitted to the display apparatus (specifically, the control device included in the display apparatus). In the structure in which the display apparatus further includes the position measuring unit that measure the observation position of the observer, examples of the position measuring unit include, specifically, a camera or an imaging apparatus with an auto focus function (for example, a camera or an imaging apparatus including an active distance measuring device which radiates infrared rays or ultrasonic waves to an observation target and detects the distance on the basis of the time until a reflected wave returns or the radiation angle, or a passive distance measuring device) and a distance measuring device for a camera with an auto focus function (an active distance measuring device). Alternatively, a button or a switch may be provided in the display apparatus to manually set the distance from the display apparatus to the observation target. Alternatively, the observer observation position information may be set in the display apparatus in advance. Alternatively, a personal computer may give the observer observation position information to the display apparatus. For example, appropriate means and method may be used to read seat information or theater information (for example, hall information or theater information, which holds for the following description) which is printed as barcodes on the ticket, or seat information or theater information included in ticket information displayed on the mobile phone, and an appropriate means may be used to give the observer observation position information based on the seat information or theater information to the display apparatus.

In the 1C-th display apparatus according to the embodiment of the present disclosure, in order to stop the formation of the image by the image forming device, that is, in order to change the operation mode of the display apparatus to the power saving mode or the standby and idle mode (hereinafter, in some cases, these modes are generically referred to as, for example, "power saving mode and the like"), for example, a signal indicating the image display time of the image display device or a signal for instructing the image forming device to stop the formation of the image may be added to the image signal. Examples of the predetermined period of time include the time required for a normal person to read the caption displayed on the image forming device and a caption display time which is determined by the length of lines in advance.

In the 2A-th to 2D-th display apparatuses according to the embodiments of the present disclosure including the above-mentioned preferred embodiments, after a predetermined period of time has elapsed from the input of the image signal to the image forming device, the image forming device may stop the formation of the image. In this way, after a predetermined period of time has elapsed, the operation mode of the display apparatus can be changed to the power saving mode, or the standby and idle mode. Therefore, it is possible to prevent the unnecessary power and energy consumption of the display apparatus.

In the 1A-th to 1C-th display apparatuses and the 2A-th to 2D-th display apparatuses according to the embodiments of the present disclosure including the above-mentioned various preferred embodiments, in addition to the image signal input to the image forming device, a brightness signal of the image to be displayed on the optical device may be transmitted from the outside to the display apparatus. In this structure, the brightness signal may be wirelessly transmitted from the outside to the display apparatus.

In the 1A-th to 1C-th display apparatuses and the 2A-th to 2D-th display apparatuses according to the embodiments of the present disclosure including the above-mentioned various preferred embodiments, the image which is displayed on the optical device on the basis of the image signal includes characters. An image signal (in some cases, which is referred to as "character data") for displaying characters as an image may be digital data and may be created in advance by, for example, an operator or on the basis of computer processing. The format of the character data may be appropriately selected, depending on the display apparatus or system used. For example, the character data may be text data including character strings or image data including character strings as an image.

In the 1A-th to 1C-th display apparatuses and the 2A-th to 2D-th display apparatuses according to the embodiment of the present disclosure, in order to reduce the pupil fatigue of the observer caused by the continuous view of the image (for example, a caption or a virtual image) displayed at a predetermined position, the positions (image positions) of the images formed by two optical devices or the distances (image distance) of the images (for example, captions or virtual images) formed by the two optical devices from the two optical devices may be changed over time. The change in the position or distance over time means that the position of the image in the horizontal direction is changed once every 5 minutes to 10 minutes. For example, the change in the position or distance over time means that the position of the image is changed by a distance corresponding to +2 pixels or −1 pixel in the image forming device for 1 to 3 minutes and then returns to the original position.

In the 1A-th display apparatus or the 1B-th display apparatus according to the embodiment of the present disclosure, the observer may wear the display apparatus and the display position correction signal may be added to the original image signal such that the images displayed by the image display device for the left eye and the image display device for the right eye coincide with each other at a desired virtual image distance or a desired virtual image position. The display position correction signal may be stored in the display apparatus (specifically, the control device included in the display apparatus), and an image signal in which the display position correction signal is added to the original image signal may be transmitted to the display apparatus. In the 1A-th to 1C-th display apparatuses and the 2A-th to 2D-th display apparatuses according to the embodiments of the present disclosure including the above-mentioned various preferred embodiments, the image signal may be wirelessly transmitted to the display apparatus. In this structure, for example, the control device receives the image signal and performs a process for image display. Alternatively, the image signal may be stored in the display apparatus (control device). In this case, the display position correction signal may be transmitted to the display apparatus. The position of the image displayed by the optical device forming at least one of the image display devices is controlled to adjust the optical positions of the two image display devices. Specifically, the position of the image displayed on the optical device forming at least one of the image display devices may be controlled such that the images displayed by the image display device for the left eye and the image display device for the right eye coincide with each other at a desired virtual image distance or a desired virtual image position. The control device (a control circuit or a control unit) may be a known circuit.

In the 1A-th to 1C-th display apparatuses and the 2A-th to 2D-th display apparatuses according to embodiments of the present disclosure including the above-mentioned various preferred embodiments and structures, the control device included in the display apparatus may include a storage unit. The storage unit may store a data group including a plurality of image signals (for example, character data) for image display. A data identification code may be given to each of the image signals forming the data group. A designation identification code and display time information may be transmitted from the outside to the control device at a predetermined time interval. The control device may read the image signal with the data identification code identical to the transmitted designation identification code from the storage unit, and displays an image based on the image signal on the display apparatus for a time corresponding to the transmitted display time information. The "time corresponding to the display time information" may be the "predetermined period of time" in the 1C-th display apparatus according to an embodiment of the present disclosure. In some cases, for convenience, this structure is referred to as a "3A-th display apparatus according to an embodiment of the present disclosure".

In the 3A-th display apparatus according to the embodiment of the present disclosure, the designation identification code and the display time information are transmitted from the outside to the control device at a predetermined time interval. The control device reads the image signal with the data identification code identical to the transmitted designation identification code from the storage unit, and displays the image based on the image signal on the display apparatus for a time corresponding to the transmitted display time information. Therefore, even when the control device fails to receive the designation identification code and/or the display time information transmitted from the outside for any reason, it can try to receive the designation identification code and the display time information repeatedly or again. Therefore, it is possible to reliably receive the designation identification code and the display time information. As a result, for example, even when a plurality of display apparatuses receive the designation identification code and the display time information, they can reliably display the same image at the same time, and it is possible to reliably prevent the problem that it is difficult for the display apparatus to display the image.

Alternatively, in the 1A-th to 1C-th display apparatuses and the 2A-th to 2D-th display apparatuses according to the embodiments of the present disclosure including the above-mentioned various preferred embodiments and structures, the control device included in the display apparatus may include a storage unit. The storage unit may store a data group including a plurality of image signals (for example, character data) for image display. A data identification code is given to each of the image signals forming the data group. Each of the image signals may include a plurality of different size display data items with different display sizes. The designation identification code may be transmitted from the outside to the control device. The control device may read, from the storage unit, one of the plurality of different size display data items in the image signal with the data identification code identical to the transmitted designation identification code, depending on the distance between the observation target and the display apparatus, and display the image based on the one different size display data item on the display apparatus. For convenience, in some cases, this structure is referred to as a "3B-th display apparatus according to an embodiment of the present disclosure".

In the 3B-th display apparatus according to the embodiment of the present disclosure, the control device reads, from the storage unit, one of the plurality of different size display data items in the image signal with the data identification code identical to the transmitted designation identification code, depending on the distance between the observation target and the display apparatus, and displays the image based on the one different size display data item on the image display device. Therefore, a mismatch between the visual size of the observation target and the size of the image is less likely to occur.

Alternatively, in the 1A-th to 1C-th display apparatuses and the 2A-th to 2D-th display apparatuses according to the embodiments of the present disclosure including the above-mentioned various preferred embodiments and structures, the control device included in the display apparatus may include a storage unit. The storage unit may store a data group including a plurality of image signals (for example, character data) for image display. A data identification code is given to each of the image signals forming the data group. Each of the image signals may include a plurality of different language display data items which are displayed in different languages. The designation identification code may be transmitted from the outside to the control device. The control device may read, from the storage unit, one of the plurality of different language display data items in the image signal with the data identification code identical to the transmitted designation identification code, and display the image based on the different language display data item on the display apparatus. For convenience, in some cases, this structure is referred to as a "3C-th display apparatus according to an embodiment of the present disclosure". As a method of selecting the display language, for example, a method may be used in which a button or a switch is provided in the control device and is manually used to select the display language.

In the 3C-th display apparatus according to the embodiment of the present disclosure, the control device reads, from the storage unit, one of the plurality of different language display data items in the image signal with the data identification code identical to the transmitted designation identification code, and displays the image based on the one different language display data item on the display apparatus. Therefore, it is possible to easily display the image in the language which is used by the observer (audience).

Alternatively, in the 1A-th to 1C-th display apparatuses and the 2A-th to 2D-th display apparatuses according to the embodiments of the present disclosure including the above-mentioned various preferred embodiments and structures, the control device included in the display apparatus may include a storage unit. The storage unit may store a data group including a plurality of image signals (for example, character data) for image display. A data identification code may be given to each of the image signals forming the data group. The designation identification code may be transmitted from the outside to the control device. The control device may read, from the storage unit, the image signal with the data identification code identical to the transmitted designation identification code and perform data processing depending on the distance between the observation target and the display apparatus, thereby displaying an image based on the image signal (image signal subjected to data processing) on the display apparatus while the convergence angle is controlled. For convenience, in some cases, this structure is referred to as a "3D-th display apparatus according to an embodiment of the present disclosure". Image processing may be performed on the image signal which is input to the image forming device forming at least one of the image display devices on the basis of the distance from the display apparatus to the observation target.

In the 3D-th display apparatus according to the embodiment of the present disclosure, the convergence angle is adjusted according to the distance from the display apparatus to the observation target. In this way, the distance between the observation target and the observer (audience) can be equal to the virtual image distance of the image displayed by the image display device, or the distance can be as equal to the virtual image distance as possible. Therefore, the observer (audience) who views the observation target can naturally view (observe) the image displayed by the image display device, with little change or modification in the focus.

In the 2A-th to 2D-th display apparatuses according to the embodiments of the present disclosure including the above-mentioned various preferred embodiments and structures, the size of a display screen (image display region) displayed on the optical device, the angle of view of the display screen (image display region), and the resolution of the display screen may be changed depending on the observation position of the observer or the distance between the observation target and the display apparatus. For convenience, in some cases, this structure is referred to as a "2E-th display apparatus according to the embodiment of the present disclosure".

The 2A-th to 2E-th display apparatuses according to the embodiments of the present disclosure may be appropriately combined with each other. In addition, the 3A-th to 3D-th display apparatuses according to the embodiments of the present disclosure may be appropriately combined with each other. In the 2A-th to 2E-th display apparatuses and the 3A-th to 3D-th display apparatuses according to the embodiments of the present disclosure, the control device may be a known circuit, the storage unit may be a known storage unit, such as, a memory card. The designation identification code and the display time information may be wirelessly transmitted from a transmitting device. The transmitting device may include a display apparatus, and the display apparatus may display the designation identification code, the data group, and each image signal or the total display time of each display data item. However, the present disclosure is not limited thereto. The information may be transmitted by wire. The transmitting device for transmitting the designation identification code to the control device may be a known transmitting device, and the display apparatus provided in the transmitting device may be a known display apparatus.

The 2A-th display apparatus according to the embodiment of the present disclosure operates the moving device, depending on the observation position of the observer. The 2B-th display apparatus according to the embodiment of the present disclosure operates the rotating device, depending on the observation position of the observer. The 2C-th display apparatus according to the embodiment of the present disclosure operates the liquid lens, depending on the observation position of the observer. The 2D-th display apparatus according to the embodiment of the present disclosure operates the liquid prism, depending on the observation position of the observer. These operations are controlled by control signals from the control device on the basis of the observer observation position information.

In the 2A-th display apparatus according to the embodiment of the present disclosure, the moving device moves the optical axis of the image forming device and the optical axis of the optical system relative to each other in the horizontal direction (X-axis direction). Specifically, for example, the positional relationship between the optical axis of the image forming device and the optical axis of the optical system in one of the image display devices may be fixed, and the positions of the optical axis of the image forming device and the optical axis of the optical system in the other image display device may be moved relative to each other in the horizontal direction (X-axis direction). Alternatively, the positions of the optical axis of the image forming device and the optical axis of the optical system in each of the two image display devices may be moved relative to each other in the horizontal direction (X-axis direction). In this structure, the incident angle (the angle formed between a central incident beam, which will be described below, and the YZ plane, which is referred to as a "YZ plane incident angle") of parallel light which is emitted from the optical system and is then incident on the optical device with respect to the optical device is changed. In this structure, one of the image forming device and the optical system may be placed on a guide portion for movement, which is, for example, a rack gear portion, and one of the image forming device and the optical system may be moved on the guide portion for movement by a motor and a pinion gear. Alternatively, one of the image forming device and the optical system may be placed on the guide portion for movement and one of the image forming device and the optical system may be moved on the guide portion for movement by a piezoelectric device or an ultrasonic motor.

In the 2B-th display apparatus according to the embodiment of the present disclosure, the rotating device rotates the image forming device and the optical system. Specifically, the positional relationship between the optical axis of the image forming device and the optical axis of the optical system in each of the two image display devices may be fixed and at least one of the image display devices may be rotated about the Z-axis as the axis of rotation by a piezoelectric device, a motor, or an ultrasonic motor. In this structure, the YZ plane incident angle of parallel light which is emitted from the optical system and is then incident on the optical device with respect to the optical device is changed.

In the 2C-th display apparatus according to the embodiment of the present disclosure, the liquid lens is operated. However, the liquid lens forming the optical system may be a known liquid lens using an electrowetting phenomenon. The liquid lens can be operated to move the optical axis of the optical system in the horizontal direction (X-axis direction) while the relationship between the optical axis of the optical system and the Y-axis is maintained, or the liquid lens can be operated to change the angle of the optical axis of the optical system with respect to the YZ plane. In this structure, the YZ plane incident angle of parallel light which is emitted from the optical system and is then incident on the optical device with respect to the optical device is changed.

In the 2D-th display apparatus according to the embodiment of the present disclosure, the liquid prism is operated. However, the liquid prism forming a portion of the optical system may be a known liquid prism using the electrowetting phenomenon. The liquid prism can be operated to change the angle of the optical axis of the optical system with respect to the YZ plane. In this structure, the YZ plane incident angle of parallel light which is emitted from the optical system and is then incident on the optical device with respect to the optical device is changed.

The number of data groups is substantially arbitrary, and the number of image signals (for example, character data) forming the data group and the number of display data items forming the image signal (character data) are substantially arbitrary. The data structure of the image signal or the display data may be, for example, text data including character strings or image data having a character string as an image. The display data with different display sizes may be text data including character strings with different font sizes or image data having character strings with different font sizes as an image. The display language for the display data may substantially be arbitrary. Predetermined signal processing may be performed on the image signal or the display data to obtain an image signal.

The designation identification code and the data identification code may be any codes as long as they can identify the image signal. For example, numbers, alphabets, and a combination of the numerals and the alphabets may be used as the designation identification code and the data identification code.

The designation identification code and the display time information are transmitted from the outside to the control device at a predetermined time interval. When the total display time is $T_{total}$ display time information is $T_{Inf}$, and the predetermined time interval is $T_{int}$, $T_{Inf}(m)=T_{total}-(m-1)\times T_{int}$ may be established (where "m" is a positive integer and indicates the number of times the designation identification code and the display time information are transmitted from the outside to the control device). For example, when $T_{total}$ is 10.0 seconds and $T_{int}$=0.1 seconds, the display time information $T_{Inf}(m)$ when the designation identification code and the display time information are transmitted from the outside to the control section for the first time (m=1) is as follows: $T_{int}(1)$=10.0 seconds. In addition, the display time information $T_{Inf}$ (m) when the designation identification code and the display time information are transmitted from the outside to the control section for the second time (m=2) and the eleventh time (m=11) is as follows.

$T_{int}(2)$=9.9 seconds $T_{int}(11)$=9.0 seconds

The image forming device displays the image based on the image signal or one display data item for the time corresponding to the display time information $T_{Inf}(m)$.

When the same designation identification code and different display time information are transmitted from the outside to the control device after the display of the image by the image forming device starts, the control device may ignore the transmitted designation identification code and different display time information and continuously display the image. In this operation, the control device may raise a kind of flag (reception completion flag). When the control device fails to receive the designation identification code and/or the display time information from the outside for the first to (m'-1)-th times for any reason and first succeeds in receiving the designation identification code and the display time information from the outside for the m'-th time, the image forming device may display the image based on the image signal or one display data item for the time corresponding to $T_{Inf}(m')=T_{total}(m'-1)\times T_{int}$.

For example, the first (m=1) transmission of the designation identification code and the display time information may be instructed by the operator, under the control of a computer, or on the basis of the movement of the observation target, a change in the voice from an actor which is the observation target, and a change in the environment of the observation target (for example, a change in illumination and sound).

Beams which are emitted from the center of the image forming device and pass through an image-forming-device-side node of the optical system are referred to as "central beams" and a beam which is vertically incident on the optical device among the central beams is referred to as a "central incident beam". A point of the optical device on which the central incident beam is incident is referred to as an optical device center point. An axis line which passes through the optical device center point and is parallel to the axis direction of the optical device is referred to as the X-axis, and an axis line which passes through the optical device center point and is aligned with the normal line of the optical device is referred to as the Y-axis. In the display apparatus according to the embodiment of the present disclosure, the horizontal direction is parallel to the X-axis and is hereinafter referred to as an "X-axis direction" in some cases. The optical system is arranged between the image forming device and the optical device and converts light emitted from the image forming device into parallel light. A beam which is parallel light converted by the optical system is incident on the optical device, is guided, and is then emitted. In addition, the center of the first deflection unit is referred to as an "optical device center".

In the 1A-th to 1C-th display apparatuses and the 2A-th to 2D-th display apparatuses according to the embodiments of the present disclosure, in the image display device, the intersection angle (θ) between the central incident beam and the XY plane may be other than 0 degree. However, the present disclosure is not limited thereto. In this way, restrictions on the attachment angle of the image display device when the image display device is attached to an attachment portion of a glasses-type frame are reduced. Therefore, it is possible to improve flexibility in the design. In this case, it is preferable that the central incident beam be included in the YZ plane in terms of ease of treatment, setting, and attachment of the image display device. In addition, the optical axis of the optical system may be included in the YZ plane and the intersection angle between the optical axis of the optical system and the XY plane may be other than 0 degrees. Alternatively, the optical axis of the optical system may be parallel to the YZ plane and the XY plane and pass through a position deviating from the center of the image forming device. If the XY plane is identical to the horizontal plane, the intersection angle θ between the central incident beam and the XY plane may be an elevation angle. That is, the central incident beam may travel to the XY plane and collide with a lower part of the XY plane. In this case, it is preferable that the intersection angle between the XY plane and the vertical plane be other than 0 degrees. In addition, it is preferable that the intersection angle between the XY plane and the vertical plane be θ'. The maximum value of θ' is not particularly limited, but it may be, for example, 5 degrees. The horizontal plane includes a line of sight ("horizontal line of sight of an observer") when the observer views an object (for example, the horizontal direction, an object located at an infinite distance, or the horizon) that is located in the horizontal direction and also includes two pupils of the observer that are horizontally positioned. In addition, the vertical plane is perpendicular to the horizontal plane. Alternatively, the angle of the center light beam that is emitted from the optical device and is then incident on the pupil of the observer may be a depression angle when the observer views an object (for example, the horizontal direction, an object located at an infinite distance, or the horizon) that is located in the horizontal direction. The depression angle with respect to the horizontal plane may be, for example, in the range of 5 degrees to 45 degrees.

The display apparatus according to the embodiment of the present disclosure including the above-mentioned various modifications, for example, can be used to display: moving pictures or still pictures; the subtitles of movies; the display of an explanation or closed caption related to a video that is synchronized with the video; and various explanations for an observation target in a play or Kabuki, a Noh play, a Kyogen play, an opera, a music concert, a ballet, various theatrical performances, an amusement park, an art museum, a tourist site, a resort, a tour guide, and the like, and explanations for the content, the state of progress, the background, and the like thereof. In addition, the display apparatus may also serve as a character display apparatus and may be used to display: various explanations, symbols, marks, signs, emblems, designs, and the like in, for example, the driving, operation, maintenance, and disassembly of various apparatus as observation targets; various explanations, symbols, marks, signs, emblems, designs, and the like regarding observation targets, such as persons and articles; and a closed caption. In the play or Kabuki, a Noh play, a Kyogen play, an opera, a music concert, a ballet, various theatrical performances, an amusement park, an art museum, a tourist site, a resort, a tour guide, and the like, the display apparatus may display characters as an image related to an observation target at an appropriate timing. Specifically, for example, an image is displayed by the display apparatus in accordance with the state of progress of a movie or the state of progress of a play, an image signal is transmitted to the display apparatus or a designation identification code is transmitted to the control device by the operation of the operator or under the control of a computer, on the basis of a predetermined schedule or time allocation. In addition, when various explanations related to an observation target, such as various devices, persons, or articles, are displayed, an imaging device may be provided in the display apparatus, the imaging device may capture the image of the observation target, such as various devices, persons, or articles, and the display apparatus may analyze the content of the captured image. In this way, the display apparatus can display various explanations related to the observation target, such as various devices, persons, or articles, which are created in advance. Alternatively, the display apparatus according to the embodiment of the present disclosure may also be used as a stereoscopic display apparatus. In this case, a polarizing plate or polarizing film may be removably attached to the optical device, or a polarizing plate or polarizing film may be adhered to the optical device, if necessary.

As described above, the image signal input to the image forming device includes not only an image signal (for example, character data) but also, for example, luminance data (luminance information), chromaticity data (chromaticity information), or both the luminance data and the chromaticity data of an image to be displayed. The luminance data may correspond to the luminance of a predetermined region including an observation target which is viewed through the optical device, and the chromaticity data may correspond to the chromaticity of the predetermined region including the observation target which is viewed through the optical device. As such, since the image signal includes the luminance data of the image, it is possible to control the luminance (brightness) of a displayed image. Since the image signal includes the chromaticity data of an image, it is possible to control the chromaticity (color) of a displayed image. Since the image signal includes the luminance data and the chromaticity data of an image, it is possible to control the luminance (brightness) and chromaticity (color) of a displayed image. When the luminance data corresponds to the luminance of a predetermined region including the observation target which is viewed through the image display device, the value of the luminance data may be set such that, as the value of the luminance of the predetermined region including the observation target which is viewed through the image display device increases, the value of the luminance of the image increases (in other words, the brightness of a displayed image increases). In addition, when the chromaticity data corresponds to the chromaticity of the predetermined region including the observation target which is viewed through the image display device, the value of the chromaticity data may be set such that the chromaticity of the predetermined region including the observation target which is viewed through the image display device and the chromaticity of the image to be displayed have a substantially complementary relationship therebetween. Complementary colors indicate a combination of colors which are directly opposite to each other in a color circle. A complementary color is complementary to a certain color. For example, the complementary color of red is green, the complementary color of yellow is purple, and the complementary color of blue is orange. Complementary colors are used also with regard to different colors which cause degradation of the saturation to white in the case of light and to black in the case of substance when the colors are mixed at an appropriate ratio. However, the complementarity of the visual effect when the colors are juxtaposed with each other and the complementarity when the colors are mixed are different from each other. The complementary color is also referred to as an antagonistic color, a contrastive color or an opposite color. However, while the opposite color directly indicates a complimentary color that is opposite to the color, the complementary color indicates a range that is slightly wider than that of the opposite color. A combination of complementary colors has a synergetic effect for allowing the colors to be visually distinctive, and this is called harmony of complementary colors.

Example 1

Figure 2:
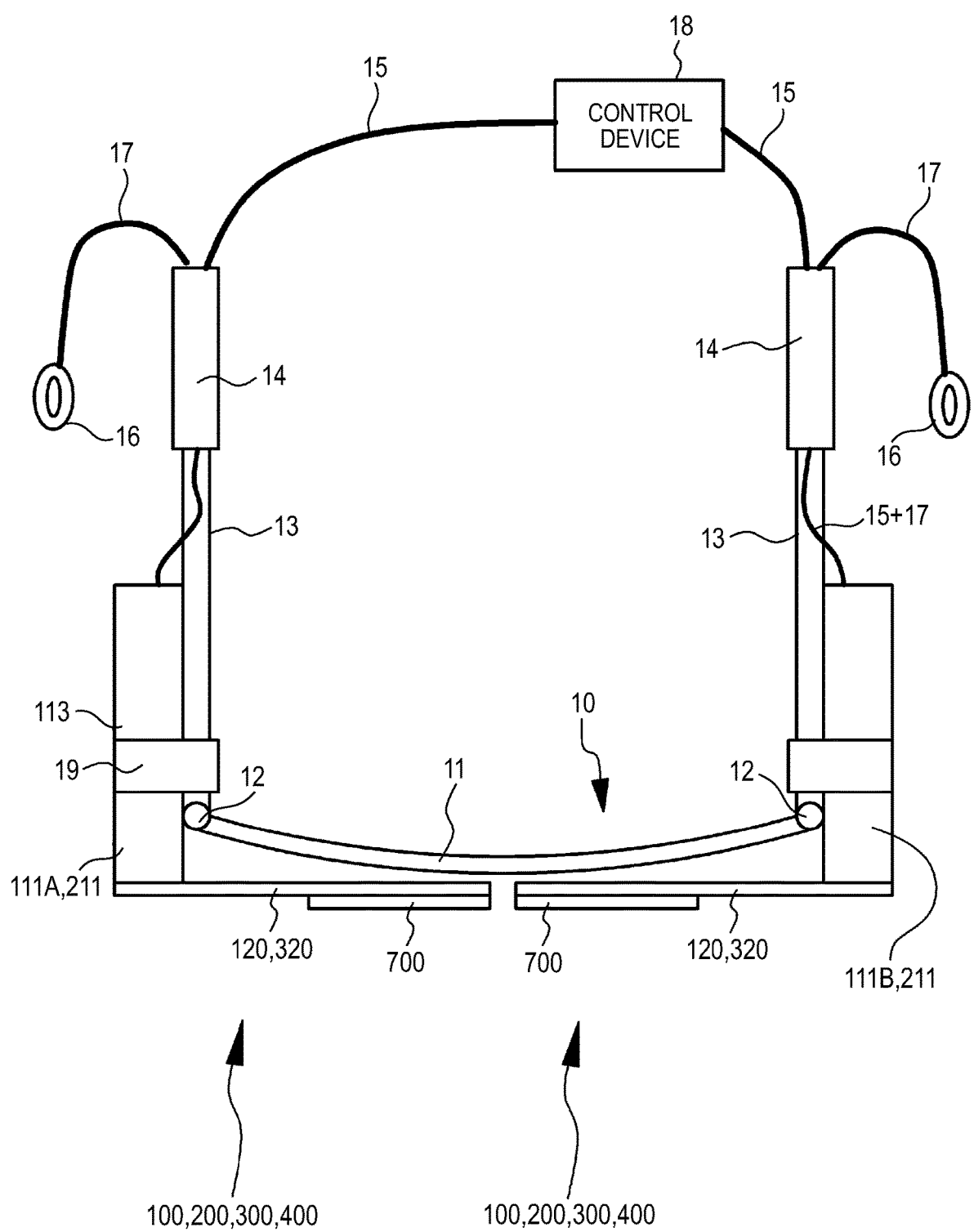
FIG. 2 is a schematic diagram illustrating the display apparatus according to Example 1, as viewed from the upper side.
Figure 3A:
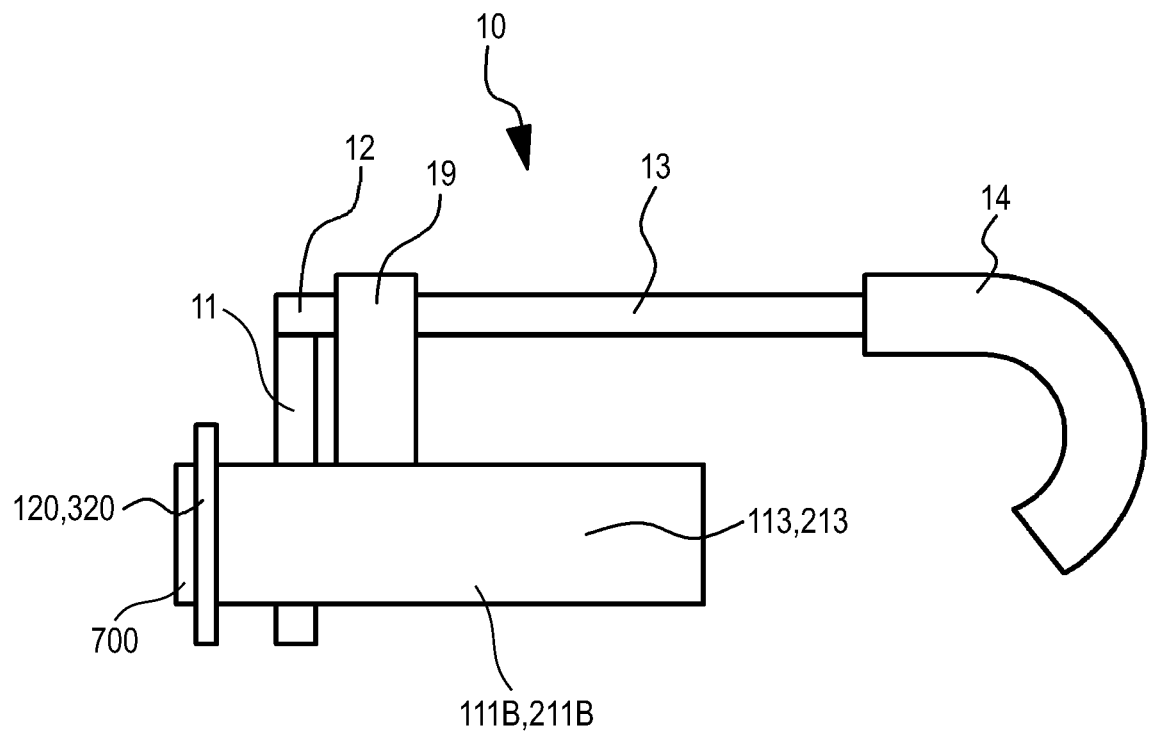
FIG. 3A is a schematic diagram illustrating the display apparatus according to Example 1, as viewed from the side.
Figure 3B:
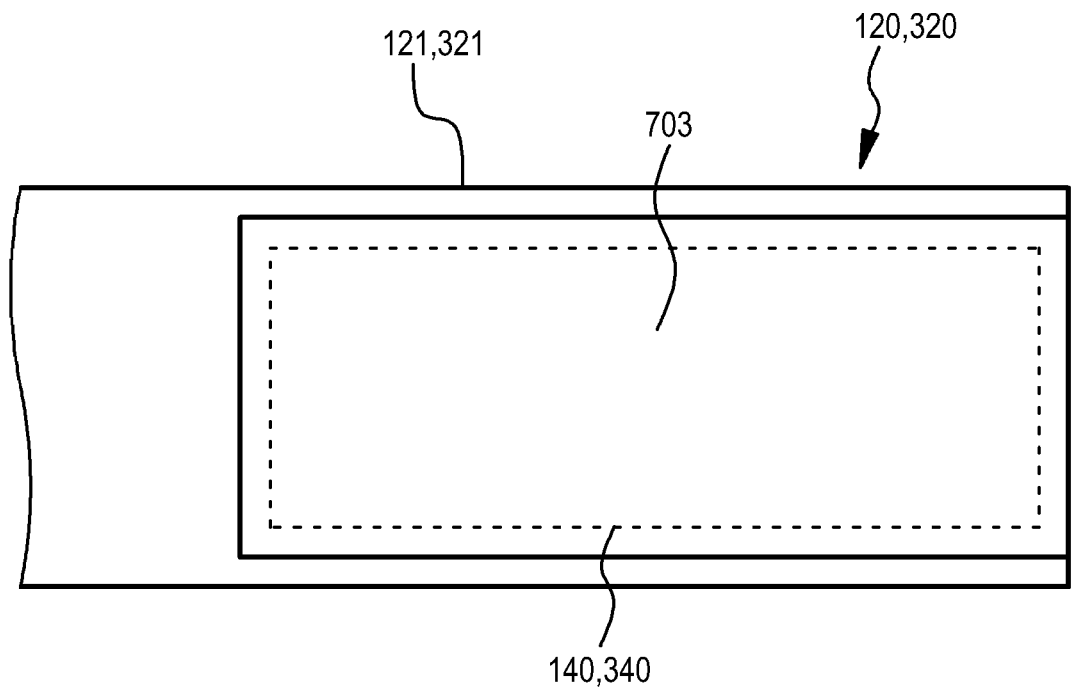
FIG. 3B is a schematic diagram illustrating an optical device and a light control device in the display apparatus according to Example 1, as viewed from the front side.
Figure 4A:
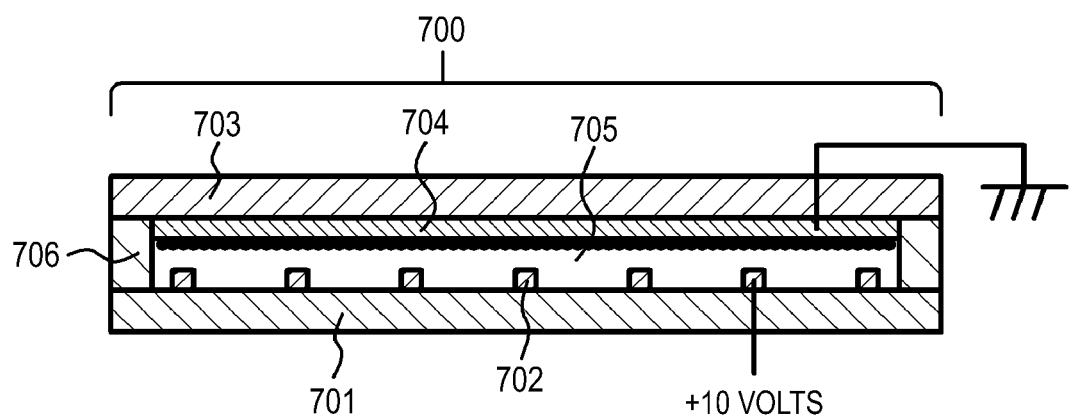
FIGS. 4A and 4B are schematic cross-sectional views illustrating the behavior of the light control device in the display apparatus according to Example 1.
Figure 4B:
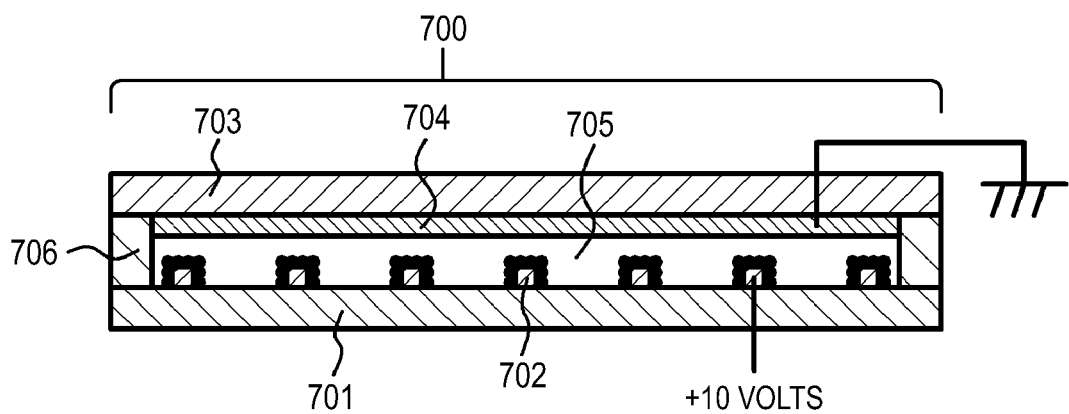

Example 1 relates to a display apparatus according to the first embodiment of the present disclosure. FIG. 1 is a conceptual diagram illustrating an image display device according to Example 1. FIG. 2 is a schematic diagram illustrating the display apparatus (specifically, a head-mounted display (HMD)) according to Example 1, as viewed from the upper side. FIG. 3A is a schematic diagram illustrating the display apparatus, as viewed from the side, and FIG. 3B is a schematic diagram illustrating an optical device and a light control device of the display apparatus, as viewed from the front side. FIGS. 4A and 4B are schematic cross-sectional views illustrating the behavior of the light control device of the display apparatus according to Example 1.

Image display devices 100, 200, 300, 400, and 500 according to Example 1 or Examples 2 to 8, which will be described below, include (A) image forming devices 111 and 211 and (B) optical devices 120, 320, and 520 on which light emitted from the image forming devices 111 and 211 is incident, in which the light is guided, and from which the light is emitted. The Image display devices 100, 200, 300, 400, and 500 further include (C) optical systems (parallel light emission optical systems) 112 and 254 that convert the light emitted from the image forming devices 111 and 211 into parallel light. A beam, which is the parallel light converted by the optical systems 112 and 254, is incident on the optical devices 120, 320, and 520 and is then guided and emitted.

The display apparatus according to Example 1 or each of Examples 2 to 8, which will be described below, includes: (i) a glasses-type frame 10 that is mounted on the head of the observer (for example, the audience); and (ii) an image display device 100, 200, 300, 400, or 500 that is attached to the frame 10. The display apparatus according to the example is, specifically, a both-eyes type including two image display devices. However, the display apparatus may be a one-eye type including one image display device. In addition, the image forming device 111 or 211 displays a monochromatic image.

In Example 1 or Examples 2 to 8, which will be described below, a light control device 700 that adjusts the amount of external light incident from the outside is provided in a region of the optical device 120, 320, or 520 from which light is emitted. Specifically, the light control device 700, which is a kind of optical shutter, is fixed to the optical device 120, 320, or 520 (specifically, a light guide plate 121 or 321 or a semi-transmissive mirror 520) by an adhesive (not shown). In addition, the light control device 700 is arranged in a region of the optical device 120, 320, or 520 which is the opposite side of the observer.

In Example 1, or Examples 2 to 4 and Examples 6 to 8, which will be described below, the optical device 120 or 320 includes (a) a light guide plate 121 or 321 in which incident light propagates while being totally reflected and from which light is emitted; (b) a first deflection unit 130 or 330 that deflects light incident on the light guide plate 121 or 321 so as to be totally reflected in the light guide plate 121 or 321; and (c) a second deflection unit 140 or 340 that deflects the light, which propagates in the light guide plate 121 or 321 while being totally reflected, a plurality of times so as to be emitted from the light guide plate 121 or 321. The second deflection unit 140 or 340 is disposed in the projection image of the light control device 700. The second deflection unit 140 or 340 is covered with one of the substrates forming the light control device 700. The optical device 120 or 320 is a see-through type (semi-transmissive type).

In Example 1, the first deflection unit 130 and the second deflection unit 140 are provided in the light guide plate 121. The first deflection unit 130 reflects light incident on the light guide plate 121 and the second deflection unit 140 transmits and reflects light, which propagates in the light guide plate 121 while being totally reflected, a plurality of times. That is, the first deflection unit 130 functions as a reflecting mirror and the second deflection unit 140 functions as a semi-transmissive mirror. Specifically, the first deflection unit 130 provided in the light guide plate 121 is made of aluminum (Al) and is a light reflecting film (a kind of mirror) that reflects light incident on the light guide plate 121. The second deflection unit 140 provided in the light guide plate 121 is a multi-layer structure in which a plurality of multi-layer dielectric films are laminated. The multi-layer dielectric film includes, for example, a $TiO_2$ film made of a high dielectric constant material and a $SiO_2$ film made of a low dielectric constant material. For example, the multi-layer structure in which a plurality of multi-layer dielectric films are laminated is disclosed in JP-T-2005-521099. In the drawing, six multi-layer dielectric films are shown, but the present disclosure is not limited thereto. A thin piece which is made of the same material as that forming the light guide plate 121 is interposed between the multi-layer dielectric film and the multi-layer dielectric film. The first deflection unit 130 reflects (or diffract) parallel light incident on the light guide plate 121 so as to be totally reflected in the light guide plate 121. The second deflection unit 140 reflects (or diffract) parallel light, which propagates in the light guide plate 121 while being totally reflected, a plurality of times such that parallel light is emitted from the light guide plate 121 to the pupil 21 of the observer.

For the first deflection unit 130, a portion 124 of the light guide plate 121 in which the first deflection unit 130 will be provided may be cut out to form an inclined plane in which the first deflection unit 130 will be formed in the light guide plate 121, a light reflecting film may be formed on the inclined plane by vacuum deposition, and the cut-out portion 124 of the light guide plate 121 may be bonded to the first deflection unit 130. In addition, for the second deflection unit 140, a multi-layer structure in which the same materials (for example, glass) as that forming the light guide plate 121 and multi-layer dielectric films (for example, which may be formed by a vacuum deposition method) are laminated may be manufactured, a portion 125 of the light guide plate 121 in which the second deflection unit 140 will be provided may be cut out to form an inclined plane, the multi-layer structure may be bonded to the inclined plane, and the outer shape may be trimmed by, for example, polishing. Accordingly, an optical device 120 in which the first deflection unit 130 and the second deflection unit 140 are provided in the light guide plate 121 may be obtained.

In Example 1, or Examples 2 to 4 and Examples 6 to 8, which will be described below, the light guide plate 121 or 321 which is made of optical glass or a plastic material includes two parallel surfaces (a first surface 122 or 322 and a second surface 123 or 323) which extend in parallel to the direction (X-axis) in which light propagates in the light guide plate 121 or 321 while being totally reflected. The first surface 122 or 322 is opposite to the second surface 123 or 323. Parallel light is incident on the first surface 122 or 322 corresponding to a light incident surface, propagates in the light guide plate while being totally reflected, and is then emitted from the first surface 122 or 322 corresponding to a light emission surface. However, the present disclosure is not limited thereto. The second surface 123 or 323 may be the light incident surface and the first surface 122 or 322 may be the light emission surface.

In Example 1 or Example 3, which will be described below, the image forming device 111 is the image forming device according to the first configuration and includes a plurality of pixels which are two-dimensionally arranged in a matrix. Specifically, the image forming device 111 includes a reflective spatial light modulating device 150 and a light source 153 which is a light emitting diode emitting white light. The entire image forming device 111 is provided in a housing 113 (represented by a one-dot chain line in FIG. 1). An opening (not shown) is provided in the housing 113 and light is emitted from the optical system (a parallel light emission optical system or a collimating optical system) 112 through the opening. The reflective spatial light modulating device 150 includes a liquid crystal display device (LCD) 151 that is formed by LCOS as a light valve and a polarizing beam splitter 152 that reflects a portion of the light emitted from the light source 153 so as to be guided to the liquid crystal display device 151 and transmits a portion of the light reflected by the liquid crystal display device 151 so as to be guided to the optical system 112. The liquid crystal display device 151 includes a plurality of (for example, 640×480) pixels (liquid crystal cells) which are arranged in a two-dimensional matrix. The polarizing beam splitter 152 has a known configuration and structure. Non-polarized light emitted from the light source 153 collides with the polarizing beam splitter 152. The polarizing beam splitter 152 transmits a P-polarized component so as to be emitted to the outside of the system. On the other hand, an S-polarized component is reflected by the polarizing beam splitter 152 so as to be incident on the liquid crystal display device 151, is reflected in the liquid crystal display device 151, and is then emitted from the liquid crystal display device 151. A large number of P-polarized components are included in a light component emitted from a pixel which displays "white" and a large number of S-polarized components are included in a light component emitted from a pixel which displays "black", among the light components emitted from the liquid crystal display device 151. Therefore, the P-polarized component in the light that is emitted from the liquid crystal display device 151 and then collides with the polarizing beam splitter 152 passes through the polarizing beam splitter 152 and is guided to the optical system 112. On the other hand, the S-polarized component is reflected by the polarizing beam splitter 152 and returns to the light source 153. The optical system 112 is, for example, a convex lens and generates parallel light. Therefore, the image forming device 111 (specifically, the liquid crystal display device 151) is arranged at a place (position) corresponding to the focal length of the optical system 112.

The frame 10 includes a front portion 11 that is arranged in front of the observer, two temple portions 13 that are rotatably attached to both ends of the front portion 11 through hinges 12, and temple tip cover portions (which are also referred to as tip cells, earmuffs, or ear pads) 14 that are attached to the tip of each temple portion 13. In addition, nose pads (not shown) are attached. In other words, basically, the assembly of the frame 10 and the nose pads has substantially the same structure as normal glasses. Furthermore, each housing 113 is removably attached to the temple portion 13 by an attachment member 19. The frame 10 is made of metal or plastic. Each housing 113 may be attached to the temple portion 13 by the attachment member 19 so as not to be removable therefrom. When the observer owns and wears glasses, each housing 113 may be removably attached to the temple portion of the frame of the glasses of the observer by the attachment member 19. In addition, each housing 113 may be attached outside or inside the temple portion 13.

A wiring line (for example, a signal line or a power line) 15 which extends from an image forming device 111A passes through the temple portion 13 and the temple tip cover portion 14, extends from the tip of the temple tip cover portion 14 to the outside, and is connected to a control device (a control circuit or a control unit) 18. Each of the image forming devices 111A and 111B includes a headphone portion 16. A wiring line 17 for the headphone portion that extends from each of the image forming devices 111A and 111B passes through the temple portion 13 and the temple tip cover portion 14 and extends from the leading end of the temple tip cover portion 14 to the headphone portion 16. Specifically, the wiring line 17 for the headphone portion extends from the leading end of the temple tip cover portion 14 to the headphone portion 16 so as to go around the rear side of the auricle (auditory capsule). According to this structure, it is possible to achieve a simple display apparatus, without giving such an impression that the headphone portion 16 or the wiring line 17 for the headphone portion are disposed disorderly.

A preferable color to be imparted to the light control was examined. Specifically, instead of the light control device, a total of 16 kinds of filters, that is, three kinds of color filters (brown, gray, and purple) for sunglasses with visible transmittances 10%, 30%, 50%, and 70% and ND filters were prepared. In practice, images which were prepared in advance were displayed on the optical devices 120, 320, and 520 and it was examined how subjects feel about the images.

Specifically, a moving picture and a text screen were displayed, the above-mentioned 16 kinds of filters were placed on the front surfaces of the optical devices 120, 320, and 520, and the subjects were instructed to select visible transmittance when visibility was perceived to be improved.

The first examination was performed in a situation in which seven subjects observed images on a white wall which was the background. As a result, when the moving picture was observed, no subject felt that contrast was improved by the filters at a visible transmittance of 70%, two subjects felt that contrast was improved by the filters at a visible transmittance of 50%, and all the subjects, that is, seven subjects felt that contrast was improved by the filters at a visible transmittance of 30% and 10%. When the text screen was observed, no subject felt that contrast was improved by the filters at a visible transmittance of 70% and 50%, and all the subjects, that is, seven subjects felt that contrast was improved by the filters at a visible transmittance of 30% and 10%.

Next, a preferred filter color was examined. In the examination, three kinds of color filters (brown, gray, and purple) for sunglasses and an ND filter were prepared. The visible transmittance was 30% on the basis of the above-mentioned examination result. An image for a golf practice in a golf course (a large amount of green and blue is included in the image) and an animation image (a large amount of white is included in the image) were prepared for evaluation, considering an influence due to images.

As an index indicating preferability, an evaluation method, such as a pair comparison method, was used. Specifically, the subject compared the improvement rates of contrast of two kinds of filters among four kinds of filters and determined one of the two kinds of filters with a higher improvement rate of contrast as a winner. An index $Z(x)$ indicating preferability for the winning rate (x) of each filter was normalized by the following expression and the indexes were compared with each other.

$$Z(x)=(x-x_{ave})/\sigma$$

(where $x_{ave}$ is the average value of the winning rate (x) and $\sigma$ is a standard deviation)

As a result, as shown in the following Tables 1 and 2, a brown color filter was most effective to improve the contrast. At the same time, it was determined that there was a difference between individuals in the favorite color of the color filter. In Table 1, the upper part shows the results when the image for a golf practice in the golf course is used and the lower part shows the results when the animation image is used.

TABLE 1

| | | | Lose | | | |
|---|---|---|---|---|---|---|
| | | Brown | Purple | Gray | ND | Total |
| When an image for a golf practice in a golf course is used | | | | | | |
| Win | Brown | | 0.86 | 0.71 | 1.00 | 2.57 |
| | Purple | 0.14 | | 0.14 | 0.29 | 0.57 |
| | Gray | 0.29 | 0.86 | | 0.43 | 1.58 |
| | ND | 0.00 | 0.71 | 0.57 | | 1.28 |
| When an animation image is used | | | | | | |
| Win | Brown | | 0.86 | 0.71 | 0.86 | 2.43 |
| | Purple | 0.14 | | 0.14 | 0.29 | 0.57 |
| | Gray | 0.29 | 0.86 | | 0.71 | 1.86 |
| | ND | 0.14 | 0.71 | 0.57 | | 1.14 |

TABLE 2

| | $Z(x)$ |
|---|---|
| When an image for a golf practice in a golf course is used | |
| Brown | 1.29 |
| Purple | −1.12 |
| Gray | 0.10 |
| ND filter | −0.26 |
| When an animation image is used | |
| Brown | 1.14 |
| Purple | −1.14 |
| Gray | 0.45 |
| ND filter | −0.44 |

Therefore, it was determined that, preferably, the light control device reduced the visible transmittance to 30% or less and imparted a desired color to light passing through the light control device, and the color imparted by the light control device was variable or the color imparted by the light control device was fixed (for example, brown or black). Since the display apparatus is basically driven by a battery, a reduction in power consumption is a very important task and it is necessary to increase the maximum transmittance of the light control device as high as possible, for example, to at least 50% or more in the AR technique.

From the above-mentioned results, in Example 1 or Examples 2 to 5, which will be described below, the light control device imparts a desired color to light passing through the light control device 700 and the color imparted by the light control device 700 is fixed. Specifically, the color is fixed to black.

A method of manufacturing an electrophoretic dispersion liquid in Example 1 will be described below.

First, 10 g of carbon black (#40 produced by Mitsubishi Chemical Corporation) as electrophoretic particles was added to 1 liter of pure water and the resulting mixture was stirred. Then, 1 cm³ of hydrochloric acid (37 wt %) and 0.2 g of 4-vinylaniline were added to the mixture to prepare a solution A. Then, 0.3 g of sodium nitrite was dissolved in 10 cm³ of pure water. The resulting solution was heated to 40° C. to prepare a solution B. The solution B was gradually added to the solution A, followed by stirring for 10 hours. Then, reaction products were centrifugally separated to obtain solid matter. Then, the solid matter was rinsed with pure water, was dispersed in acetone, and was rinsed using a centrifugal separation method. Then, the solid matter was dried overnight in a vacuum drier at a temperature of 50° C.

Then, in a reaction flask equipped with a nitrogen purging apparatus, an electromagnetic stir rod, and a reflux column, 5 g of the solid matter, 100 cm³ of toluene, 15 cm³ of 2-ethylhexyl methacrylate, and 0.2 g of azobisisobutyronitrile (AIBN) were introduced and mixed. The reaction flask was purged with nitrogen gas for 30 minutes under stirring. Then, the reaction flask was placed in an oil bath and gradually heated to 80° C. under continuous stirring, and this state was maintained for 10 hours. Then, the solid matter was cooled to room temperature, centrifugally separated, rinsed after every three operations of centrifugal separation with tetrahydrofuran (THF) and ethyl acetate, discharged and placed in a vacuum drier, and dried overnight at a temperature of 50° C. As a result, 4.7 g of brown electrophoretic particles were obtained.

An Isopar G (Exxon Mobil Corporation) solution containing 1.5% of sorbitan trioleate (Span 85) and a total of 0.5% of methoxysulfonyloxymethane (Solsperse 17000 produced by Lubrizol Ltd.), 1,2-hydroxyoctadecanoic acid, and N,N-dimethylpropane-1,3-diamine was prepared as a dispersion liquid (dispersion medium), which was an insulating liquid. Then, 0.1 g of electrophoretic particles were added to 9.9 g of the dispersion medium and the mixture was stirred in a bead mill for 5 minutes. Then, the mixture was centrifuged for 5 minutes by a centrifugal separator (rotation speed=2000 rpm) and beads were removed. In this way, the electrophoretic dispersion liquid could be obtained. The electrophoretic particles are positively charged.

A light control device 700 according to Example 1 includes two opposite transparent substrates (a first substrate 701 and a second substrate 703), electrodes (a first electrode 702 and a second electrode 704) that are provided on the substrates 701 and 703, and an electrophoretic dispersion liquid 705 that is sealed between the two substrates 701 and 703. Each of the first substrate 701 and the second substrate 703 is a glass substrate with a thickness of 0.5 mm, and the gap between the first substrate 701 and the second substrate 703 is 50 μm. Each of the first electrode 702 and the second electrode 704 is a transparent electrode made of an indium-tin composite oxide (ITO) and is formed by a combination of a PVD method, such as a sputtering method, and a lift-off method. The first electrode 702 is patterned in a comb shape. The second electrode 704 is not patterned and is a so-called solid electrode. The first electrode 702 and the second electrode 704 are connected to the control device 18 through connectors and wiring lines (not shown). The outer edges of the two substrates 701 and 703 are sealed by a sealant 706. The first substrate 701 of the light control device 700 is fixed to the light guide plate 121 by a sealing member 722 such that there is a gap between the first substrate 701 and the light guide plate 121. The length of the first substrate 701 of the light control device 700 is substantially equal to that of the light guide plate 121 and the first substrate 701 of the light control device 700 is fixed to the light guide plate 121 by the sealing member 722. The sealing member 722 is arranged at the outer edge of the first substrate 701. The above holds true for the following examples.

The transmittance of the light control device 700 can be controlled by the voltages applied to the first electrode 702 and the second electrode 704. Specifically, when a positive voltage is applied to the first electrode 702 and a negative voltage is applied to the second electrode 704, the positively-charged electrophoretic particles migrate so as to cover the second electrode. Therefore, the transmittance of the light control device 700 is reduced (see FIG. 4A). On the contrary, when a negative voltage is applied to the first electrode 702 and a positive voltage is applied to the second electrode 704, the electrophoretic particles migrate so as to cover the first electrode 702. Therefore, the transmittance of the light control device 700 increases (see FIG. 4B). The observer can operate a control knob provided in the control device 18 to adjust the voltages applied to the first electrode 702 and the second electrode 704. That is, the observer may observe the image from the optical device 120 or 320 and adjust the transmittance of the light control device 700, thereby improving the contrast of the image. Various test results proved that the preferable range of the maximum transmittance of the light control device 700 was equal to or more than 50% (preferably, equal to or more than 50% and equal to or less than 99%) and the preferable range of the minimum transmittance thereof was equal to or less than 30% (preferably, equal to or more than 1% and equal to or less than 30%).

In the display apparatus according to Example 1, since the light control device includes the two opposite transparent substrates, the electrodes provided on the substrates, and the electrophoretic dispersion liquid sealed between the two substrates, it is possible to give high contrast to the image observed by the observer, reduce power consumption, and sufficiently increase the amount of external light incident on the image display device.

Example 2

Example 2 is a modification of Example 1. FIG. 5 is a conceptual diagram illustrating an image display device 200 of a display apparatus (head-mounted display) according to Example 2. As shown in FIG. 5, in Example 2, an image forming device 211 is the image forming device according to the second configuration. That is, the image forming device 211 includes a light source 251 and a scanning unit 253 performs scanning with parallel light emitted from the light source 251. Specifically, the image forming device 211 includes: (i) the light source 251; (ii) a collimating optical system 252 that converts light emitted from the light source 251 into parallel light; (iii) the scanning unit 253 that performs scanning with the parallel light emitted from the collimating optical system 252; and (iv) a relay optical system 254 that relays the parallel light used by the scanning unit 253 to perform scanning. The entire image forming device 211 is provided in a housing 213 (represented by a one-dot chain line in FIG. 5) and an opening (not shown) is provided in the housing 213. Light is emitted from the relay optical system 254 through the opening. Each housing 213 is removably attached to a temple portion 13 by an attachment member 19.

The light source 251 includes a light emitting device that emits white light. Light emitted from the light source 251 is incident on the collimating optical system 252 which has positive optical power as a whole and is then emitted as parallel light. The parallel light is reflected from a total reflection mirror 256 and vertical and horizontal scanning with the parallel light is performed by the scanning unit 253, which is an MEMS in which a micromirror is rotatable in the two-dimensional direction and which can perform two-dimensional scanning with incident parallel light. In this way, a kind of two-dimensional image is formed and virtual pixels (the number of pixels may be the same as that, for example, in Example 1) are generated. Light from the virtual pixel passes through the relay optical system (parallel light emission optical system) 254, which is a known relay optical system, and a beam, which is parallel light, is incident on the optical device 120.

The configuration and structure of the optical device 120 on which the beam, which is the parallel light from the relay optical system 254, is incident, in which the beam is guided, and from which the beam is emitted are the same as those of the optical device according to Example 1 and thus the detailed description thereof will not be repeated. In addition, as described above, the configuration and structure of the display apparatus according to Example 2 are substantially the same as those of the display apparatus according to Example 1 except for the image forming device 211 and thus the detailed description thereof will not be repeated.

Example 3

Figure 7:
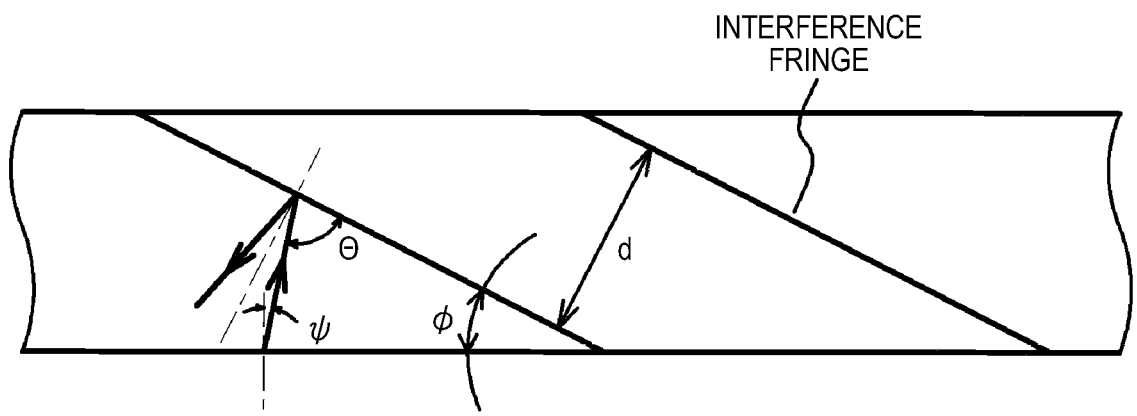
FIG. 7 is a schematic enlarged cross-sectional view illustrating a portion of a reflective volume hologram diffraction grating in the display apparatus according to Example 3.

Example 3 is also a modification of Example 1. FIG. 6 is a conceptual diagram illustrating an image display device 300 of a display apparatus (head-mounted display) according to Example 3. FIG. 7 is an enlarged cross-sectional view schematically illustrating a portion of a reflective volume hologram diffraction grating. In Example 3, an image forming device 111 is the image forming device according to the first configuration, similarly to Example 1. An optical device 320 has the same basic configuration and structure as the optical device 120 according to Example 1 except for the configuration and structure of the first deflection unit and the second deflection unit.

In Example 3, the first deflection unit and the second deflection unit are provided on the surface of the light guide plate 321 (specifically, a second surface 323 of a light guide plate 321). The first deflection unit diffracts light incident on the light guide plate 321 and the second deflection unit diffracts light, which propagates in the light guide plate 321 while being totally reflected, a plurality of times. Each of the first deflection unit and the second deflection unit is a diffraction grating diffraction grating device, specifically, a reflective diffraction grating device, and more specifically, a reflective volume hologram diffraction grating. In the following description, for convenience, the first deflection unit, which is a reflective volume hologram diffraction grating, is referred to as a "first diffraction grating member 330" and the second deflection unit, which is a reflective volume hologram diffraction grating, is referred to as a "second diffraction grating member 340".

In Example 3 or Example 4, which will be described below, each of the first diffraction grating member 330 and the second diffraction grating member 340 is a diffraction grating layer. Interference fringes corresponding to one kind of wavelength band (or wavelength) are formed in each diffraction grating layer made of a photopolymer material and the diffraction grating layer is manufactured by the method according to the related art. The pitch between the interference fringes formed in the diffraction grating layer (diffractive optical element) is constant and the interference fringe has a straight shape and is parallel to the Z-axis. The axis lines of the first diffraction grating member 330 and the second diffraction grating member 340 are parallel to the X-axis and the normal lines thereof are parallel to the Y-axis.

FIG. 7 is an enlarged cross-sectional view schematically illustrating a portion of the reflective volume hologram diffraction grating. Interference fringes with an inclination angle φ are formed in the reflective volume hologram diffraction grating. The inclination angle φ is an angle formed between the surface of the reflective volume hologram diffraction grating and the interference fringe. The interference fringe is formed from the inside to the surface of the reflective volume hologram diffraction grating. The interference fringe satisfies a Bragg's condition. The Bragg's condition indicates a condition satisfying the following Expression A.

$$m \cdot \lambda = 2 \cdot d \cdot \sin(\Theta) \quad (A)$$

In Expression A, m is a positive integer, λ is a wavelength, d is a pitch between lattice planes (a gap between virtual planes including the interference fringes in the normal direction), and Θ is a complementary angle of light incident on the interference fringe. The relationship between Θ, the inclination angle φ, and an incident angle σ when light is incident on the diffraction grating member at the incident angle σ is represented by the following Expression B $$\Theta = 90° - (\varphi + \varphi) \quad (B)$$

As described above, the first diffraction grating member 330 is provided on (bonded to) the second surface 323 of the light guide plate 321 and diffracts and reflects parallel light incident on the light guide plate 321 such that the parallel light incident on the light guide plate 321 from the first surface 322 is totally reflected in the light guide plate 321. As described above, the second diffraction grating member 340 is provided on (bonded to) the second surface 323 of the light guide plate 321 and diffracts and reflects the parallel light, which propagates in the light guide plate 321 while being totally reflected, a plurality of times, so that the parallel light is emitted from the first surface 322 of the light guide plate 321.

The parallel light propagates in the light guide plate 321 while being totally reflected and is then emitted from the light guide plate 321. In this case, since the light guide plate 321 is thin and an optical path in the light guide plate 321 is long, the number of total reflections until light reaches the second diffraction grating member 340 varies depending on each angle of view. Specifically, the number of times a parallel light component which is incident in a direction close to the second diffraction grating member 340 among the parallel light components incident on the light guide plate 321 is reflected is less than the number of times a parallel light component which is incident on the light guide plate 321 in a direction away from the second diffraction grating member 340. The reason is that, when the parallel light components propagate in the light guide plate 321 and collide with the inner surface of the light guide plate 321, the angle formed between the normal line of the light guide plate 321 and a parallel light component which is diffracted and reflected by the first diffraction grating member 330 and is incident on the light guide plate 321 in a direction close to the second diffraction grating member 340 is less than the angle formed between the normal line of the light guide plate 321 and a parallel light component which is incident on the light guide plate 321 in a direction away from the second diffraction grating member 340. The shape of the interference fringes formed in the second diffraction grating member 340 and the shape of the interference fringes formed in the first diffraction grating member 330 are symmetric with respect to a vertical plane perpendicular to the axis line of the light guide plate 321. A transparent resin plate or a transparent resin film may cover the surfaces of the first diffraction grating member 330 and the second diffraction grating member 340 which do not face the light guide plate 321 to prevent the first diffraction grating member 330 and the second diffraction grating member 340 from being damaged. In addition, a transparent protective film may be attached to the first surface 322 to protect the light guide plate 321.

A light guide plate 321 according to Example 4, which will be described below, has basically the same configuration and structure as the above-mentioned light guide plate 321.

As described above, the configuration and structure of the display apparatus according to Example 3 are substantially the same as those of the display apparatus according to Example 1 except for the optical device 320 and thus the detailed description thereof will not be repeated.

Example 4

Figure 8:
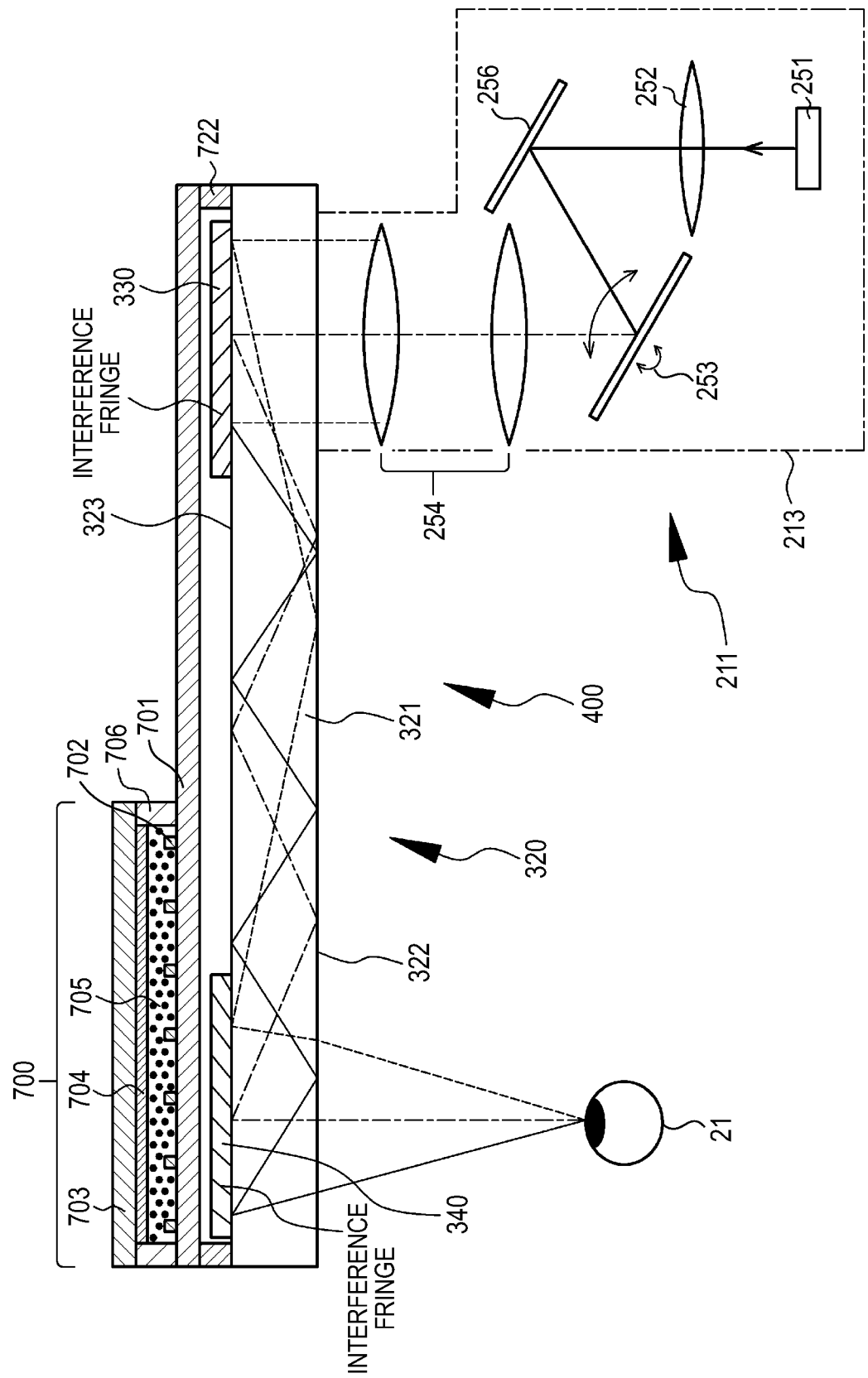
FIG. 8 is a conceptual diagram illustrating an image display device in a display apparatus according to Example 4.

Example 4 is a modification of Example 3. FIG. 8 is a conceptual diagram illustrating an image display device of a display apparatus (head-mounted display) according to Example 4. For example, a light source 251, a collimating optical system 252, a scanning unit 253, and a parallel light emission optical system (relay optical system 254) of an image display device 400 according to Example 4 have the same configuration and structure (image forming device according to the second configuration) as those according to Example 2. In addition, an optical device 320 according to Example 4 has the same configuration and structure as the optical device 320 according to Example 3. The display apparatus according to Example 4 has substantially the same configuration and structure as the display apparatus according to Example 1 except for the above and thus the detailed description thereof will not be repeated.

Example 5

Figure 9:
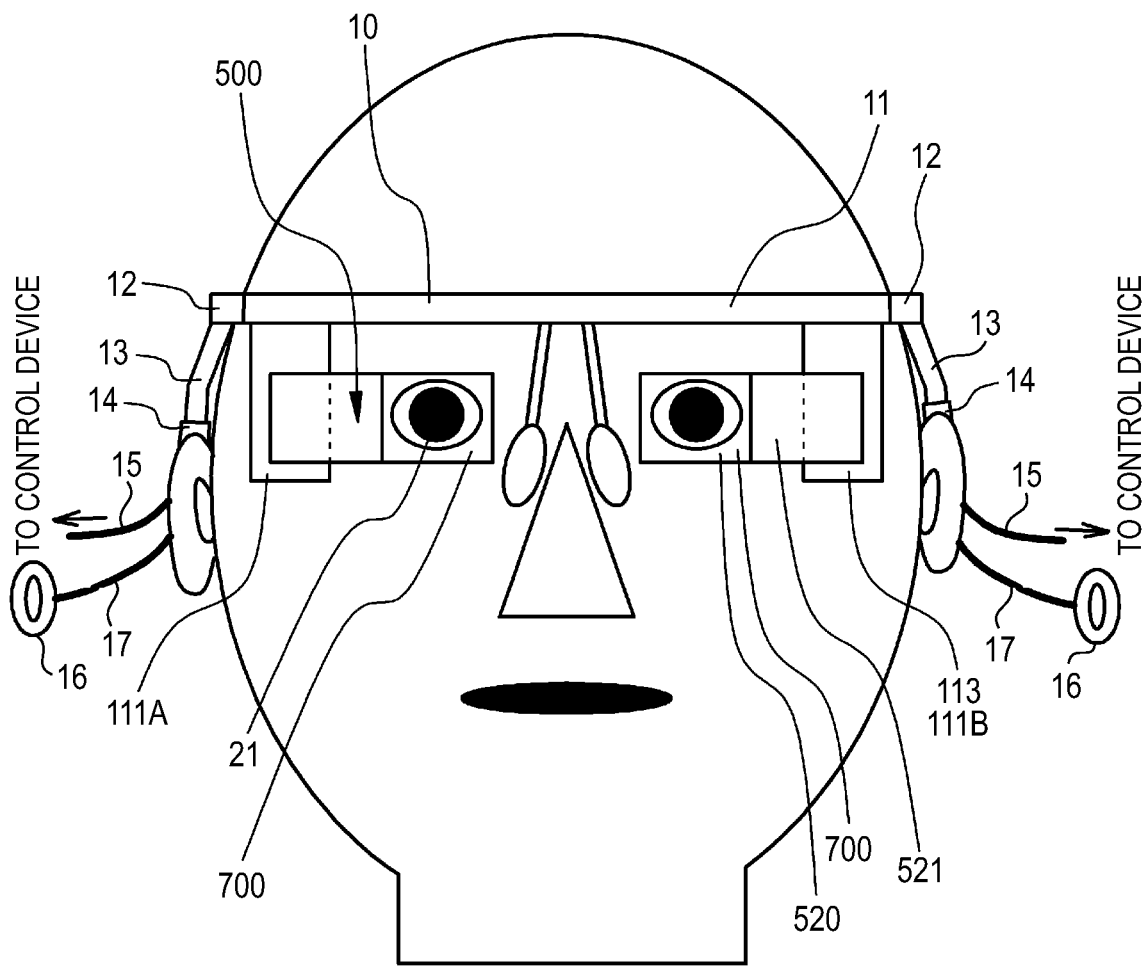
FIG. 9 is a schematic diagram illustrating a display apparatus according to Example 5, as viewed from the front side.
Figure 10:
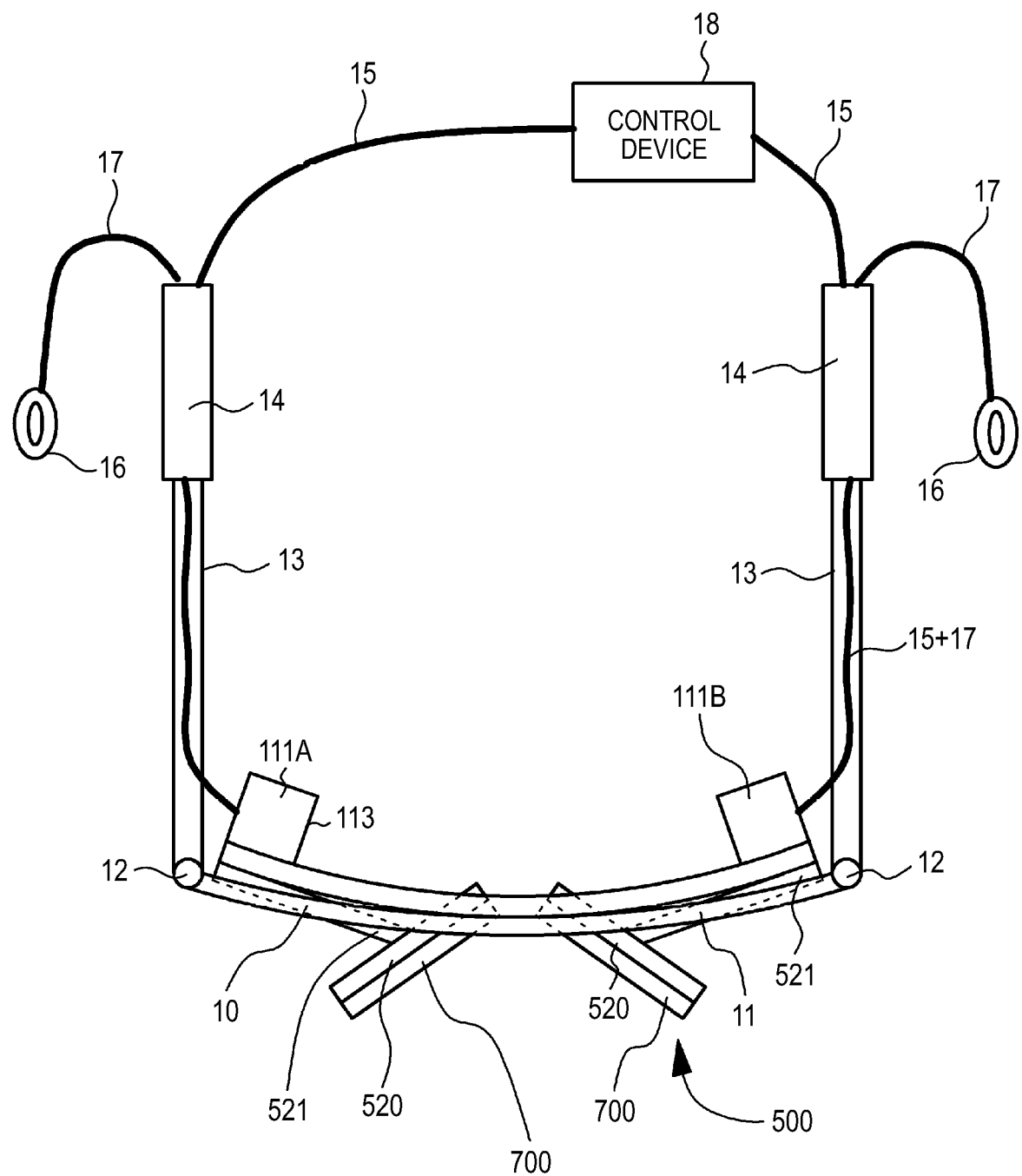
FIG. 10 is a schematic diagram illustrating the display apparatus according to Example 5, as viewed from the upper side.

Example 5 is a modification of the image display device according to each of Examples 1 to 4. FIG. 9 is a schematic diagram illustrating a display apparatus according to Example 5, as viewed from the front side, and FIG. 10 is a schematic diagram illustrating the display apparatus according to Example 5, as viewed from the upper side.

In Example 5, an optical device 520 forming an image display device 500 is a semi-transmissive mirror on which light emitted from image forming devices 111A and 111B is incident and which reflects the light to the pupils 21 of the observer. In Example 5, light emitted from the image forming devices 111A and 111B propagates in a transparent member 521, such as a glass plate or a plastic plate, and is then incident on the optical device 520 (semi-transmissive mirror). However, light may propagate through air and may be incident on the optical device 520. The image forming device may be the image forming device 211 according to Example 2.

Each of the image forming devices 111A and 111B is attached to a front portion 11 by, for example, screws. The member 521 is attached to each of the image forming devices 111A and 111B, the optical device 520 (semi-transmissive mirror) is attached to the member 521, and a light control device 700 is attached to the optical device 520 (semi-transmissive mirror). The configuration and structure of the display apparatus according to Example 5 are substantially the same as those of the display apparatuses according to Examples 1 to 4 except for the above and thus the detailed description thereof will not be repeated.

Example 6

Example 6 is a modification of each of Examples 1 to 5. In Examples 1 to 5, the color imparted by the light control device 700 is fixed to black. In contrast, in Example 6, a light control device imparts a desired color to light passing through the light control device, and the color imparted by the light control device is variable. Specifically, the light control device is formed by laminating a light control device that is colored red, a light control device that is colored yellow, and a light control device that is colored blue. An electrophoretic dispersion liquid in the light control device that is colored red is a dispersion liquid obtained by dispersing electrophoretic particles, which are obtained by mixing a styrene-based resin and C.I. Pigment Red 122 using a Henschel mixer in advance, melt-kneading the mixture using a twin-screw extruder, cooling the mixture, coarsely grinding the mixture using a hammer mill, and finely grinding the mixture using a jet mill, in an Isopar G (produced by Exxon Mobil Corporation) solution containing 1.5% of sorbitan trioleate (Span 85) and a total of 0.5% of methoxysulfonyloxymethane (Solsperse 17000 produced by Lubrizol Ltd.), 1,2-hydroxyoctadecanoic acid, and N,N-dimethylpropane-1,3-diamine. An electrophoretic dispersion liquid in the light control device that is colored yellow is a dispersion liquid obtained by dispersing electrophoretic particles, which are obtained by mixing a styrene-based resin and C.I. Pigment Yellow 12 using a Henschel mixer in advance, melt-kneading the mixture using a twin-screw extruder, cooling the mixture, coarsely grinding the mixture using a hammer mill, and finely grinding the mixture using a jet mill, in an Isopar G (produced by Exxon Mobil Corporation) solution containing 1.5% of sorbitan trioleate (Span 85) and a total of 0.5% of methoxysulfonyloxymethane (Solsperse 17000 produced by Lubrizol Ltd.), 1,2-hydroxyoctadecanoic acid, and N,N-dimethylpropane-1,3-diamine. An electrophoretic dispersion liquid in the light control device that is colored blue is a dispersion liquid obtained by dispersing electrophoretic particles, which are obtained by mixing a styrene-based resin and C.I. Pigment Blue 1 using a Henschel mixer in advance, melt-kneading the mixture using a twin-screw extruder, cooling the mixture, coarsely grinding the mixture using a hammer mill, and finely grinding the mixture using a jet mill, in an Isopar G (produced by Exxon Mobil Corporation) solution containing 1.5% of sorbitan trioleate (Span 85) and a total of 0.5% of methoxysulfonyloxymethane (Solsperse 17000 produced by Lubrizol Ltd.), 1,2-hydroxyoctadecanoic acid, and N,N-dimethylpropane-1,3-diamine. Then, a voltage is applied to the electrodes of each light control device to impart a desired color to external light emitted from the three-layer light control device.

The configuration and structure of the display apparatus according to Example 6 may be the same as those of the display apparatuses according to Examples 1 to 5 except for the above and thus the detailed description thereof will not be repeated.

Example 7

Figure 11A:
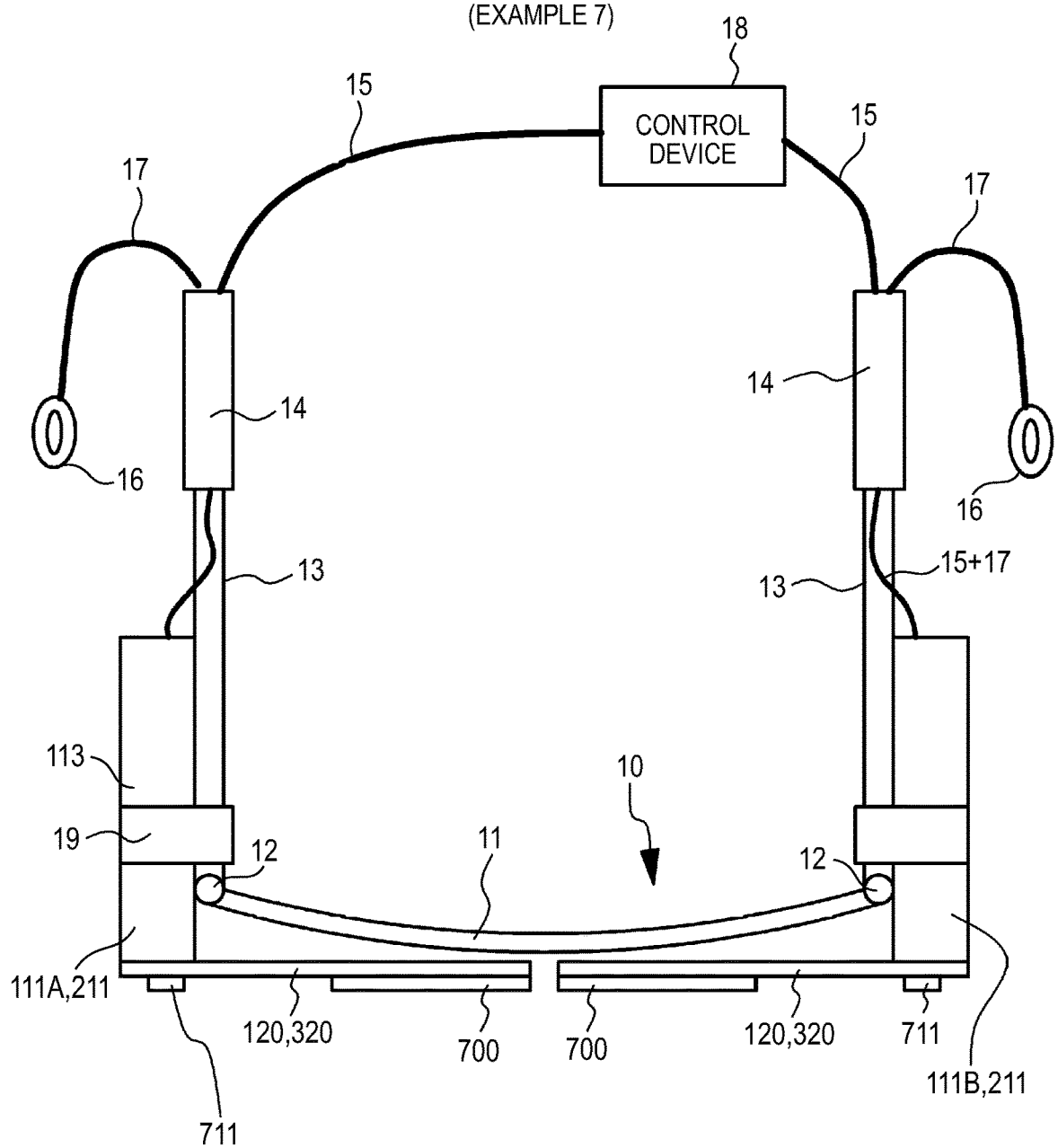
FIG. 11A is a schematic diagram illustrating a display apparatus according to Example 7, as viewed from the upper side.
Figure 11B:
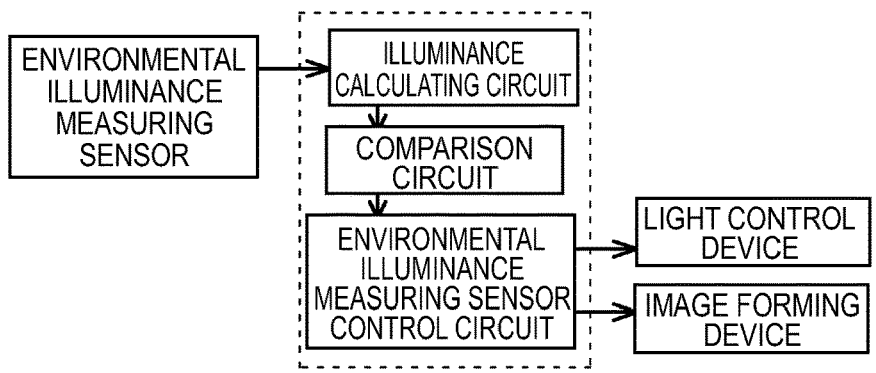
FIG. 11B is a schematic diagram illustrating a circuit that controls an illuminance sensor in the display apparatus according to Example 7.

Example 7 is a modification of Example 1 and relates to a display apparatus according to each of the second and third embodiments of the present disclosure. FIG. 11A is a schematic diagram illustrating the display apparatus according to Example 7, as viewed from the upper side. FIG. 11B is a schematic diagram illustrating a circuit that controls an illuminance sensor.

The display apparatus according to Example 7 further includes an illuminance sensor (environmental illuminance measuring sensor) 711 that measures the illuminance of an environment in which the display apparatus is located and controls the transmittance of a light control device 700 on the basis of the measurement result of the illuminance sensor (environmental illuminance measuring sensor) 711. The display apparatus additionally or independently controls the brightness of the image formed by an image forming device 111 or 211 on the basis of the measurement result of the illuminance sensor (environmental illuminance measuring sensor) 711. The environmental illuminance measuring sensor 711 having known configuration and structure may be provided at, for example, the outer edge of an optical device 120 or 320. The environmental illuminance measuring sensor 711 is connected to a control device 18 through a connector and a wiring line (not shown). The control device 18 includes a circuit that controls the environmental illuminance measuring sensor 711. The circuit that controls the environmental illuminance measuring sensor 711 may include an illuminance calculating circuit that receives a measured value from the environmental illuminance measuring sensor 711 and calculates illuminance, a comparison circuit that compares the value of the illuminance calculated by the illuminance calculating circuit with a standard value, and an environmental illuminance measuring sensor control circuit that controls the light control device 700 and/or the image forming device 111 or 211 on the basis of the value calculated by the comparison circuit. These circuits may be known circuits. In the control of the light control device 700, the transmittance of the light control device 700 is controlled. In the control of the image forming device 111 or 211, the brightness of the image formed by the image forming device 111 or 211 is controlled. The control of the transmittance of the light control device 700 and the control of the brightness of the image formed by the image forming device 111 or 211 may be performed independently or in correlation with each other.

For example, when the measurement result of the illuminance sensor (environmental illuminance measuring sensor) 711 is equal to or more than a predetermined value (first measured illuminance value), the transmittance of the light control device 700 is set to a predetermined value (first transmittance) or less. On the other hand, when the measurement result of the illuminance sensor (environmental illuminance measuring sensor) 711 is equal to or less than a predetermined value (second measured illuminance value), the transmittance of the light control device 700 is set to a predetermined value (second transmittance) or more. For example, the first measured illuminance value may be 10 lux, the first transmittance may be in the range of 1% to 30%, the second measured illuminance value may be 0.01 lux, and the second transmittance may be in the range of 51% to 99%.

The illuminance sensor (environmental illuminance measuring sensor) 711 according to Example 7 can be applied to the display apparatus according to each of Examples 2 to 6. When the display apparatus includes an imaging device, the illuminance sensor (environmental illuminance measuring sensor) 711 may be a light receiving device for exposure measurement which is provided in the imaging device.

The display apparatus according to Example 7 or a display apparatus according to Example 8, which will be described below, controls the transmittance of the light control device on the basis of the measurement result of an illuminance sensor (environmental illuminance measuring sensor), controls the brightness of the image formed by the image forming device on the basis of the measurement result of the illuminance sensor (environmental illuminance measuring sensor), controls the transmittance the light control device on the basis of the measurement result of an illuminance sensor (transmitted light illuminance measuring sensor), and controls the brightness of the image formed by the image forming device on the basis of the measurement result of the illuminance sensor (transmitted light illuminance measuring sensor). Therefore, it is possible to give high contrast to the image observed by the observer and optimize an image observation state depending on the illuminance of an environment in which the display apparatus is located.

Example 8

Figure 12A:
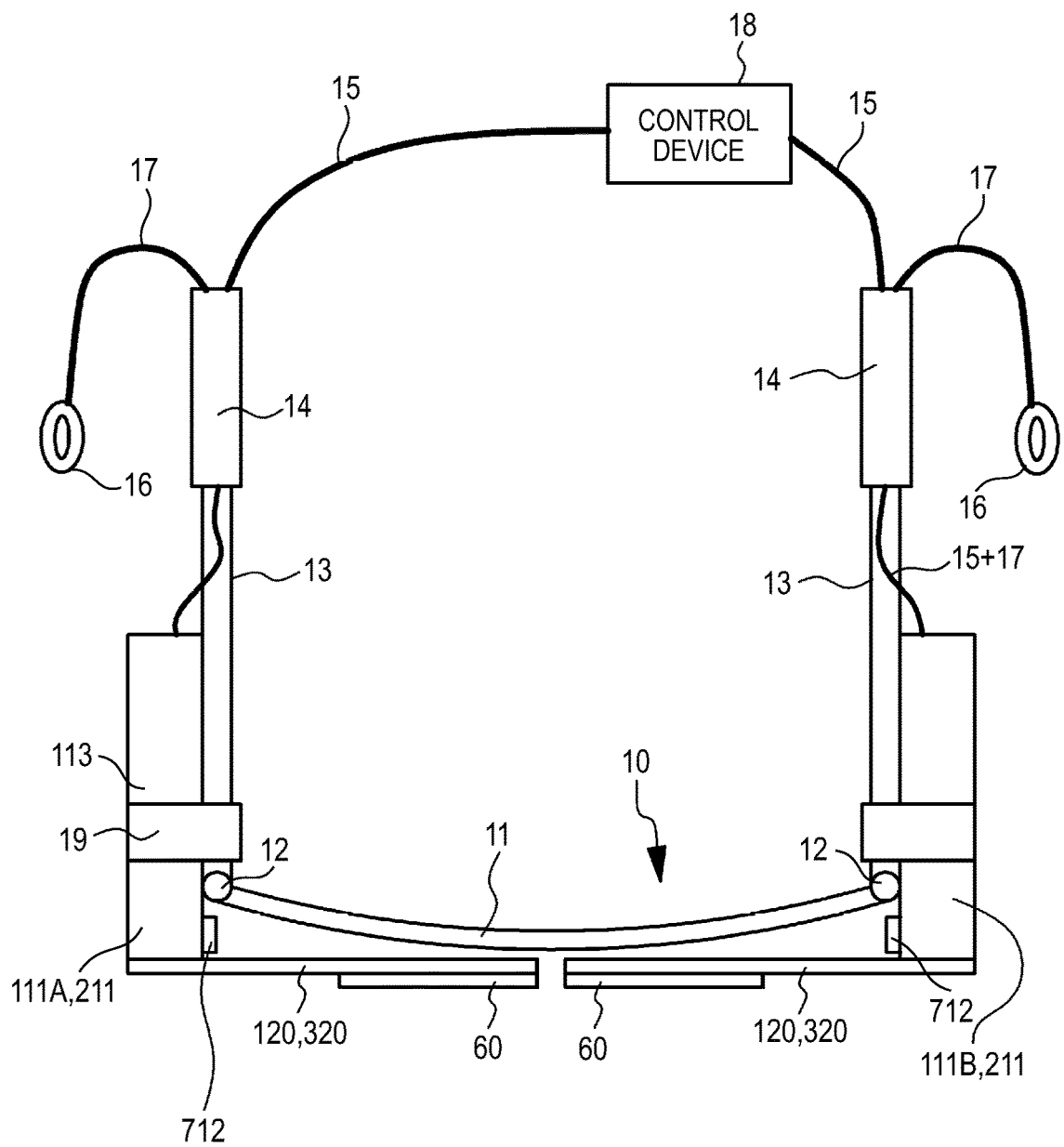
FIG. 12A is a schematic diagram illustrating a display apparatus according to Example 8, as viewed from the upper side.
Figure 12B:
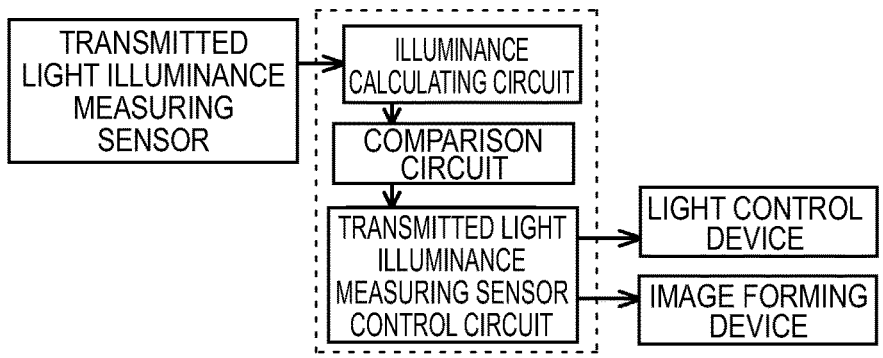
FIG. 12B is a schematic diagram illustrating a circuit that controls an illuminance sensor in the display apparatus according to Example 8.

Example 8 is also a modification of Example 1 and relates to a display apparatus according to each of the fourth and fifth embodiments of the present disclosure. FIG. 12A is a schematic diagram illustrating the display apparatus according to Example 8, as viewed from the upper side. FIG. 12B is a schematic diagram illustrating a circuit that controls an illuminance sensor.

The display apparatus according to Example 8 further includes an illuminance sensor (transmitted light illuminance measuring sensor) 712 that measures the illuminance of light which passes through the light control device from an external environment, that is, measures whether environmental light passing through the light control device such that the illuminance thereof is adjusted to a desired value and is then incident. The display apparatus controls the transmittance of a light control device 700 on the basis of the measurement result of the illuminance sensor (transmitted light illuminance measuring sensor) 712. The display apparatus additionally or independently controls the brightness of the image formed by an image forming device 111 or 211 on the basis of the measurement result of the illuminance sensor (transmitted light illuminance measuring sensor) 712. The transmitted light illuminance measuring sensor 712 having known configuration and structure is arranged closer to the observer than an optical device 120, 320, or 520. For example, the transmitted light illuminance measuring sensor 712 may be arranged on the inner surface of a housing 113 or 213. The transmitted light illuminance measuring sensor 712 is connected to a control device 18 through a connector and a wiring line (not shown). The control device 18 includes a circuit that controls the transmitted light illuminance measuring sensor 712. The circuit that controls the transmitted light illuminance measuring sensor 712 may include an illuminance calculating circuit that receives a measured value from the transmitted light illuminance measuring sensor 712 and calculates illuminance, a comparison circuit that compares the value of the illuminance calculated by the illuminance calculating circuit with a standard value, and a transmitted light illuminance measuring sensor control circuit that controls the light control device 700 and/or the image forming device 111 or 211 on the basis of the value calculated by the comparison circuit. These circuits may be known circuits. In the control of the light control device 700, the transmittance of the light control device 700 is controlled. In the control of the image forming device 111 or 211, the brightness of the image formed by the image forming device 111 or 211 is controlled. The control of the transmittance of the light control device 700 and the control of the brightness of the image formed by the image forming device 111 or 211 may be performed independently or in correlation with each other. In a case in which the measurement result of the transmitted light illuminance measuring sensor 712 is not controlled to a desired illuminance, considering the illuminance of the environmental illuminance measuring sensor 711, that is, in a case in which the measurement result of the transmitted light illuminance measuring sensor 712 is not a desired illuminance, or in a case in which finer adjustment of the illuminance is desired, the transmittance of the light control device may be adjusted while the value of the transmitted light illuminance measuring sensor 712 is monitored.

The illuminance sensor (transmitted light illuminance measuring sensor) 712 according to Example 8 can be applied to the display apparatuses according to Examples 2 to 6. Alternatively, the illuminance sensor (transmitted light illuminance measuring sensor) 712 according to Example 8 and the environmental illuminance measuring sensor 711 according to Example 7 may be combined with each other. In this case, the control of the transmittance of the light control device 700 and the control of the brightness of the image formed by the image forming device 111 or 211 may be performed independently or in correlation with each other according to the result of various examinations.

Example 9

In the following Examples 9 to 22, modifications of the display apparatuses according to Examples 1 to 8 will be described. In the drawings related to Examples 9 to 22, a light control device is not shown.

Figure 13:
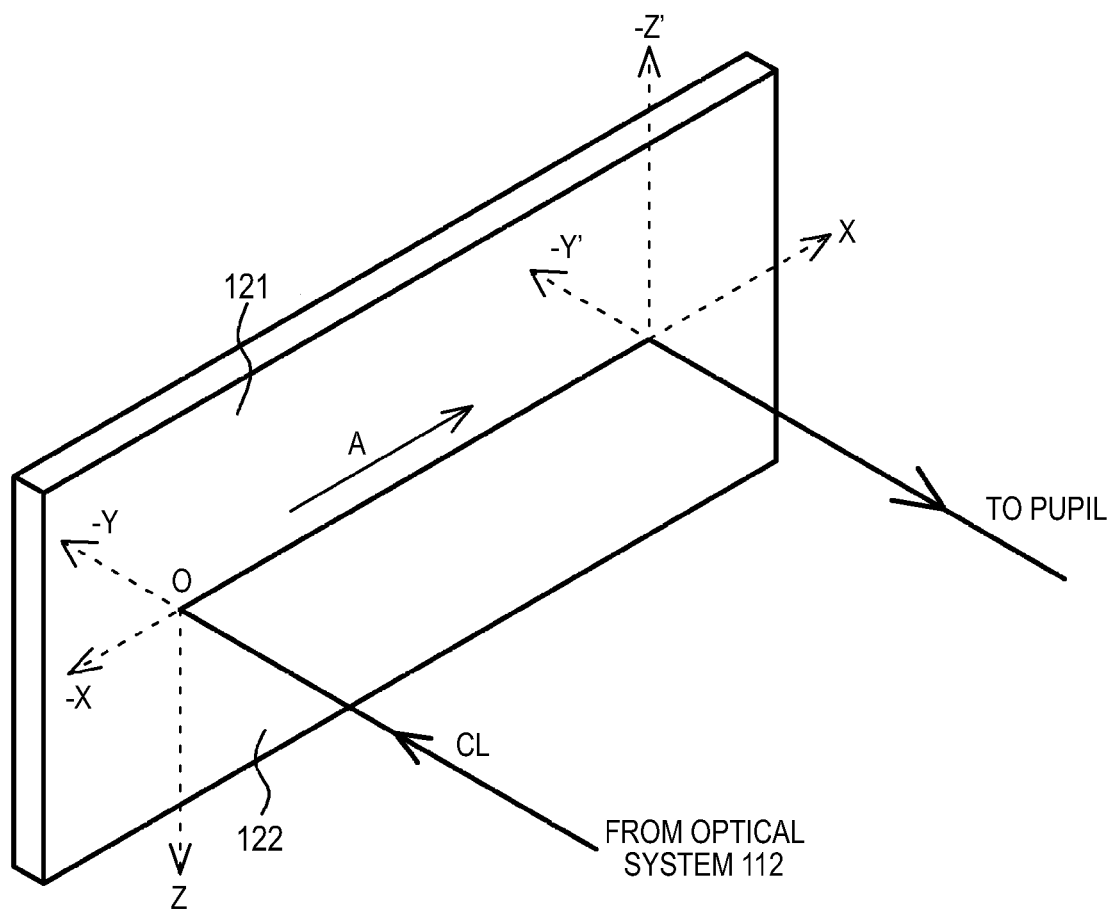
FIG. 13 is a schematic diagram illustrating the propagation of light in a light guide plate forming an image display device in a display apparatus according to Example 9.
Figure 14:
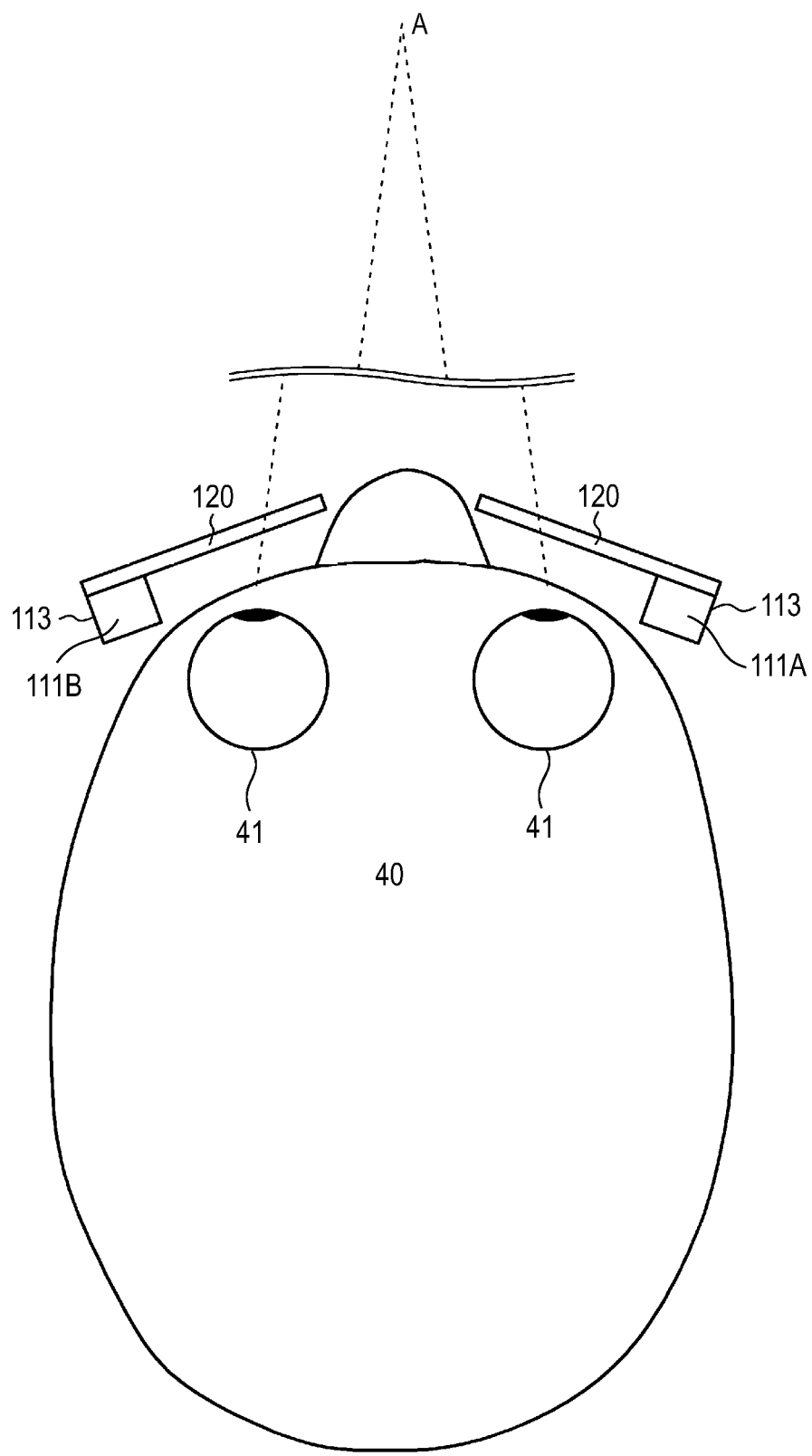
FIG. 14 is a diagram illustrating a state in which the display apparatus according to Example 9 is mounted on the head of the observer (only an image display device is shown and a frame is not shown)

Example 9 is a modification of the display apparatus according to each of Examples 1 to 8. Specifically, Example 9 relates to the 1A-th and 1B-th display apparatuses according to the embodiments of the present disclosure, specifically, a display apparatus (caption display apparatus) that displays a caption. FIG. 13 is a schematic diagram illustrating the propagation of light in a light guide plate forming the image display device in the display apparatus according to Example 9. FIG. 14 is a diagram illustrating a state in which the display apparatus according to Example 9 is mounted to the head of the observer, as viewed from the upper side (however, only the image display device is shown and a frame is not shown). FIGS. 15 and 16 are conceptual diagrams illustrating the use of the display apparatus according to Example 9. FIG. 17 is a conceptual diagram illustrating a control device 18 forming the display apparatus according to Example 9, and FIG. 18A is a diagram illustrating an example of an image signal in Example 9.

In Example 9 or Examples 10 to 16, which will be described below, among beams (central beams) which are emitted from the center of an image forming device 111 or 211 and pass through an image-forming-device-side node of an optical system 112 or 254, a point of an optical device 120, 320, and 520 on which a central incident beam CL is vertically incident is an optical device center point O, an axis line which passes through the optical device center point O and is parallel to the axis direction of the optical device 120, 320, or 520 is the X-axis, and an axis line which passes through the optical device center point O and is aligned with the normal line of the optical device 120, 320, or 520 is the Y-axis. The center point of the first deflection unit 130 or 330 is the optical device center point O.

An imaging device (not shown) including a solid-state imaging device, which is a CCD or a CMOS sensor, and a lens (not shown) is attached to the center of a front portion 11 by an appropriate member (not shown). A signal from the imaging device is transmitted to the image forming device 111A or 211 through a wiring line (not shown) extending from the imaging device.

As described above, a wiring line (for example, a signal line or a power line) 15 is connected to the control device (control circuit) 18. An image signal (for example, character data) is wirelessly transmitted to the control device 18. The control device 18 performs a process for image display (for example, a process of caption display) on the image signal (character data). The control device 18 may be a known circuit.

As shown in FIG. 17, the control device 18 includes a command receiving circuit 18A that receives the image signal (including a command) wirelessly transmitted through a character data wireless transmitting device 32, which will be described below, a signal processing circuit 18B that receives the image signal from the command receiving circuit 18A and performs various kinds of analysis and processing, a timing adjusting circuit 18C that receives various kinds of data from the signal processing circuit 18B and outputs various signals, and a transmitting circuit 18D that receives various signals from the timing adjusting circuit 18C, adjusts the timing such that an image is reproduced from a display position, and outputs the image signal to each image forming device 111 (111A, 111B) or 211 through the wiring line 15. The control device 18 further includes a timing generating circuit 18E that generates a timing signal for displaying the received image signal. The timing adjusting circuit 18C adjusts the timing on the basis of various timing clocks and timing signals from the timing generating circuit 18E.

As shown in FIG. 18A, the image signal includes, for example, a command start flag "SYNC", a command type specification ID "MSG_ID", data "LENG" indicating the total length of commands, data "POS_X" indicating an image display start position in the horizontal direction, data "POS_Y" indicating an image display start position in the vertical direction, data "DATA" indicating the data of an image to be displayed, and a command error check "FCS".

The display of an image (for example, a caption) in the display apparatus according to Example 9 will be described below.

That is, in the display apparatus according to Example 9, the input of the image signal (character data, an input image signal, or input image data) to the image forming device 111 or 211 forming at least one image display device (in Example 9, two image display devices 100, 200, 300, 400, or 500 for the right and left eyes) is controlled to adjust a convergence angle depending on the observation position of the observer, or to adjust the position of the image displayed by the optical device forming at least one image display device depending on the observation position of the observer. In Example 9, both the convergence angle and the position of the image depending on the observation position of the observer are adjusted. However, only one of them may be adjusted.

Specifically, the image signal is transmitted to the control device 18 wirelessly (by wire according to circumstances). Then, the control device 18 performs a process for image display on the image signal and the image forming device 111 or 211 generates an image (caption) on the basis of the data "DATA". This image finally reaches both eyes of the observer (audience) wearing the display apparatus through the optical system 112 or 254 and the optical device 120, 320, or 520.

Then, the image displayed on the optical device 120, 320, or 520 is moved in the horizontal and vertical directions and is rotated by the control device 18, specifically, a switch (not shown) provided in the control device 18 such that the images displayed by the image display devices 100, 200, 300, 400, or 500 for the left and right eyes are disposed at (overlap) a desired position (for example, a desired position of the stage or a screen). That is, for example, the image displayed on the optical device 120, 320, or 520 is moved in the horizontal and vertical directions and is rotated such that a point "A" in FIG. 14 is a desired position. In this way, the switch provided in the control device 18 is operated to control the image signal. That is, a display position correction signal is generated in the control device 18 and is added to the image signal.

FIG. 19A is a schematic diagram illustrating the deviation of the images formed by the image display devices 100, 200, 300, 400, or 500 for the left and right eyes from the desired position in the horizontal direction, FIG. 19B is a schematic diagram illustrating the deviation of the images in the vertical direction, and FIG. 19C is a schematic diagram illustrating the rotation of the images from the desired position. In FIGS. 19A, 19B, and 19C, the right diagram shows the image formed by the image display device 100, 200, 300, 400, or 500 for the right eye. In FIGS. 19A, 19B, and 19C, the left diagram shows the image formed by the image display device 100, 200, 300, 400, or 500 for the left eye. In FIGS. 19A, 19B, and 19C, a dotted line in the right diagram indicates the overlap of the image displayed by the image display device 100, 200, 300, 400, or 500 for the left eye.

In order to move an image (character) in the horizontal direction, the control device 18 may generate, as the display position correction signal, a signal for shifting the position of the image based on the image signal by a distance corresponding to +i pixels or −1 pixels in the horizontal direction. Alternatively, the control device 18 may generate, as the display position correction signal, a signal for shifting the timing of a horizontal synchronization signal by a value corresponding to +i pixels or −1 pixels. In addition, in order to move an image (character) in the vertical direction, the control device 18 may generate, as the display position correction signal, a signal for shifting the position of the image based on the image signal by a distance corresponding to +j pixels or −j pixels in the vertical direction. Alternatively, the control device 18 may generate, as the display position correction signal, a signal for shifting the timing of the vertical synchronization signal by a value corresponding to +j pixels or −j pixels. In other words, the image can be moved by delaying or advancing the position where the image is read from the memory in timing or by shifting the timings of the vertical synchronization signal and the horizontal synchronization signal. Furthermore, in order to rotate an image (character), the control device 18 may generate, as the display position correction signal, a signal for rotating the image on the basis of a known method.

Then, the display position correction signal when the images displayed by the image display devices 100, 200, 300, 400, or 500 for the left and right eyes coincide with each other (overlap each other) at a desired position is stored in the control device 18. For example, a button (not shown) provided in the control device 18 can be used to perform this operation. This operation may be performed once, for example, after the observer sits down on a seat. In addition, in the operation, a kind of test pattern, which is a combination of a line extending in the horizontal direction, a line extending in the vertical direction, and a line extending in an inclined direction, shown in FIGS. 19A to 19C may be used. As such, the position of the image displayed on the optical device 120, 320, or 520 forming at least one image display device 100, 200, 300, 400, or 500 can be controlled to adjust the mutual positions of two images displayed by two image display devices 100, 200, 300, 400, and 500. In other words, it is possible to adjust both the convergence angle and the position of the image depending on the observation position of the observer.

As described above, the display position correction signal is stored in the control device (a control circuit or a control unit) 18. For example, the image signal (character data) reproduced by a character data reproducing device 31 or an image data and character data reproducing device 31' having a known structure is wirelessly transmitted to the control device 18 through the character data wireless transmitting device 32. The transmission of the image signal may be performed by the operation of the operator or under the control of a computer, on the basis of a predetermined schedule or time allocation, in accordance with the state of progress of a movie or the state of progress of a play. Then, the control device 18 performs a process for image display on the image signal. That is, the control device 18 adds the display position correction signal to the image signal (specifically, data "POS_X" and "POS_Y"). In this way, it is possible to adjust a convergence angle corresponding to the distance from the display apparatus to the observation target by controlling the input of the image signal to the image forming device 111 or 211 forming at least one image display device (in Example 9, two image display devices 100, 200, 300, 400, and 500 for the right eye and the left eye) on the basis of the distance from the display apparatus to the observation target, that is, by adjusting the distance (interval) between two images obtained by the two image display devices 100, 200, 300, 400, or 500 for the right eye and the left eye in the horizontal direction. Specifically, for example, as the distance from the display apparatus to the observation target increases, the convergence angle may be reduced. In addition, two images obtained by the two image display devices 100, 200, 300, 400, or 500 for the right eye and the left eye can be moved in parallel to adjust the position of the image displayed on the optical device 120, 320, or 520 forming the image display device 100, 200, 300, 400, or 500 depending on the observation position of the observer. Specifically, for example, when the observation target is disposed so as to have a given angle with respect to the display apparatus in the vertical direction (for example, when the observer sits in the front seat in the movie theater and looks up at the screen), the position of a displayed image (caption) is moved upward. In this case, when the observer views the image overlapping an external image, the external image at which the observer gazes and the display position of the image are not away from each other, and it is possible to easily recognize the image. Alternatively, for example, in a movie or play, the performance goes according to a predetermined scenario. Therefore, it is possible to predict the image (observation target) of the screen or stage when the image overlaps. In addition, it is possible to predict the positions of actors on the screen or stage on the basis of voice generating sources, such as the actors who speak their lines. Therefore, on the basis of the prediction, it is possible to display an image (caption) on the optical device 120, 320, or 520 at a position where visibility is high by adjusting the position of the image displayed on the optical device 120, 320, or 520 forming the image display device 100, 200, 300, 400, or 500 depending on the observation position of the observer.

Figure 20A:
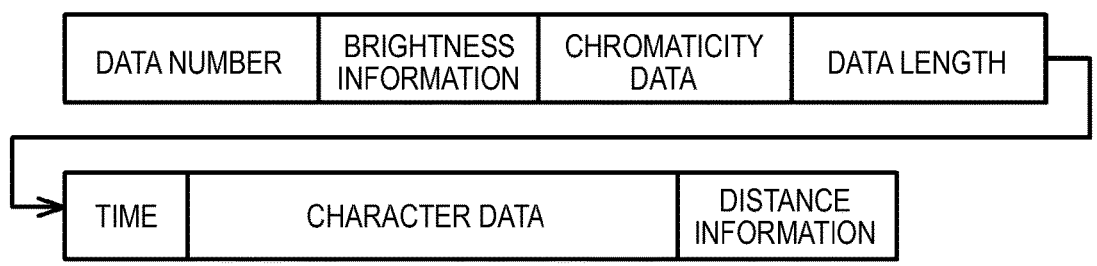
FIG. 20A is a conceptual diagram illustrating the format of an image signal input to the image forming device and a signal having observation position information about the distance from the observer (display apparatus) to an observation target added thereto.

Alternatively, in addition to the image signal input to the image forming device 111 or 211, observation position information (distance information) for the distance from the observer (display apparatus) to the observation target may be transmitted from the outside to the display apparatus. FIG. 20A is a conceptual diagram illustrating an example of the format of the signal. In this structure, the control device 18 may generate a signal (a display position correction signal or a convergence angle control signal) for shifting the position of the image based on the image signal in the horizontal direction by a distance corresponding to +k pixels or −k pixels, on the basis of the observation position information (distance information). A variation in the convergence angle or the virtual image distance when the position of the image is shifted a distance corresponding to one pixel in the horizontal direction may be measured in advance and the relationship therebetween may be stored in the control device 18. A display position correction signal for shifting the position of the image by a distance corresponding to +i pixels or −1 pixels in the horizontal direction, a display position correction signal for shifting the position of the image by a distance corresponding to +j pixels or −j pixels in the vertical direction, and a display position correction signal for rotating the image may be added to the signal and the signal may be transmitted to the image forming device 111 or 211. As such, it is possible to arrange the virtual image at a desired position by moving two images obtained by two image display devices 100, 200, 300, 400, or 500 for the right eye and the left eye on the basis of the observation position information (or the shift amount of the left and right images). That is, it is possible to adjust the convergence angle corresponding to the distance from the display apparatus to the observation target by adjusting the distance (interval) between two images displayed on the optical devices 120, 320, or 520 forming the image display devices 100, 200, 300, 400, or 500 in the horizontal direction. In addition, it is possible to arrange the virtual image at a desired position by moving two images obtained by two image display devices 100, 200, 300, 400, or 500 for the right eye and the left eye in parallel. That is, the position of the image displayed on the optical device 120, 320, or 520 forming the image display device 100, 200, 300, 400, or 500 can be adjusted depending on the observation position of the observer.

Figure 20B:
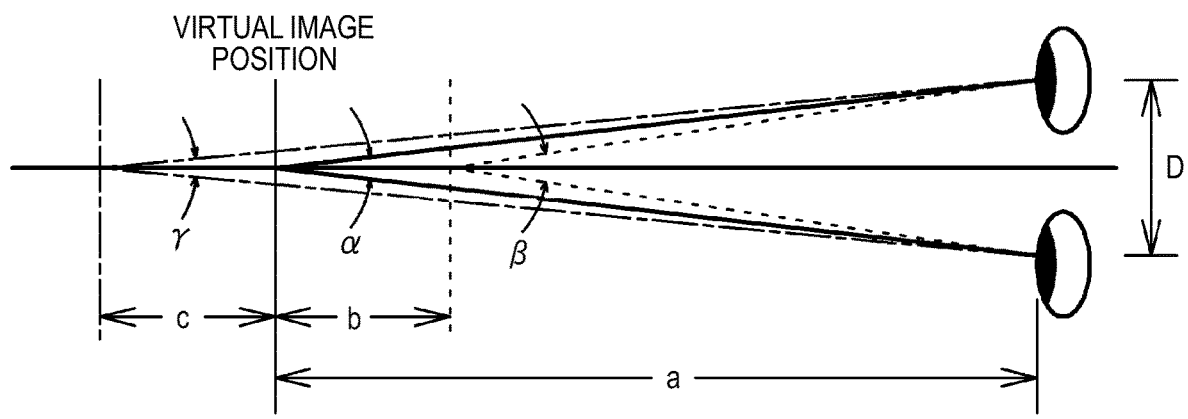
FIG. 20B is a schematic diagram illustrating the adjustment of a convergence angle depending on the distance from the display apparatus to the observation target.

The adjustment of the convergence angle corresponding to the distance from the display apparatus to the observation target will be described with reference to FIG. 20B. The virtual image distance of the image (character) which is based on the image signal and is displayed by the image display device is "a" and the convergence angle (X-axis direction) corresponding to the image is "$\alpha$". In addition, "$\gamma$" indicates the convergence angle of an image which the image is a distance "c" away from the virtual image distance a and "$\beta$" indicates the convergence angle of an image when the image is disposed at a position that is a distance "b" shorter than the virtual image distance a. In addition, the distance between the left and right pupils is "D". If D is 61.5 mm and a is 4000 mm, $\alpha$=53 minutes (53').

One pixel of the image forming device is defined to be 3 minutes (3'). When the image display position is shifted a distance corresponding to one pixel from a predetermined position to the inside in the horizontal direction, $\beta$ is 56 minutes (56') and b is 225 mm. On the other hand, when the image display position is shifted a distance corresponding to one pixel from a predetermined position to the outside in the horizontal direction, $\gamma$ is 50 minutes (50') and c is 228 mm. When a is 8000 mm and the image is shifted a distance corresponding to one pixel, the virtual image distance can be shifted about 1 m.

As such, it is possible to adjust the convergence angle by shifting the image display position by a distance corresponding to a desired number of pixels from a predetermined position in the horizontal direction. In other words, the image signal input to the image forming devices 111 or 211 forming two image display devices 100, 200, 300, 400, or 500 for the right eye and the left eye can be controlled on the basis of the display position correction signal to accurately adjust the convergence angle corresponding to the distance from the display apparatus to the observation target. As a result, the distance between the observation target and the observer (audience) can be equal to the virtual image distance of the image (caption) displayed by the image display device, or the distance can be as equal to the virtual image distance as possible. The observer (audience) who views the observation target can naturally view the image displayed by the image display device, with little modification or change in the focus.

It is preferable that virtual image distance a and the convergence angle α satisfy the following relationship.

$$a \times \tan(\alpha/2) = D/2$$

where D (unit: mm) satisfies, for example, 56≤D≤74

When the value of α is 0, the value of "a" is infinite. The virtual image distance a and the convergence angle α are not independently calculated according to the moving speed of the observer, but when the correspondence of one of them is defined, the other is automatically determined.

The display apparatus may further include a position measuring unit (distance measuring device) that measures the distance from the display apparatus to the observation target, and the position measuring unit (distance measuring device) may be used to acquire observation position information (distance information). For example, an imaging device with an auto focus function (imaging device including a passive distance measuring device) may include the position measuring unit (distance measuring device). Alternatively, a button or switch may be provided in the control device 18 and manually operated to set the distance from the display apparatus to the observation target. In these structures, an appropriate display position correction signal is generated in the control device 18 and is then added to the image signal. Alternatively, for example, in a movie theater or a theater, the display apparatus in which the convergence angle, the position of the image (caption) displayed on the optical device, the virtual image position, and the virtual image distance are predetermined according to the position of a seat for the observer (audience) may be loaned to the observer (audience). In this structure, an appropriate display position correction signal is determined and stored in the control device 18, and the display position correction signal is added to the image signal.

When the display apparatus is used in, for example, the theater, explanations for the content, progress, or background of a play may be displayed as images on the display apparatus. The virtual image distance needs to be a desired distance. That is, the distance between the observation target and the observer (audience) and the virtual image distance of the image (for example, characters) displayed by the image display device vary depending on the position where the audience sits. Therefore, it is necessary to optimize the virtual image distance depending on the position of the audience. In the display apparatus according to Example 9, as described above, since the convergence angle corresponding to the distance from the display apparatus to the observation target is optimized, the virtual image distance is optimized depending on the position of the audience. In some cases, the audience wants to change the virtual image distance according to scenes. In this case, observation position information (distance information) for the distance from the observer (display apparatus) to the observation target may be transmitted from the outside to the display apparatus. In this way, it is possible to respond to the requirements with ease.

Alternatively, the observer (the audience or the user) may set the virtual image distance to a desired distance or the virtual image position to a desired position. Specifically, a switch or button may be provided in the control device 18 and the observer may operate the switch or button to arrange the virtual image at a desired distance or position. For example, when the background is changed, the virtual image distance or the virtual image position can be arbitrarily changed. This operation may be automatically performed on the basis of, for example, the image signal, or it may be appropriately performed by the observer when the observation target is observed. Specifically, in this operation the control device 18 adds the display position correction signal and the convergence angle control signal to the image signal. Alternatively, in this operation, a moving device 40, which will be described below, operates. In this way, the audience can reliably read images (for example, characters, such as captions) with little movement of the line of sight and it is possible to easily displays images (for example, captions, specifically, different language captions) suitable for each audience at the same time.

The image signal is digital data and is generated before display. The image may be displayed at a position where it does not hinder the viewing of the observation target when the observer views the observation target. In addition, as described above, specifically, the image signal is wirelessly transmitted to the control device 18 by the character data wireless transmitting device 32 under the control of a computer (not shown) provided in the character data reproducing device 31 or the image data and character data reproducing device 31', on the basis of, for example, a predetermined schedule and time allocation, or the state of progress of the observation target.

In the display apparatus according to Example 9, the image signal may include brightness data or chromaticity data for characters to be displayed, in addition to the character data. In this case, it is possible to reliably solve the problem that it is difficult to visually recognize characters of the image (for example, a caption) due to the background of the characters. An example of the brightness data may be brightness data corresponding to the brightness of a predetermined region (for example, a region corresponding to lower one-third of the entire stage) including the observation target (for example, characters or the background) which is viewed through the image display device. An example of the chromaticity data may be chromaticity data corresponding to the chromaticity of a predetermined region including the observation target which is viewed through the image display device. In particular, in some cases, when the brightness of, for example, the screen or stage viewed through a semi-transmissive (see-through) optical device and the brightness or color balance of the characters displayed on the optical device are not within a predetermined range, it is difficult to observe the caption, screen, or stage with high visibility. However, it is possible to adjust the brightness or color of the characters to be displayed to be suitable for, for example, the screen or stage and improve the visibility of the characters. That is, it is possible to reliably solve the problem that it is difficult to visually recognize, for example, the characters of an explanation for the observation target which is viewed by the observer (audience) due to the background of the characters. When the display apparatus according to Example 9 is used to view, for example, a play, the image display device 100, 200, 300, 400, or 500 may display characters (for example, explanations for the state or background of the play, explanations for the actors, or the dialogue of the actors) related to the observation target at appropriate timing Specifically, for example, character data may be transmitted to the image display device 100, 200, 300, 400, or 500 and characters may be displayed by the image display device 100, 200, 300, 400, or 500 by the operation of the operator or under the control of a computer, according to the state of progress of a play.

When the virtual image position is fixed, eye strain is likely to occur. The reason is that, when the focus is fixed, the movement of the eye is reduced. Therefore, it is effective to appropriately move the virtual image distance or the virtual image position in order to reduce eye strain. That is, the positions of the virtual images formed by two optical devices or the distance (virtual image distance) of the virtual images formed by the two optical devices from the two optical devices may be changed over time. Specifically, for example, the position of the image may be shifted a distance corresponding to +2 pixels of the image forming device in the horizontal direction every five minutes for one minute, and return to the original position.

Example 10

Example 10 relates to the 1C-th display apparatus according to the embodiment of the present disclosure. The basic configuration and structure of the display apparatus according to Example 10 may be the same as those of the display apparatus according to Example 9 and thus the detailed description thereof will not be repeated.

In the display apparatus according to Example 10, after a predetermined period of time has elapsed from the input of an image signal to an image forming device, the formation of an image by the image forming device is stopped. In order to stop the formation of the image by the image forming device, that is, in order to change the mode of the display apparatus to, for example, the power saving mode, a signal indicating the image display time of the image display device or a signal for instructing the image forming device to stop the formation of the image is added to the image signal.

FIG. 18B shows an example of the image signal in Example 10. Data "TIME", which is a signal indicating the image display time of the image display device, is added to the image signal in Example 9 shown in FIG. 18A. A control device 18 displays an image (caption) on the image display device for the time (T seconds) corresponding to the data "TIME", stops the display of the image (caption) on the image display device, and changes to, for example, the power saving mode in which only a command receiving circuit 18A is operated and the operations of a signal processing circuit 18B, a timing adjusting circuit 18C, a transmitting circuit 18D, and a timing generating circuit 18E are stopped on the basis of commands from the command receiving circuit 18A. Then, when the command receiving circuit 18A receives the image signal again, the control device 18 resumes the operations of the signal processing circuit 18B, the timing adjusting circuit 18C, the transmitting circuit 18D, and the timing generating circuit 18E on the basis of commands from the command receiving circuit 18A.

As such, in the display apparatus according to Example 10, after a predetermined period of time has elapsed from the input of the image signal to the image forming device, the formation of an image by the image forming device is stopped. That is, the operation mode of the display apparatus is changed to, for example, the power saving mode after a predetermined period of time has elapsed. The unnecessary power consumption of the display apparatus is prevented.

Example 11

Figure 21A:
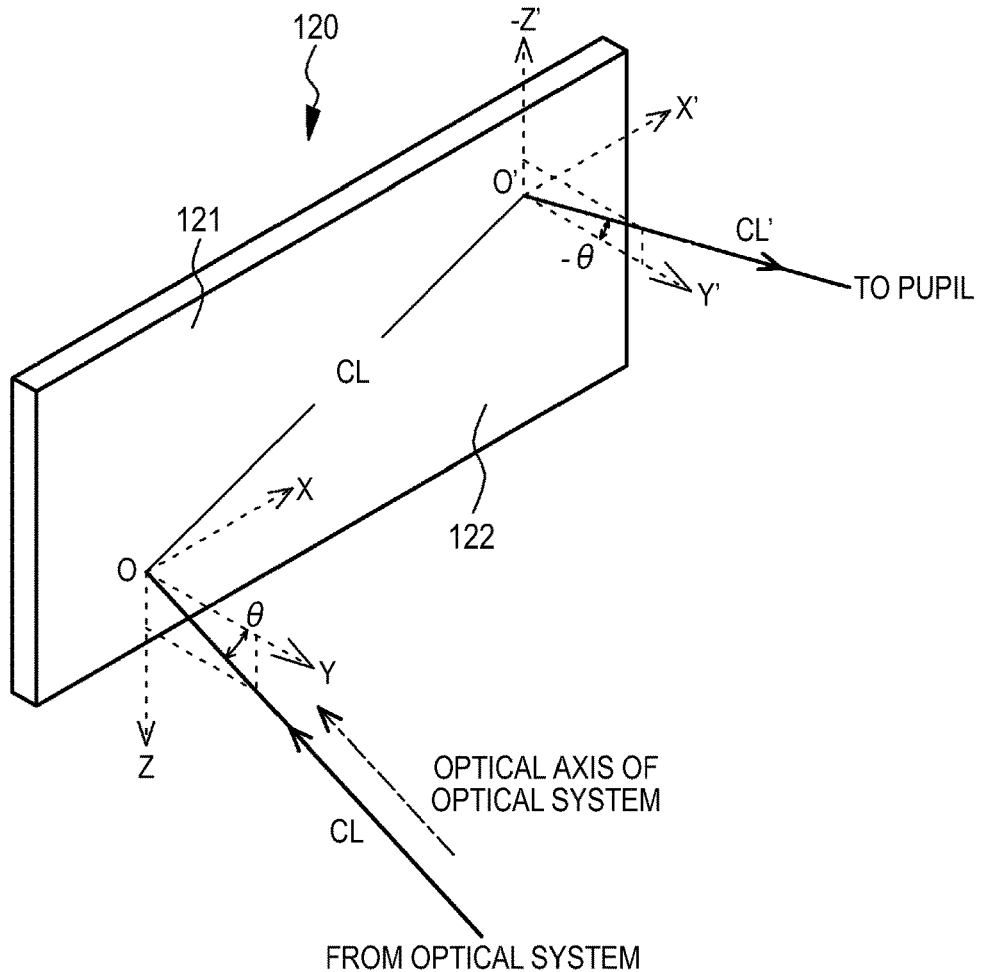
FIG. 21A is a schematic diagram illustrating the propagation of light in a light guide plate forming an image display device in a display apparatus according to Example 11.
Figure 21B:
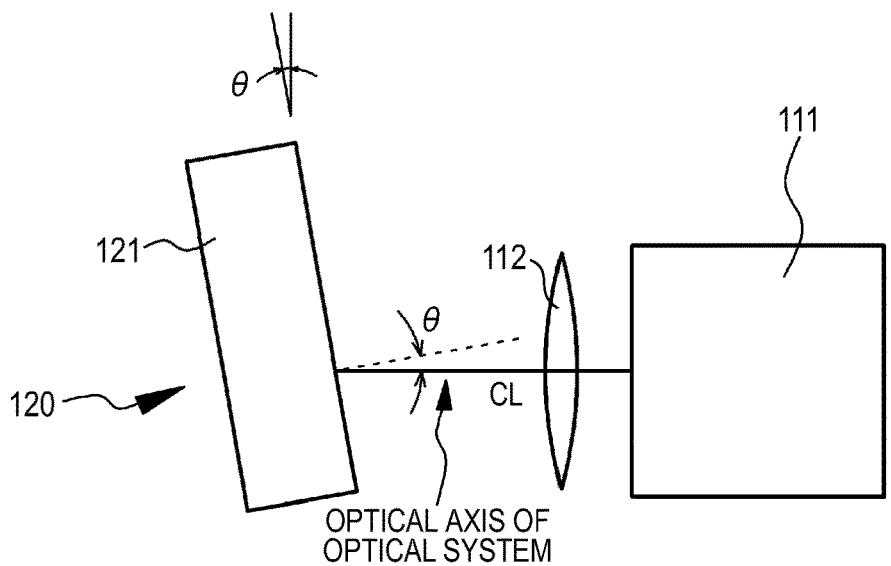
FIG. 21B is a conceptual diagram illustrating the arrangement of, for example, the light guide plate in the display apparatus according to Example 11.
Figure 22:
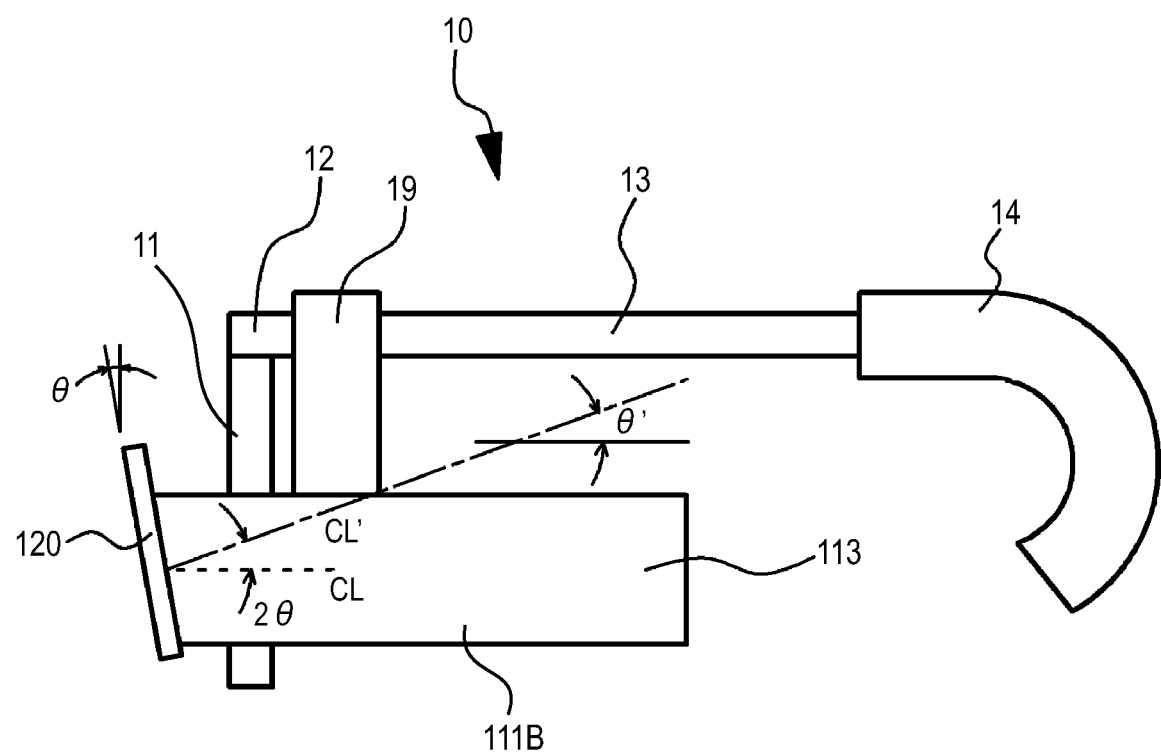
FIG. 22 is a schematic diagram illustrating the display apparatus according to Example 11, as viewed from the side.

Example 11 is a modification of the image display device according to each of Examples 9 and 10. FIGS. 21A and 21B are conceptual diagrams illustrating the arrangement of, for example, a light guide plate forming an image display device in a display apparatus according to Example 11, and FIG. 22 is a schematic side view illustrating the display apparatus according to Example 11.

In Examples 9 to 10, as shown in FIG. 13, the image display device 100 or 300 is designed such that the central incident beam CL which is emitted from the center of the image forming device 111 or 211 and passes through the image-forming-device-side node of the optical system 112 or 254 vertical collides with the light guide plate 121 or 321. That is, the image display device 100 or 300 is designed such that the central incident beam CL is incident on the light guide plate 121 or 321 at an incident angle of 0 degree. In this case, the center of the displayed image is aligned with the vertical direction of the first surface 122 or 322 of the light guide plate 121 or 321.

That is, in the image display device whose representative example is the image display device 100, as shown in FIG. 13, the central incident beam CL emitted from the center of the image forming device 111 or 211 on the optical axis of the collimating optical system 112 is converted into substantially parallel light by the collimating optical system 112 and is then vertically incident on the first surface (incident surface) 122 of the light guide plate 121. Then, the incident light travels in a propagation direction A while being totally reflected between the first surface 122 and the second surface 123 by a first deflection unit 130. Then, the central incident beam CL is reflected and diffracted by the second deflection unit 140, is vertically emitted from the first surface 122 of the light guide plate 121, and reaches the pupil 21 of the observer (audience).

Figure 24:
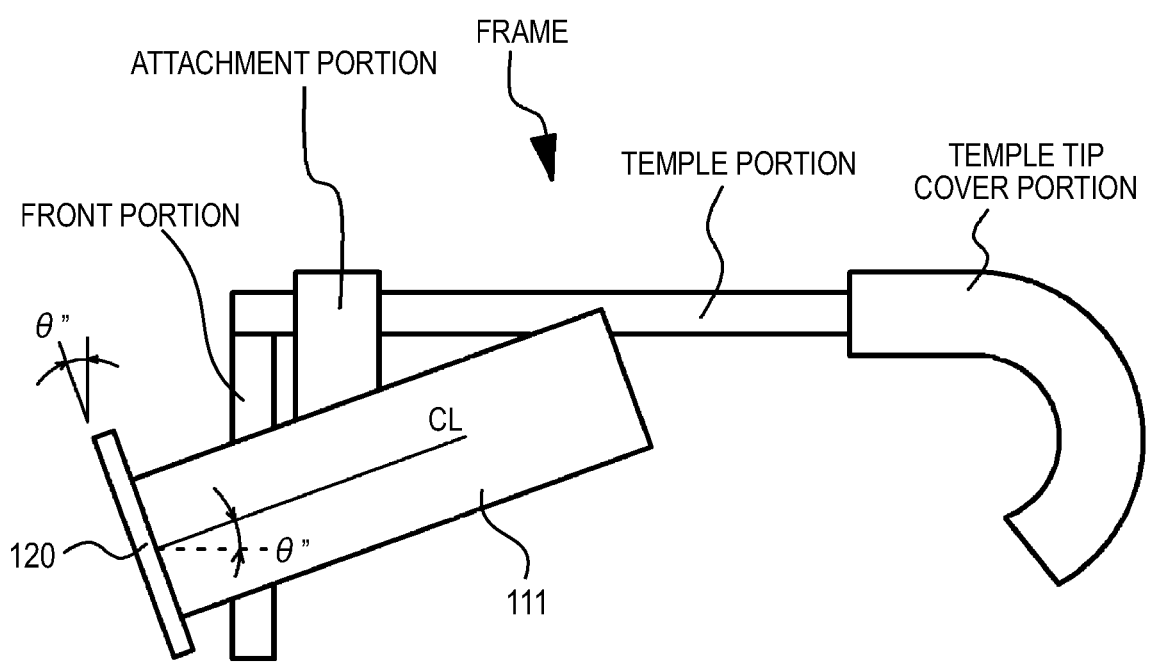
FIG. 24 is a schematic diagram illustrating a head-mounted display according to the related art which is compared with Example 9, as viewed from the side.

In the see-through display apparatus, when the observer (audience) views the observation target which is disposed in the horizontal direction, it is preferable that the optical device 120, 320, or 520 be arranged below the line of sight (the horizontal line of sight of the observer) of the observer in the horizontal direction in order to prevent the optical device 120, 320, or 520 from becoming an obstacle. In this case, the entire image display device 100 or 300 is arranged below the horizontal line of sight of the observer. In this structure, as shown in FIG. 24, it is necessary to incline the entire image display device 100 at an angle θ". In this case, in some cases, the inclination angle θ" of the image display device 100 is limited from the relationship with an attachment portion (temple portion) of the glasses-type frame attach for mounting the image display device 100 to the head of the observer, or flexibility in the design is reduced. Therefore, it is preferable to provide an image display device for achieving high flexibility in arrangement and high flexibility in the design, in order to prevent the image display device from becoming an obstacle in the horizontal sight of line of the observer.

In Example 11, the central incident beam CL intersects the XY plane at an angle (θ) other than 0 degree. In addition, the central incident beam CL is included in the YZ plane. In Example 11 or Example 12, which will be described below, the optical axis of the optical system 112 or 254 is included in the YZ plane and intersects the XY plane at an angle other than 0 degree, specifically, at the angle θ (see FIGS. 21A and 21B). In Example 11 or Example 12, which will be described below, if the XY plane is aligned with the horizontal plane, the intersection angle between the central incident beam CL and the XY plane is an elevation angle. That is, the central incident beam CL travels from under the XY plane to the XY plane and collides with the XY plane. The XY plane intersects the vertical plane at an angle other than 0 degree, specifically, at the angle θ.

Figure 23A:
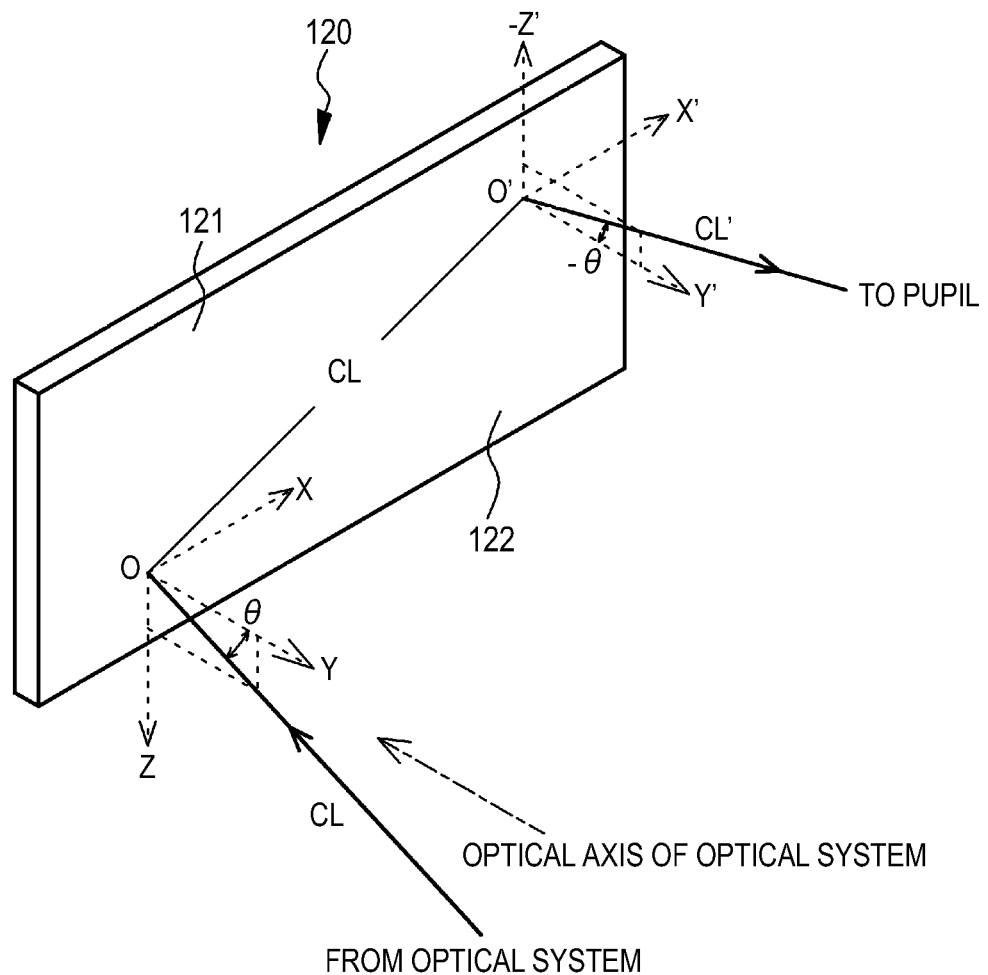
FIG. 23A is a schematic diagram illustrating the propagation of light in a light guide plate forming an image display device in a display apparatus according to Example 12.

In Example 11, θ is 5 degrees. Specifically, in this structure, the central incident beam CL (represented by a dotted line in FIG. 22) is included in the horizontal plane. The optical device 120, 320, or 520 is inclined at the angle θ with respect to the vertical plane. In other words, the optical device 120, 320, or 520 is inclined an angle (90-θ) with respect to the horizontal plane. A central incident beam CL' (represented by a one-dot chain line in FIG. 22) emitted from the optical device 120, 320, or 520 is inclined at an angle 2θ with respect to the horizontal plane. That is, when the observer views an object at infinity in the horizontal direction, the central incident beam CL' which is emitted from the optical device 120, 320, or 520 and is then incident on the pupil of the observer has a depression angle θ' (=2θ) (see FIG. 22). The angle formed between the central incident beam CL' and the normal line of the optical device 120, 320, or 520 is θ. In FIG. 21A or FIG. 23A, which will be described below, a point of the optical device 120, 320, or 520 from which the central incident beam CL' is emitted is "O'" and axis lines which are parallel to the X-axis, the Y-axis, and the Z-axis passing through the point O' are referred to as an X'-axis, a Y'-axis, and a Z'-axis.

In the image display device according to Example 11, the central incident beam CL intersects the XY plane at an angle (θ) other than 0 degree. The central incident beam CL' emitted from the optical device is incident on the pupil of the observer (audience) at a depression angle θ' and the relationship θ'=2θ is established. In the example shown in FIG. 24, in order to obtain the same depression angle, the entire image display device needs to be inclined by an angle θ". In this case, θ" and A satisfy the relationship θ"=2θ. Finally, in the example shown in FIG. 24, the optical device needs to be inclined at an angle 2θ with respect to the vertical plane. In Example 11, the optical device may be inclined at an angle θ with respect to the vertical plane and the image forming device may be held in horizontal. Therefore, when the image display device is attached to the attachment portion of the glasses-type frame, limitations in the attachment angle of the image display device are reduced and high flexibility in the design can be acquired. In addition, since the inclination angle of the optical device with respect to the vertical plane is less than that of the example shown in FIG. 24, external light is less likely to be reflected from the optical device and incident on the pupil of the observer (audience). Therefore, a high-quality image can be displayed.

The configuration and structure of the display apparatus according to Example 11 are the same as those of the display apparatus according to each of Examples 9 and 10 except for the above-mentioned difference and thus the detailed description thereof will not be repeated.

Example 12

Figure 23B:
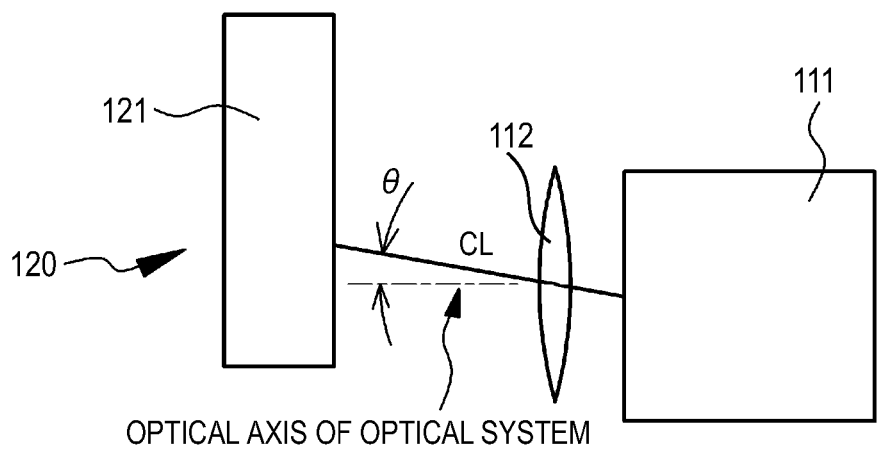
FIG. 23B is a conceptual diagram illustrating the arrangement of, for example, the light guide plate in the display apparatus according to Example 12.

Example 12 is a modification of the image display device according to Example 11. FIGS. 23A and 23B are conceptual diagrams illustrating the arrangement of, for example, a light guide plate forming an image display device according to Example 12. In Example 12, the optical axis of an optical system (a parallel light emission optical system or a collimating optical system) 112 is parallel to the YZ plane and the XY plane and passes through a position deviating from the center of an image forming device 111 or 211. In this structure, a central incident beam CL is included in the YZ plane and intersects the XY plane at a depression angle θ. The configuration and structure of the display apparatus according to Example 12 are the same as those of the display apparatus according to each of Examples 9 to 11 and thus the detailed description thereof will not be repeated.

Example 13

Examples 13 to 16 are modifications of the display apparatuses according to Examples 9 to 12. Example 13 relates to the 3A-th display apparatus according to the embodiment of the present disclosure. The basic configuration and structure of the display apparatus according to Example 13 or each of Examples 14 to 16, which will be described below, may be the same as those of the display apparatus according to each of Examples 9 to 12 and thus the detailed description thereof will not be repeated.

Figure 25:
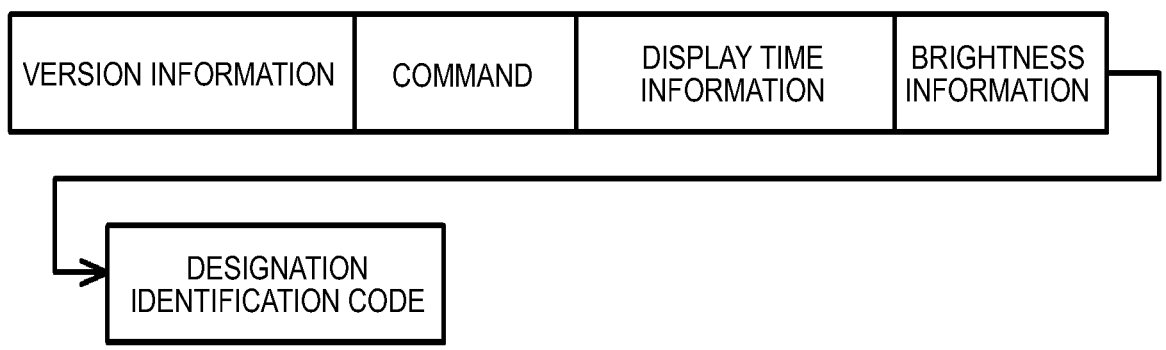
FIG. 25 is a conceptual diagram illustrating the file structure of data forming a data group in Example 13.

The display apparatus according to Example 13 displays, for example, the dialogue of the actors as captions in a play. A data group is stored in a storage unit (not shown), which is a memory card, provided in a control unit 618 having a known circuit configuration. In Example 13, the data group is a set of character data, which is image data having, as images, character strings which are obtained by editing the dialogue of the actors in each scene of the play. The file format of the image data may be substantially arbitrary. FIG. 25 is a conceptual diagram illustrating the data structure of an image signal (character data) forming the data group. Each of the character data items forming the data group has a designation identification code given thereto. The designation identification code includes, for example, numbers.

Figure 26A:
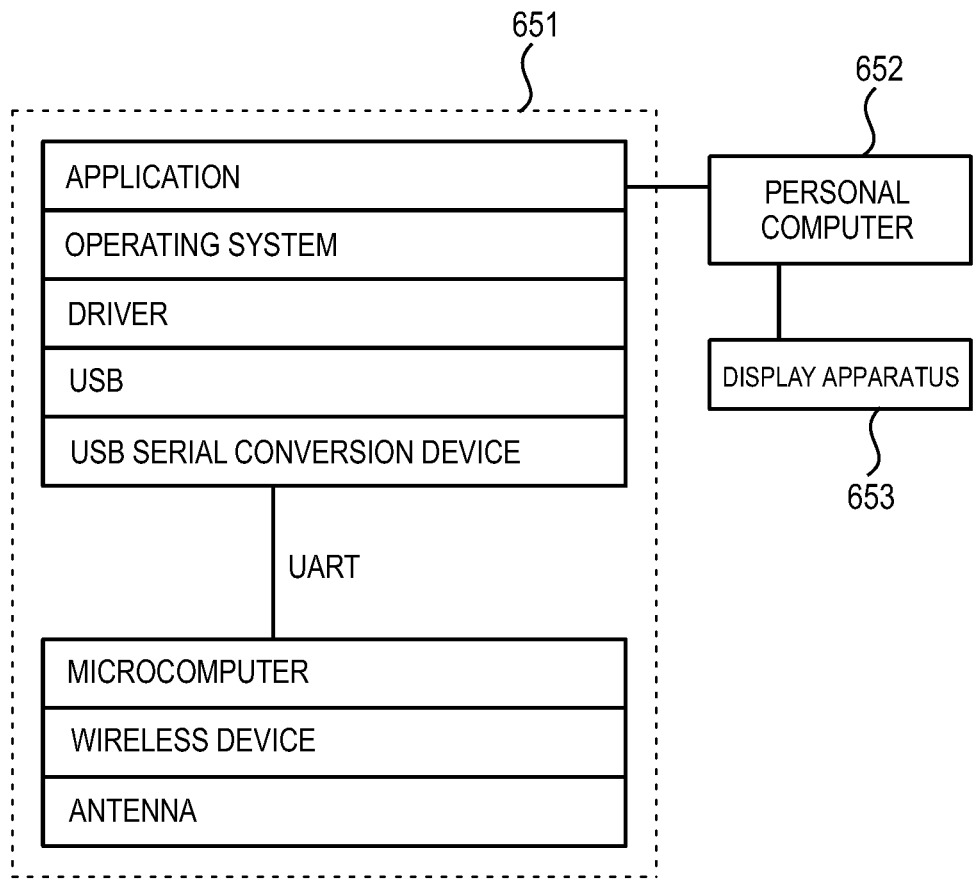
FIG. 26A is a block diagram illustrating the system structure of a transmitting device in Example 13.
Figure 26B:
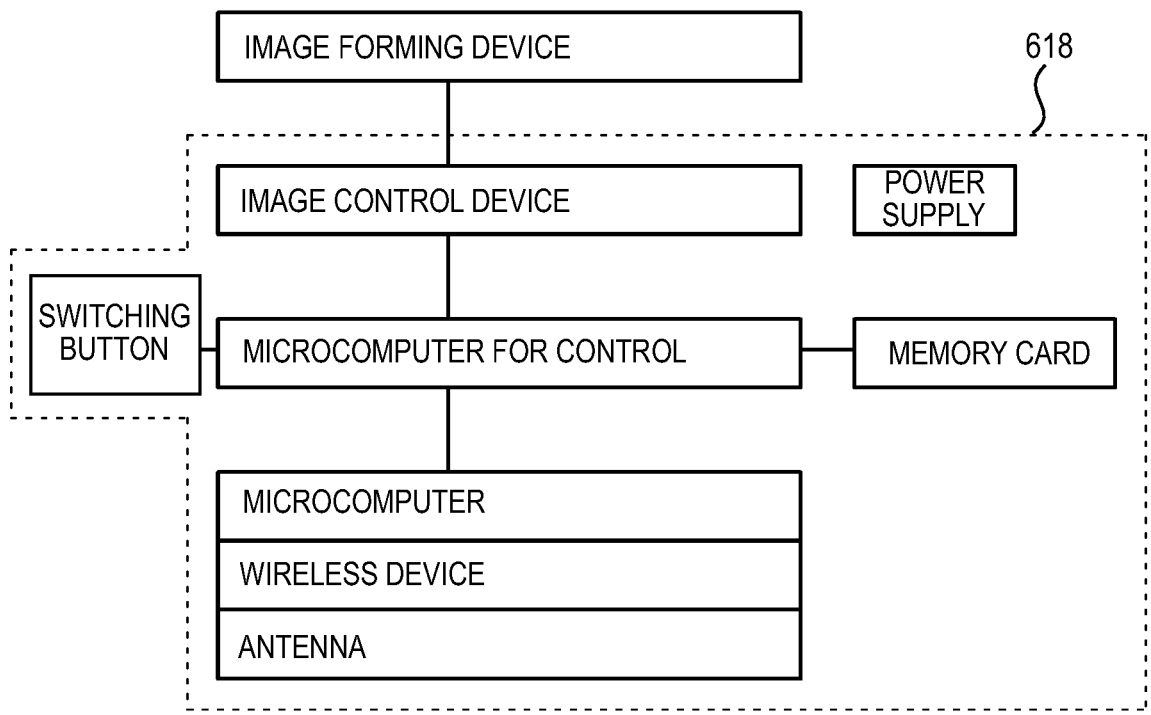
FIG. 26B is a block diagram illustrating the system structure of a display apparatus in Example 13.
Figure 27:
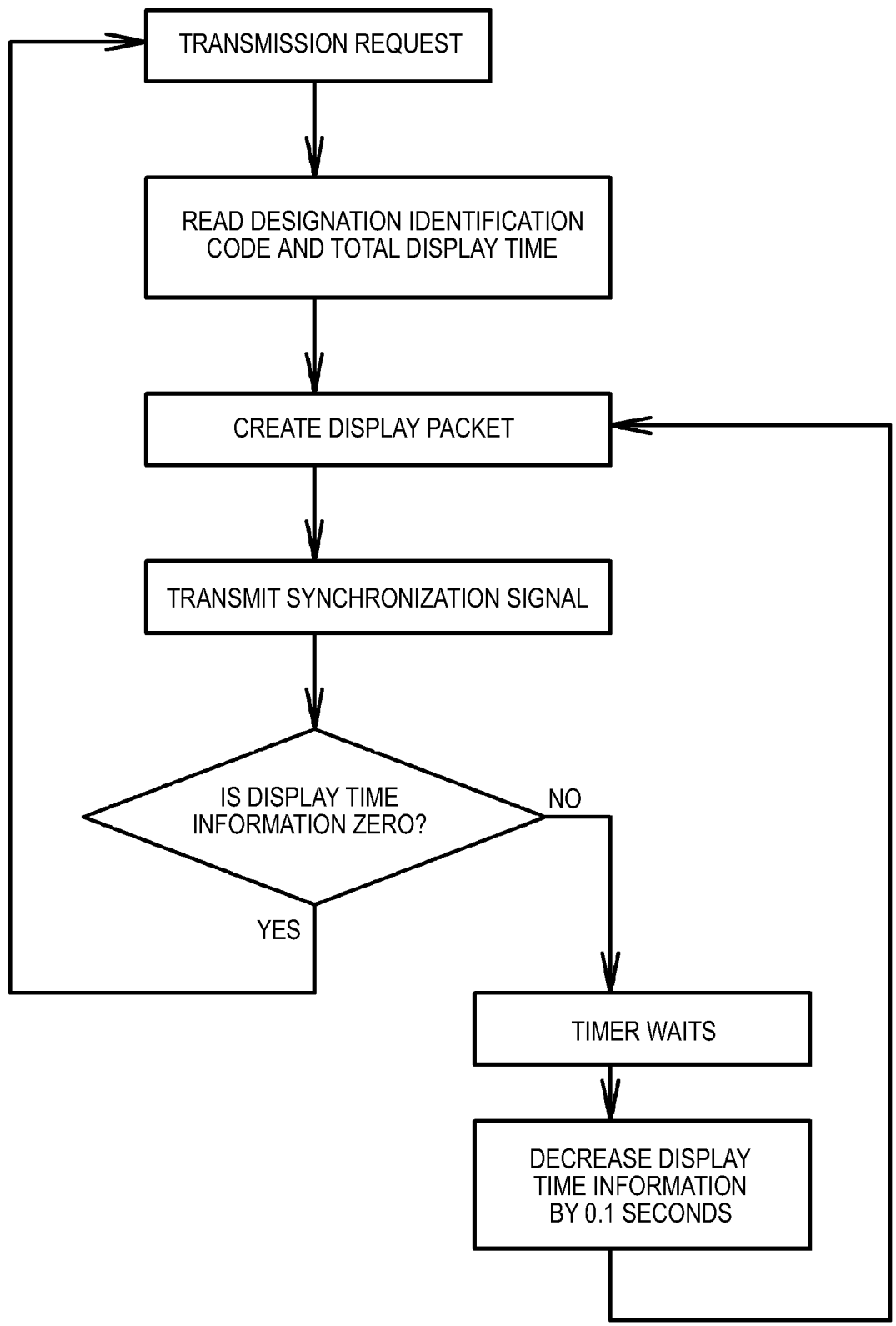
FIG. 27 is a diagram illustrating the flow of a transmitting process of the transmitting device in Example 13.
Figure 28:
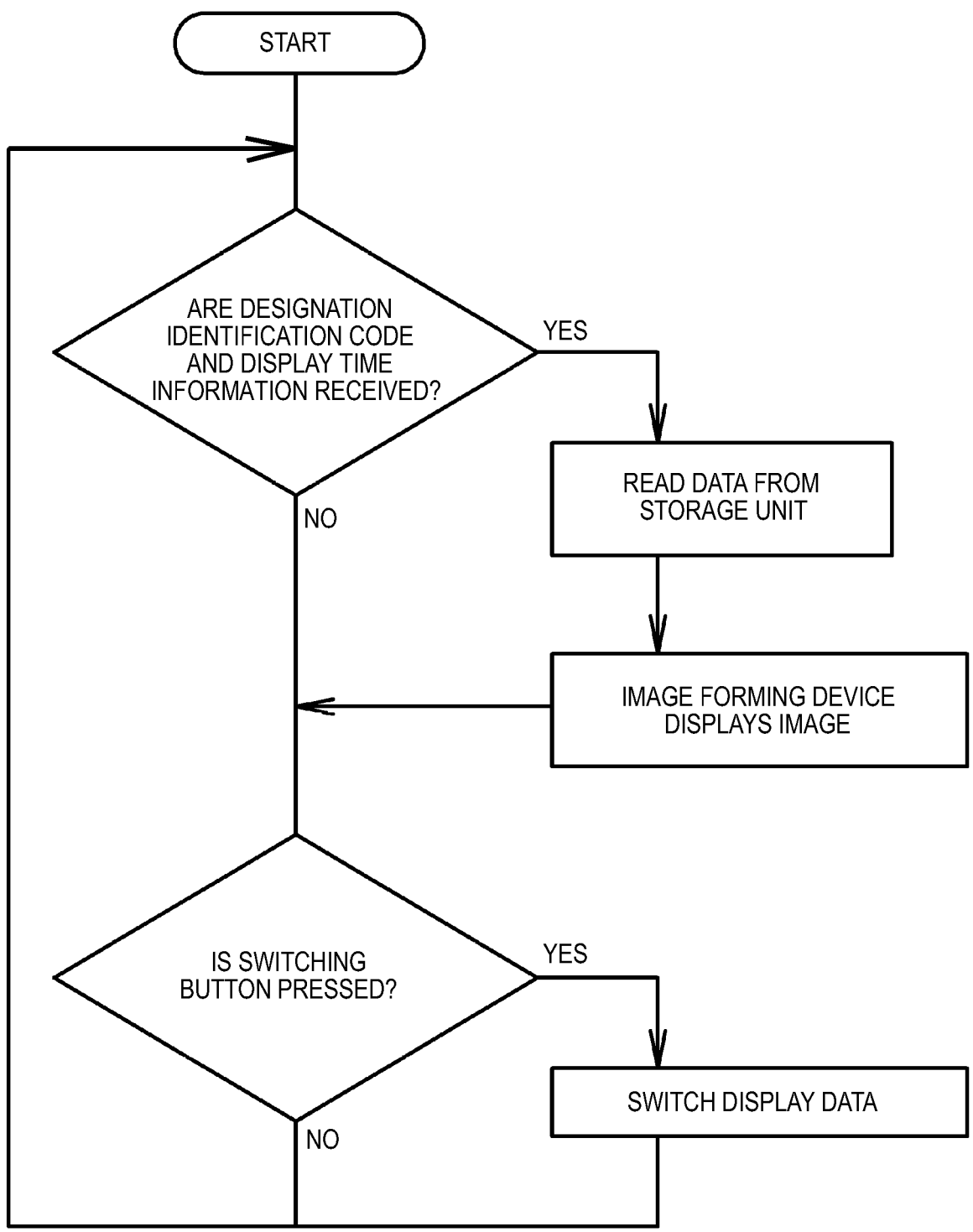
FIG. 28 is a diagram illustrating the flow of a receiving process in the display apparatus according to Example 13.

FIG. 26A is a block diagram illustrating the system structure of a transmitting device (transmitting unit) 651 and FIG. 26B is a block diagram illustrating the system structure of a control device 618 of the display apparatus in Example 13. FIG. 27 is a diagram illustrating the flow of a transmitting process of the transmitting device 651 in Example 13 and FIG. 28 is a diagram illustrating the flow of a receiving process of the control device 618 in Example 13.

Figures 29A, 29B:
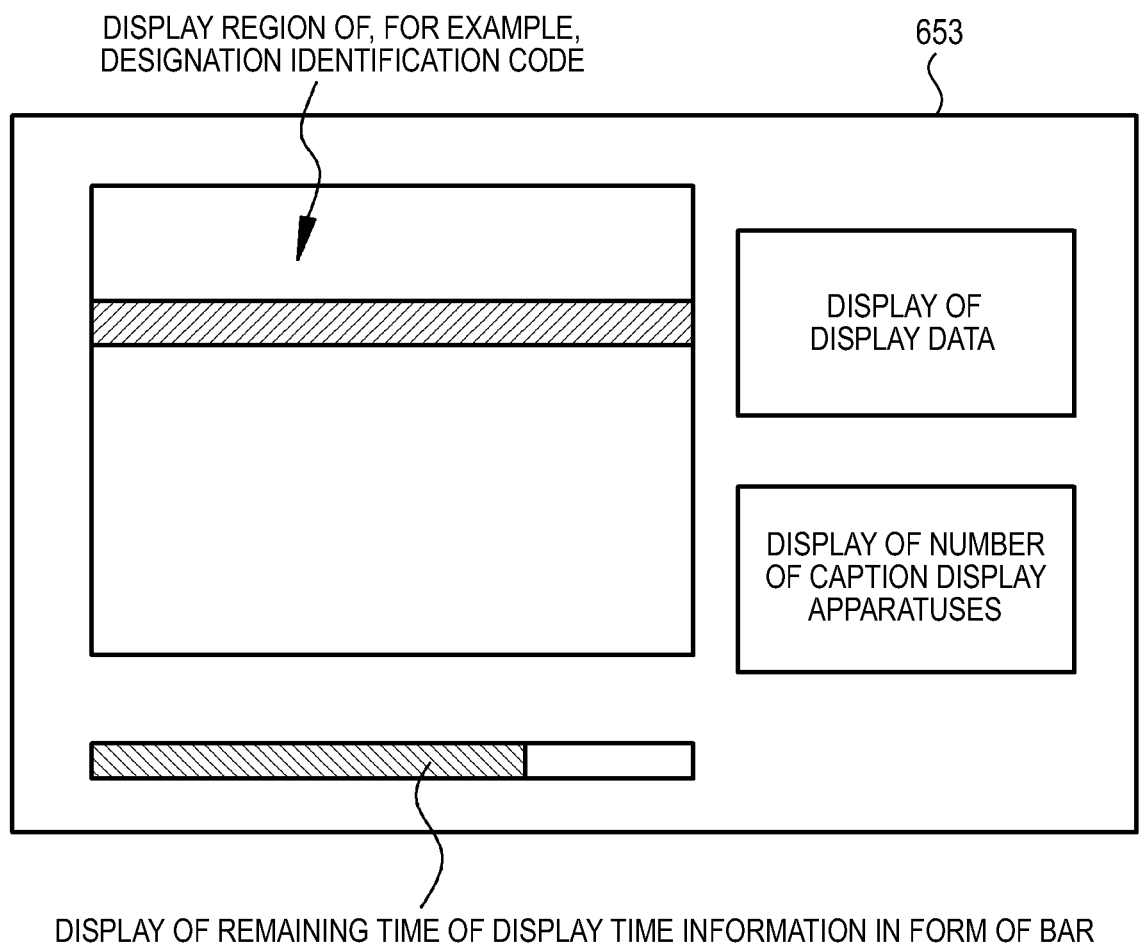
FIGS. 29A and 29B are a table and a schematic diagram illustrating a designation identification code, a data group, a plurality of data items forming the data group, and the total display time displayed on a display apparatus forming the transmitting device in Example 13, respectively.

The transmitting device 651 having a known circuit structure includes, for example, a personal computer 652 and a display apparatus 653, which is a known liquid crystal display device. As shown in FIGS. 29A and 29B, the display apparatus 653 displays, for example, the designation identification code, a plurality of character data items forming the data group, the total display time of each character data item, and brightness information. The display apparatus 653 may include a region in which display data (different size display data or different language display data) forming the character data is displayed and a region in which the number of display apparatus receiving various kinds of information from the transmitting device 651 is displayed. In addition, the display apparatus 653 further includes a region in which the ratio of display time information $T_{Inf}$ to the total display time $T_{total}$ is displayed as a "horizontal bar". In a "region for displaying the designation identification code and the like", a cursor is placed in a hatched portion and a display color is reversed.

Immediately before the dialogue of the actor starts in the play, the designation identification code and the display time information are transmitted from the outside to the control section 618 at a predetermined interval. The time corresponding to the display time information corresponds to a predetermined period of time in the 1C-th display apparatus or the 3A-th display apparatus according to the embodiment of the present disclosure. Specifically, for example, when the operator operates a pointing device or a keyboard (not shown) provided in the personal computer 652 to designate a line of the designation identification code, a plurality of character data items forming a data group, and the total display time of each character data item displayed on the display apparatus 653, the personal computer 652 reads the designated designation identification code and total display time, calculates display time information, creates a display packet, and transmits the designation identification code, the display time information, and a synchronization signal to the control section 618 of the display apparatus. Examples of the pointing device may include a joystick, a pointing stick (track point), a touch pad, a touch panel, a stylus pen, a data glove, a track ball, a pen tablet, a mouse, a light pen, and a joy pad.

Specifically, as described above, the display time information $T_{Inf}$ may be represented as follows using the total display time $T_{total}$ and a predetermined time interval $T_{int}$.

$$T_{Inf}(m) = T_{total} - (m-1) \times T_{int}$$

The designation identification code and the display time information $T_{Inf}$ are transmitted from the outside (transmitting device 651) to the control device 618 at the predetermined time interval $T_{int}$. For example, when $T_{total}$ is 10.0 seconds and $T_{int}$ is 0.1 seconds, the display time information $T_{Inf}(m)$ when the designation identification code and the display time information are transmitted from the outside (transmitting device 651) to the control device 618 for the first time (m=1) is as follows $$T_{Inf}(1) = 10.0 \text{ seconds}$$

The transmitting device 651 determines whether $T_{Inf}=0$ (sec) is established. When $T_{Inf}$ is not 0 seconds, a timer waits and the transmitting device 651 decreases $T_{Inf}$ by $T_{int}$ (specifically, 0.1 seconds). After $T_{int}$ (specifically, 0.1 seconds) has elapsed, the transmitting device 651 transmits the designation identification code and the display time information $T_{Inf}(2)=9.9$ seconds. This operation is repeated until $T_{Inf}=0$ (second) is established.

When receiving the designation identification code and the data identification code, the control device 618 reads character data with the data identification code identical to the transmitted designation identification code from the storage unit. For the time corresponding to the transmitted display time information $T_{Inf}$, the image based on the character data is displayed by the image forming device 111 or 211. When the same designation identification code and different display time information $T_{Inf}$ are transmitted from the external (transmitting device 651) to the control device 618 after the display of the image by the image forming device 111 or 211 starts, the control device 618 ignores the designation identification code and the display time information $T_{Inf}$ and continuously displays the image. In the operation, the control device 618 may raise a flag (reception completion flag). When the control device 618 fails to receive the designation identification code and/or the display time information $T_{Inf}$ which are transmitted from the transmitting device 651 for the first to (m'-1)-th times for any reason and first succeeds in receiving the designation identification code and the display time information $T_{Inf}$ from the transmitting device 651 for the m'-th time, the image forming device 111 or 211 displays the image based on the character data for the time corresponding to $T_{Inf}(m')=T_{total}-(m'-1) \times T_{int}$.

As such, in Example 13, even when the control device 618 fails to receive the designation identification code and/or the display time information transmitted from the outside, it is possible to try to receive the designation identification code and the display time information again or repeatedly. Therefore, it is possible to reliably receive the designation identification code and the display time information. As a result, for example, even when a plurality of display apparatuses receive the designation identification code and the display time information, they can reliably display the same image at the same time, and it is possible to reliably solve the problem that it is difficult for the display apparatus to display an image.

In Example 13, the image forming device 111 or 211 can display an image while brightness is controlled by brightness information. Specifically, in addition to the designation identification code and the display time information, information about the brightness of the image to be displayed on the optical device can be transmitted from the outside (transmitting device 651) to the display apparatus, thereby improving the visibility of the displayed image.

In Example 13 (or display apparatuses according to Examples 14 to 16, which will be described below, if necessary), a data group including a plurality of character data items for displaying an image (for example, a caption) may be stored in the storage unit provided in the control device 618. A data identification code may be given to each of the character data items forming the data group. The control device 618 may receive the designation identification code and display time information transmitted from the outside at a predetermined time interval and read the character data with the data identification code identical to the transmitted designation identification code from the storage unit. The image based on the character data may be displayed on the image forming device for the time corresponding to the transmitted display time information.

Example 14

Example 14 relates to the 3B-th display apparatus according to the embodiment of the present disclosure. In Example 14, the display apparatus and the image display device according to Example 13 can be applied. However, in Example 14, a switching button (see FIG. 26B) or a switch may be provided in a control device 618 in order to set the distance between an observation target and the display apparatus. The distance from the display apparatus to the observation target is set manually, that is, by the operation of the switching button or the switch according to the seat of the observer (audience). For example, four kinds of distances, such as a "short distance," a "medium distance," a "long distance", and a "very long distance" may be given as examples of the distance from the display apparatus to the observation object.

In the display apparatus according to Example 14, similarly to Example 13, a data group including a plurality of character data items is stored in a storage unit provided in a control device 618. A data identification code is given to each of the character data items forming the data group.

However, unlike Example 13, each character data item includes a plurality of different size display data items with different display sizes. Specifically, in Example 14, it is assumed that display data with different display sizes is image data having character strings with different font sizes as images. The data structure of one different size display data item may be the same as that shown in FIG. 25.

Similarly to Example 13, the data identification code is given to each character data item.

In Example 14, similarly to Example 13, the designation identification code is transmitted from the outside (transmitting device 651) to the control device 618. Then, the control device 618 reads, from the storage unit, one of a plurality of different size display data items in the character data with the data identification code identical to the transmitted designation identification code, depending on the distance between the observation target and the display apparatus, specifically, depending on the distance from the display apparatus to the observation target which is set by the operation of the switching button or the switch provided in the control device 618, and displays the image based on the one different size display data item on the image forming device.

In an image display method according to Example 14, similarly to Example 13, the designation identification code and display time information $T_{Inf}$ may be transmitted from the outside (transmitting device 651) to the control device 618 at a predetermined time interval $T_{int}$ and the image forming device may display an image for the time corresponding to the transmitted display time information $T_{Inf}$.

Information about the distance from the display apparatus to the observation target may be wirelessly transmitted from the outside to the display apparatus. Alternatively, the display apparatus may further include a distance measuring device that measures the distance from the display apparatus to the observation target and acquire the distance information using the distance measuring device. An example of an imaging device including the distance measuring device may be an imaging device with an auto focus function (imaging device including a passive distance measuring device).

As such, in the display apparatus according to Example 14, the control device 618 reads, from the storage unit, one of the plurality of different size display data items in the character data with the data identification code identical to the transmitted designation identification code, depending on the distance between the observation target and the display apparatus and displays the image based on the one different size display data item on the image forming device. Therefore, there is no mismatch between the size of the observation target viewed by the eye and the size of the image.

In the display apparatus according to Example 14, a data group including a plurality of character data items may be stored in the storage unit provided in the control device 618. A data identification code may be given to each of the character data items forming the data group. Each character data item may include a plurality of different size display data items with different display sizes. The control device 618 may receive a designation identification code transmitted from the outside and read, from the storage unit, one of the plurality of different size display data items in the character data with the data identification code identical to the transmitted designation identification code, depending on the distance between the observation target and the display apparatus. The image based on the one different size display data item may be displayed on the image forming device.

The display apparatus according to Example 13 and the display apparatus according to Example 14 may be combined with each other. That is, in the display apparatus according to Example 13, each character data item may include a plurality of different size display data items with different display sizes. The control device 618 may receive a designation identification code transmitted from the outside and read, from the storage unit, one of a plurality of different size display data items in the character data with the data identification code identical to the transmitted designation identification code, depending on the distance between the observation target and the display apparatus. The image based on the one different size display data item may be displayed on the image forming device.

Example 15

Example 15 relates to the 3C-th display apparatus according to the embodiment of the present disclosure. In Example 15, the display apparatus and the image display device according to Example 13 can be applied. In a display apparatus according to Example 15, similarly to Example 13, a storage unit provided in a control device 618 stores a data group including a plurality of character data items, and a data identification code is given to each of the character data items forming the data group.

However, unlike Example 13, each character data item includes a plurality of different language display data items with different display languages. Examples of the language may include Chinese, Korean, and English. Specifically, in Example 15, display data items with different display languages are image data having character strings with different languages as images. The data structure of one different language display data item may be the same as that shown in FIG. 25. Similarly to Example 13, the data identification code is given to each character data item.

In Example 15, similarly to Example 13, the designation identification code is transmitted from the outside (transmitting device 651) to the control device 618. Then, the control device 618 reads, from the storage unit, one of a plurality of different language display data items in the character data with the data identification code identical to the transmitted designation identification code and displays the image based on the one different language display data item on the image forming device. A switching button (see FIG. 26B) or a switch may be provided in the control device 618 to manually select the display language.

As such, in the display apparatus according to Example 15, the control device 618 reads, from the storage unit, one of the plurality of different language display data items in the character data with the data identification code identical to the transmitted designation identification code and displays the image based on the one different language display data item on the image forming device. Therefore, it is possible to easily display an image in the language used by the observer (audience).

In Example 15, the display apparatus according to Example 13 can be applied. Specifically, in Example 15, similarly to Example 13, the control device 618 reads, from the storage unit, one of the plurality of different language display data items in the character data with the data identification code identical to the transmitted designation identification code and displays the image based on the one different language display data item on the image forming device. That is, a designation identification code and display time information $T_{Inf}$ are transmitted from the outside (transmitting device 651) to the control device 618 at a predetermined time interval $T_{int}$, and the image forming device displays an image for the time corresponding to the transmitted display time information $T_{Inf}$.

The display apparatus according to Example 15 and the display apparatus according to Example 14 may be combined with each other. That is, each different size display data item may include a plurality of different language display data items with different display languages. The control device 618 may select one of the plurality of different size display data items in the character data with the data identification code identical to the transmitted designation identification code, depending on the distance between the observation target and the display apparatus, and read, from the storage unit, one of the plurality of different language display data items in the one different size display data item. The image based on the one different language display data item may be displayed on the image forming device. In this case, the designation identification code and the display time information $T_{Inf}$ are transmitted from the outside (transmitting device 651) to the control device 618 at a predetermined time interval $T_{int}$, and the image forming device displays the image for the time corresponding to the transmitted display time information $T_{Inf}$.

In the display apparatus according to Example 15, the storage unit provided in the control device 618 may store a data group including a plurality of character data items. A data identification code may be given to each of the character data items forming the data group. Each character data item may include a plurality of different size display data items with different display sizes. The control device 618 may receive a designation identification code transmitted from the outside and read, from the storage unit, one of a plurality of different language display data items in the character data with the data identification code identical to the transmitted designation identification code. The image based on the one different language display data item may be displayed on the image forming device.

The display apparatus according to Example 13 and the display apparatus according to Example 15 may be combined with each other. That is, in the display apparatus according to Example 13, each character data item may include a plurality of different language display data items with different display languages. The control device 618 may read, from the storage unit, one of the plurality of different language display data items in the character data with the data identification code identical to the transmitted designation identification code. The image based on the one different language display data item may be displayed on the image forming device.

The display apparatus according to Example 14 and the display apparatus according to Example 15 may be combined with each other. That is, in the display apparatus according to Example 14, each different size display data item may include a plurality of different language display data items with different display languages. The control device 618 may select one of the plurality of different size display data items in the character data with the data identification code identical to the transmitted designation identification code, depending on the distance between the observation target and the display apparatus, and read, from the storage unit, one of the plurality of different language display data items in the one different size display data item. The image based on the one different language display data item may be displayed on the image forming device.

The display apparatus according to Example 13 and the display apparatuses according to Examples 14 and 15 may be combined with each other. That is, in the display apparatus according to Example 13, each different size display data item may include a plurality of different language display data items with different display languages. The control device 618 may select one of the plurality of different size display data items in the character data with the data identification code identical to the transmitted designation identification code, depending on the distance between the observation target and the display apparatus, and read, from the storage unit, one of the plurality of different language display data items in the one different size display data item. The image based on the one different language display data item may be displayed on the image forming device.

Example 16

Example 16 relates to the 3D-th display apparatus according to the embodiment of the present disclosure. In Example 16, the display apparatus and the image display device according to Example 13 can be applied.

In the display apparatus according to Example 16, similarly to Example 13, a storage unit provided in a control device 618 stores a data group including a plurality of character data items and a data identification code is given to each of the character data items forming the data group. Each character data item has the same data structure as that described in Example 13. Similarly to Example 13, the data identification code is given to each character data item.

In Example 16, similarly to Example 13, a designation identification code is transmitted from the outside (transmitting device 651) to the control device 618. Then, the control device 618 reads the character data with the data identification code identical to the transmitted designation identification code from the storage unit and performs data processing depending on the distance between the observation target and the display apparatus. The image forming device displays the image based on the character data, with a convergence angle controlled. Image processing may be performed on the character data input to the image forming device forming at least one image display device on the basis of the distance from the display apparatus to the observation target. In Example 16, image processing is performed on the character data input to the image forming devices forming two image display devices.

That is, in the display apparatus according to Example 16, the storage unit provided in the control device 618 may store a data group including a plurality of character data items. A data identification code may be given to each of the character data items forming the data group. The control device 618 may receive a designation identification code transmitted from the outside, read the character data with the data identification code identical to the transmitted designation identification code from the storage unit, and perform data processing depending on the distance between the observation target and the display apparatus. The image based on the character data may be displayed on the image forming device, with the convergence angle controlled.

In Example 16, the display apparatus according to Example 13 can be applied. Specifically, in Example 16, similarly to Example 13, the control device 618 reads the character data with the data identification code identical to the transmitted designation identification code from the storage unit and the image forming device displays the image based on the character data. A designation identification code and display time information $T_{Inf}$ are transmitted from the outside (transmitting device 651) to the control device 618 at a predetermined time interval $T_{int}$ and the image forming device displays the image for the time corresponding to the transmitted display time information $T_{Inf}$.

The display apparatus according to Example 14 and the display apparatus according to Example 16 may be combined with each other. That is, in the display apparatus according to Example 14, each character data item may include a plurality of different size display data items with different display sizes. The control device 618 may read, from the storage unit, one of the plurality of different size display data items in the character data with the data identification code identical to the transmitted designation identification code, depending on the distance between the observation target and the display apparatus, and perform data processing depending on the distance between the observation target and the display apparatus. The image based on the one different size display data item may be displayed on the image forming device, with the convergence angle controlled.

The display apparatus according to Example 14 and the display apparatuses according to Examples 15 and 16 may be combined with each other. That is, in the display apparatus according to Example 14, each different size display data item may include a plurality of different language display data items with different display languages. The control device 618 may select one of the plurality of different size display data items in the character data with the data identification code identical to the transmitted designation identification code, depending on the distance between the observation target and the display apparatus, read, from the storage unit, one of the plurality of different language display data items in the one different size display data item, and perform data processing depending on the distance between the observation target and the display apparatus. The image based on the one different language display data item may be displayed on the image forming device, with the convergence angle controlled.

The display apparatus according to Example 15 and the display apparatus according to Example 16 may be combined with each other. That is, in the display apparatus according to Example 15, each character data item may include a plurality of different language display data items with different display languages. The control device 618 may read, from the storage unit, one of the plurality of different language display data items in the character data with the data identification code identical to the transmitted designation identification code, depending on the distance between the observation target and the display apparatus, and perform data processing depending on the distance between the observation target and the display apparatus. The image based on the one different language display data item may be displayed on the image forming device, with the convergence angle controlled.

Example 17

Figure 30A:
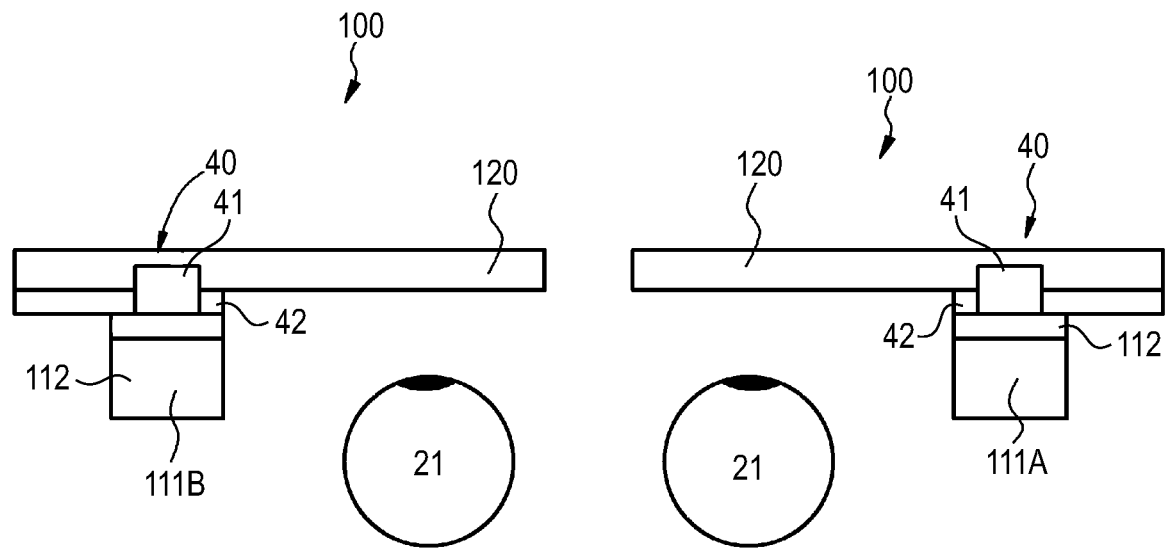
FIGS. 30A and 30B are conceptual diagrams illustrating a display apparatus according to Example 17.
Figure 30B:
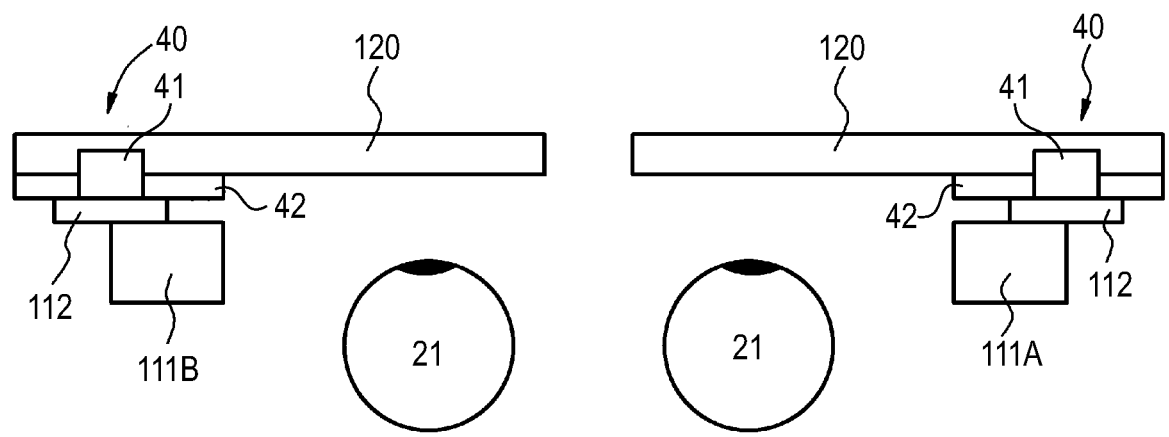
Figure 31:
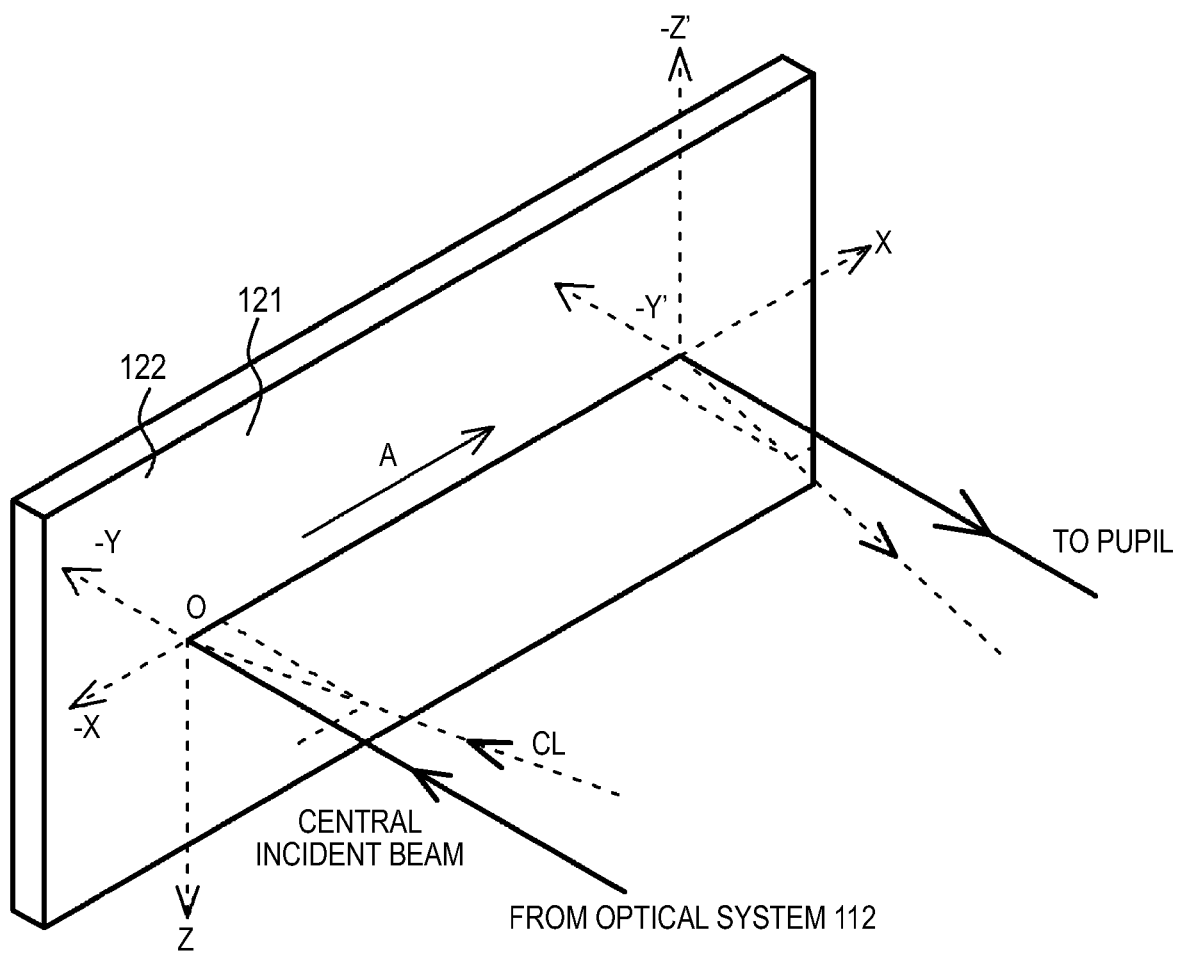
FIG. 31 is a schematic diagram illustrating the propagation of light in a light guide plate forming an image display device in the display apparatus according to Example 17.

Example 17 is a modification of the display apparatus according to each of Examples 1 to 8. Particularly, Example 17 relates to the 2A-th display apparatus according to the embodiment of the present disclosure and more particularly, to a display apparatus (caption display apparatus) that displays a caption. FIGS. 30A and 30B are conceptual diagrams illustrating the display apparatus and an image display device according to Example 17. FIG. 30A is a schematic diagram illustrating a state before the optical axis of the image forming device and the optical axis of an optical system are moved in the horizontal direction (X-axis direction) and FIG. 30B is a schematic diagram illustrating a state after the optical axes are moved. FIG. 31 is a schematic diagram illustrating the propagation of light in a light guide plate forming the image display device in the display apparatus according to Example 17. The conceptual diagram illustrating the use state of the display apparatus according to Example 17 is the same as those of FIGS. 15 and 16, and the conceptual diagram illustrating a control device forming the display apparatus according to Example 17 is the same as that of FIG. 17. An example of an image signal according to Example 17 is the same as that shown in FIG. 18A.

In the display apparatus (caption display apparatus) according to Example 17 or display apparatuses according to Examples 18 to 22, which will be described below, a moving device 40, a rotating device 43, a liquid lens 44, and a liquid prism 45 are operated depending on the observation position of the observer. The operations of them are controlled by control signals from a control device 618 on the basis of information about the observation position of the observer (or the shift amount of the left and right images). Examples of the information about the observation position of the observer may include the position of the seat of the observer (audience) in a movie theater or a theater and theater information.

In the display apparatus 100, 200, 300, 400, or 500 according to Example 17 or Example 18, which will be described below, the moving device 40 moves the optical axis of an image forming device 111 (111A and 111B) or 211 and the optical axis of the optical system 112 or 254 in the horizontal direction (X-axis direction) relative to each other. Specifically, as shown in the conceptual diagrams of FIGS. 30A and 30B and FIG. 31, in each of two image display devices 100, 200, 300, 400, or 500, the positions of the optical axis of the image forming device 111 or 211 and the optical axis of the optical system 112 or 254 may be moved relative to each other in the horizontal direction (X-axis direction). That is, one (for example, the optical system 112 or 254) of the image forming device 111 or 211 and the optical system 112 or 254 is placed on a guide portion 42 for movement, which is, for example, a rack gear portion, and one (for example, the optical system 112 or 254) of the image forming device 111 or 211 and the optical system 112 or 254 is moved on the guide portion 42 for movement by a motor and a pinion gear 41. Alternatively, one of the image forming device and the optical system may be placed on the guide portion for movement and one of the image forming device and the optical system may be moved on the guide portion for movement by a piezoelectric device or an ultrasonic motor. In this structure, the YZ plane incident angle of parallel light which is emitted from the optical system 112 or 254 and is then incident on the optical device 120, 320, or 520 with respect to the optical device 120, 320, or 520 is changed. That is, the angle of the optical axis of the optical system 112 or 254 with respect to the YZ plane is changed. In FIG. 31, a solid line indicates a central incident beam before the optical axis of the image forming device 111 or 211 and the optical axis of the optical system 112 or 254 are moved in the horizontal direction (X-axis direction) and a dotted line indicates the central incident beam after the movement. When the image forming device 111 or 211 and the optical system 112 or 254 are moved from the state shown in FIG. 30A to the state shown in FIG. 30B, the value of the convergence angle increases and the virtual image distance is reduced. That is, the virtual image is close to the observer (audience). In other words, for example, the image forming device 111 or 211, or the optical system 112 or 254 are moved relative to each other in the horizontal direction (X-axis direction) such that the point "A" shown in FIG. 14 is disposed at a desired position. In the movement of the image forming device 111 or 211, the entire image forming device 111 or 211 may be moved or some (for example, a liquid crystal display device 151 or a scanning unit 253) of the components of the image forming device 111 or 211 may be moved.

For example, information (observer observation position information) for the observation position of the observer is given from a personal computer to the display apparatus in advance. Alternatively, for example, appropriate means and method may be used to read seat information or theater information which is printed as barcodes on the ticket, or seat information or theater information included in ticket information which is displayed on a mobile phone, and an appropriate means may be used to give the observer observation position information based on the seat information or theater information to the display apparatus. Then, the control device 618 operates, for example, the motor and the pinion gear 41 on the basis of the observer observation position information to move the image forming device 111 or 211 and/or the optical system 112 or 254 in the horizontal direction (X-axis direction) relative to each other, thereby adjusting the convergence angle. Specifically, for example, as the distance from the display apparatus to the observation target increases, the convergence angle may be reduced. When the distance from the display apparatus to the observation target is infinite, the convergence angle is 0 degree.

As such, two images obtained by two image display devices 100, 200, 300, 400, or 500 for the right eye and the left eye can be moved on the basis of the observation position information (or the shift amount of the left and right images) to arrange the virtual image at a desired position. That is, the distance (interval) between two images displayed on the optical devices 120, 320, or 520 forming the image display devices 100, 200, 300, 400, or 500 in the horizontal direction, or the YZ plane incident angle can be adjusted to adjust the convergence angle corresponding to the distance from the display apparatus to the observation target.

Example 18

Figure 32A:
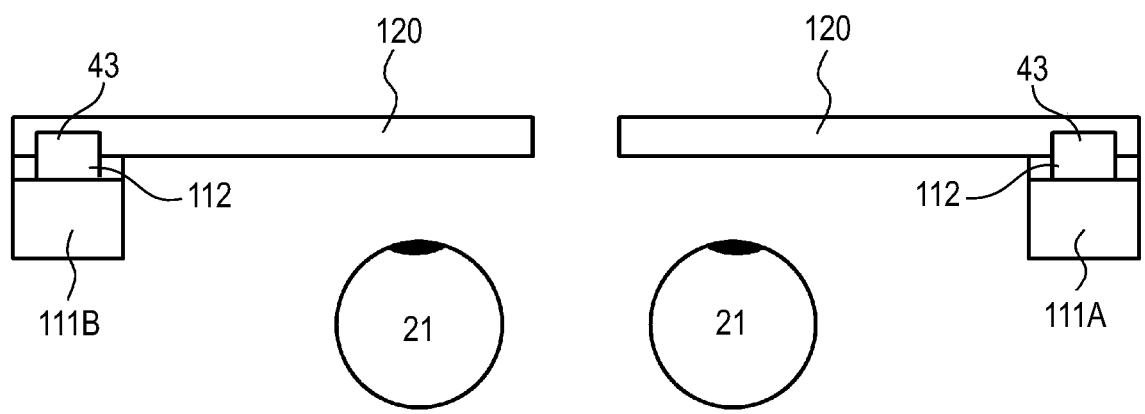
FIGS. 32A and 32B are conceptual diagrams illustrating a display apparatus according to Example 18.
Figure 32B:
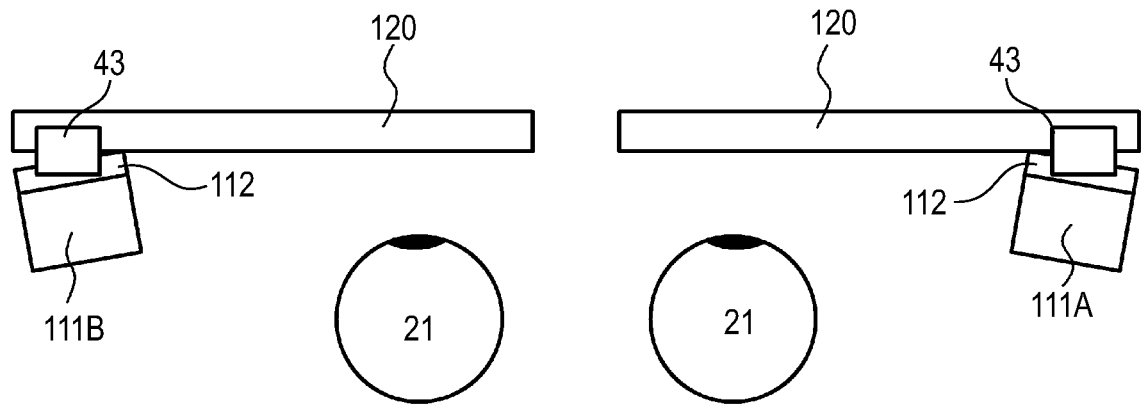

Example 18 relates to the 2B-th display apparatus according to the embodiment of the present disclosure. FIGS. 32A and 32B are conceptual diagrams illustrating a display apparatus according to Example 18. In the display apparatus according to Example 18, at least one image display device (in Example 18, each of two image display devices for the right eye and the left eye) further includes a rotating device 43 that rotates an image forming device 111 or 211 and an optical system 112 or 254. The rotating device 43 rotates the image forming device 111 or 211 and the optical system 112 or 254 depending on the observation position of the observer to change the incident angle (YZ plane incident angle) of parallel light which is emitted from the optical system 112 or 254 and is then incident on the optical device 120 or 320 with respect to the optical device 120 or 320, that is, the angle of the optical axis of the optical system 112 or 254 with respect to the YZ plane, thereby adjusting the convergence angle (the intersection angle between the horizontal plane and a main beam). When the image forming device 111 or 211 and the optical system 112 or 254 are moved from the state shown in FIG. 32A to the state shown in FIG. 32B, the value of the convergence angle increases and the virtual image distance is reduced. That is, the virtual image is close to the observer (audience).

The rotating device 43 rotates the image forming device 111 or 211 and the optical system 112 or 254. Specifically, the positional relationship between the optical axis of the image forming device 111 or 211 and the optical axis of the optical system 112 or 254 in each of two image display devices may be fixed and at least one of the image display devices may be rotated about the Z-axis which is arranged at an appropriate position by a piezoelectric device, a motor, or an ultrasonic motor. In this structure, the YZ plane incident angle of parallel light which is emitted from the optical system 112 or 254 and is then incident on the optical device 120 or 320 with respect to the optical device 120 or 320 is changed. That is, the angle of the optical axis of the optical system 112 or 254 with respect to the YZ plane is changed. If necessary, the optical device 120 or 320 may also be rotated.

Example 19

Example 19 relates to the 2C-th display apparatus according to the embodiment of the present disclosure. In the display apparatus according to Example 19, an optical system 112 or 254 forming at least one image display device (in Example 19, each of two image display devices for the right eye and the left eye) includes a liquid lens 44. The liquid lens 44 is operated depending on the observation position of the observer to adjust the convergence angle (the intersection angle between the horizontal plane and a main beam). The liquid lens 44 forming the optical system 112 or 254 is a known liquid lens using an electrowetting phenomenon. The operation of the liquid lens 44 makes it possible to move the optical axis of the optical system 112 or 254 in the horizontal direction (X-axis direction) or to change the angle of the optical axis of the optical system with respect to the YZ plane, while constantly maintaining the relationship between the Y-axis and the optical axis of the optical system 112 or 254. In this way, the YZ plane incident angle of parallel light which is emitted from the optical system 112 or 254 and is then incident on the optical device 120 or 320 with respect to the optical device 120 or 320 is changed. That is, the angle of the optical axis of the optical system 112 or 254 with respect to the YZ plane is changed.

Figure 33A:
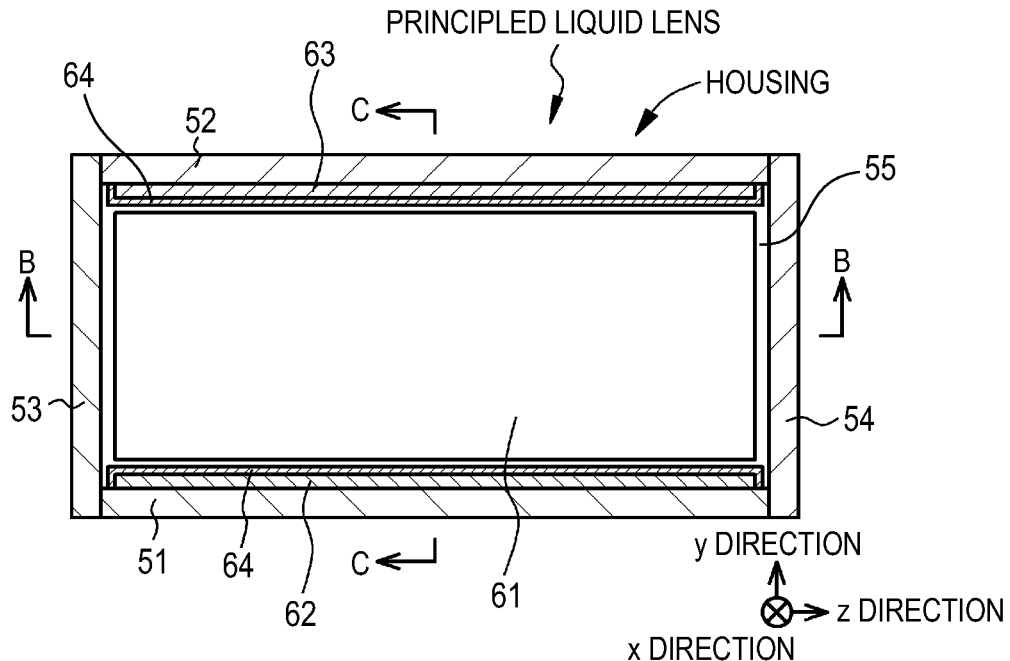
FIG. 33A is a schematic cross-sectional view illustrating a principled liquid lens taken along the line A-A of FIG. 33B.
Figure 33B:
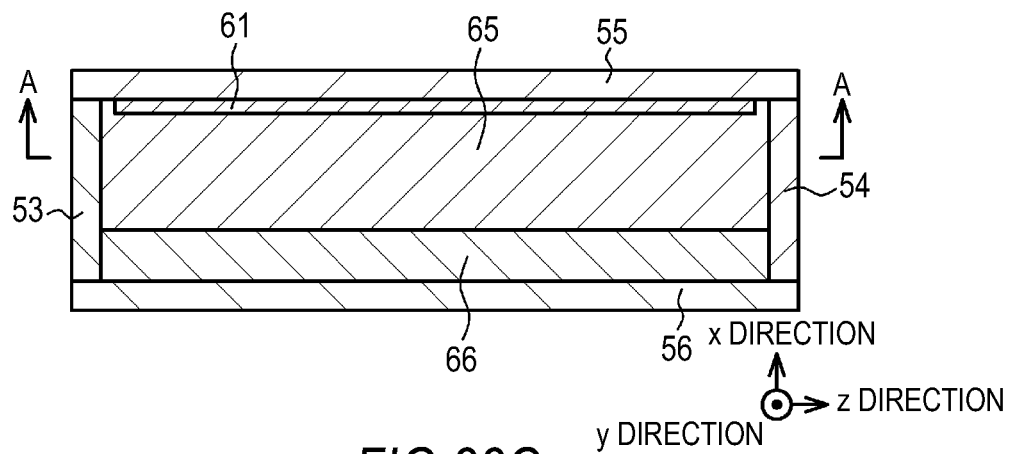
FIG. 33B is a schematic cross-sectional view illustrating the principled liquid lens taken along the line B-B of FIG. 33A.

The principle of the liquid lens 44 will be described with reference to FIGS. 33A to 33C and FIGS. 34A to 34C. FIG. 33A is a schematic cross-sectional view taken along line A-A of FIG. 33B, FIG. 33B is a schematic cross-sectional view (in which a first liquid is not shown) taken along line B-B of FIG. 33A, and FIG. 33C and FIGS. 34A to 34C are schematic cross-sectional views taken along line C-C of FIG. 33A. The shape of the liquid lens when it is cut along the xy plane is a schematic shape, and is different from the actual shape.

The liquid lens (referred to as a "principled liquid lens" for convenience) representing the principle diagrams of in FIGS. 33A to 33C and FIGS. 34A to 34C includes a housing. The housing includes: a first side member 51; a second side member 52 that is opposite to the first side member 51; a third side member 53 that connects one end the first side member 51 and one end of the second side member 52; a fourth side member 54 that connects the other end of the first side member 51 and the other end of the second side member 52; a top plate 55 that is attached to the top surfaces of the first side member 51, the second side member 52, the third side member 53, and the fourth side member 54; and a bottom plate 56 that is attached to the bottom surfaces of the first side member 51, the second side member 52, the third side member 53, and the fourth side member 54. One lens housing is formed by the housing. The lens housing is filled with a first liquid 65 and a second liquid 66 forming the liquid lens which is a cylinder lens with an axis line extending in the direction (the z direction) in which the first side member 51 and the second side member 52 extend.

In addition, a first electrode (hereinafter, simply referred to as a "first electrode 61") forming the liquid lens is provided on the inner surface of the top plate 55. A second electrode (hereinafter, simply referred to as a "second electrode 62") forming the liquid lens is provided on the inner surface of the first side member 51. A third electrode (hereinafter, simply referred to as a "third electrode 63") forming the liquid lens is provided on the inner face of the second side member 52. In the state shown in FIGS. 33A to 33C, no voltage is applied to the first electrode 61, the second electrode 62, and the third electrode 63.

Figure 34A:
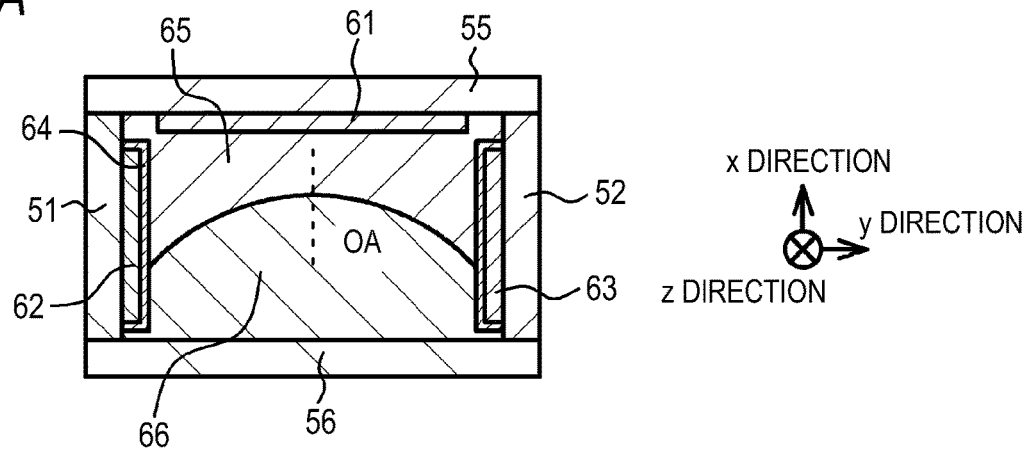
FIGS. 34A to 34C are schematic cross-sectional views illustrating the behavior of the principled liquid lens taken along the line C-C of FIG. 33A.
Figure 34B:
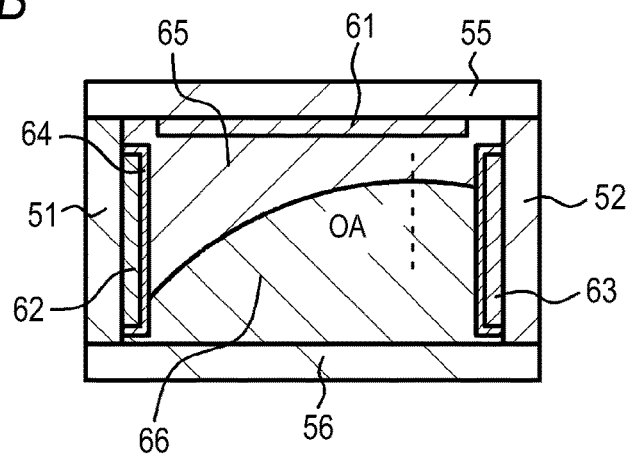
Figure 34C:
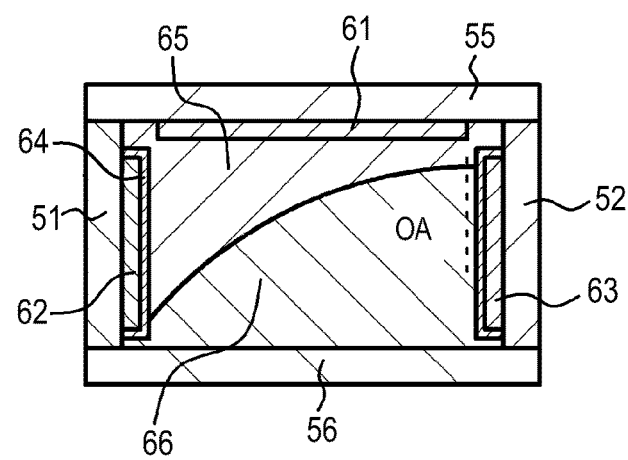

In this state, when appropriate voltages are applied to the first electrode 61, the second electrode 62, and the third electrode 63 from this state, the state of the interface between the first liquid 65 and the second liquid 66 changes to the state shown in FIG. 34A, 34B, or 34C. FIG. 34A shows a state when the same voltage is applied to the second electrode 62 and the third electrode 63. When the liquid lens formed in the lens housing is cut along the xy plane, the shape thereof is symmetric with respect to an optical axis OA. In addition, FIGS. 34B and 34C show a state when different voltages are applied to the second electrode 62 and the third electrode 63. When the liquid lens formed in the lens housing is cut along the xy plane, the shape thereof is asymmetric with respect to the optical axis OA. The potential difference between the second electrode 62 and the third electrode 63 in the state shown in FIG. 34C is greater than that in the state shown in FIG. 34B. As shown in FIGS. 34B and 34C, the optical power of the liquid lens can be changed depending on the potential difference between the second electrode 62 and the third electrode 63, and the optical axis OA (represented by a dotted line) of the liquid lens can be moved in the y direction that is orthogonal to the z direction. Alternatively, a plurality of liquid lenses shown in the principle diagrams may be arranged in parallel and the voltages applied to the second electrode 62 and the third electrode 63 of each of the liquid lenses may be appropriately controlled to move the optical axes of all of the liquid lenses, thereby changing the inclination of the optical axes of all of the liquid lenses. In this way, a Fresnel lens may be configured by all of the liquid lenses.

Figure 35:
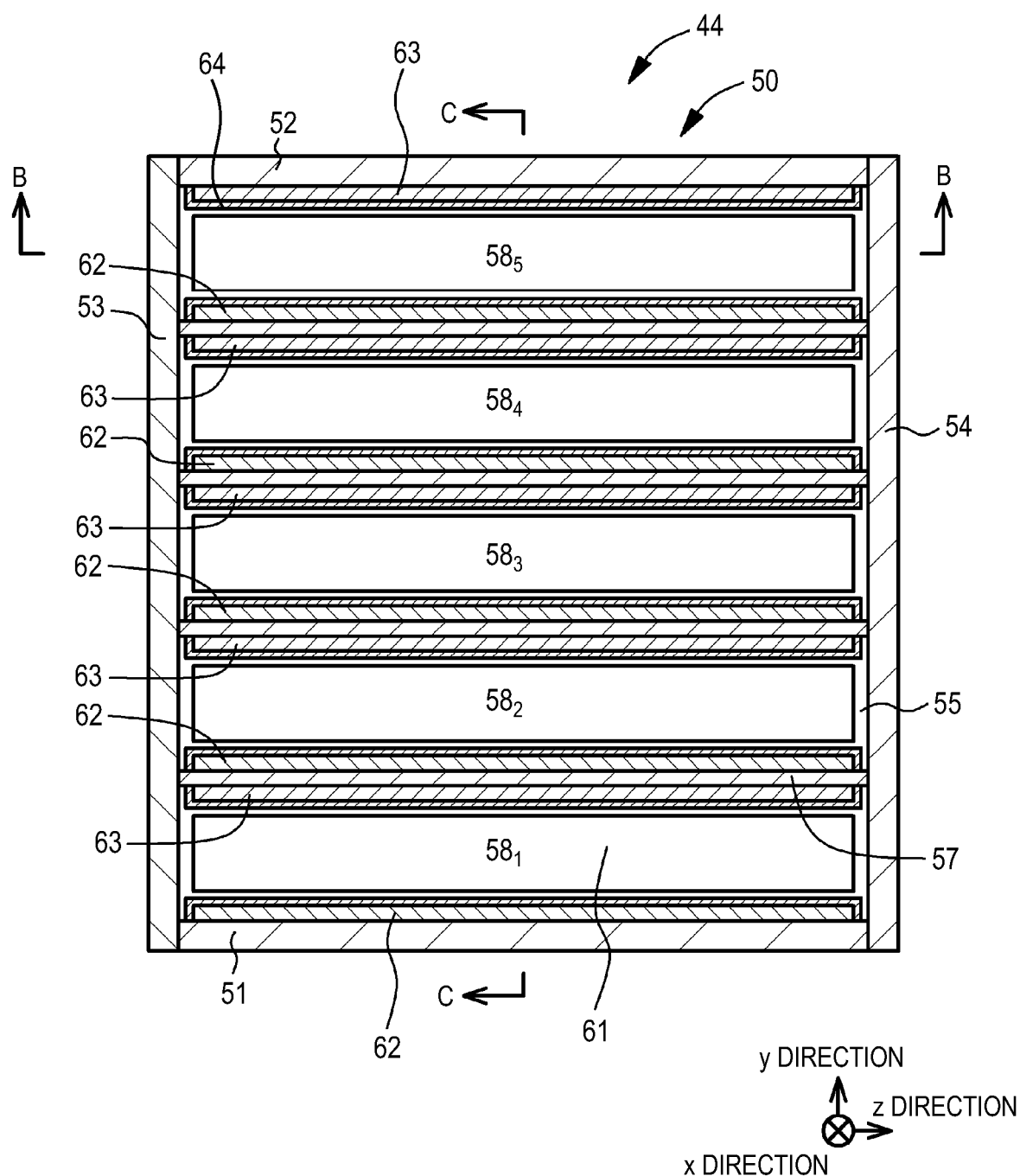
FIG. 35 is a schematic cross-sectional view illustrating a liquid lens according to Example 19 taken along the line A-A of FIG. 33B.

FIG. 35, FIGS. 36A to 36C, and FIGS. 37A and 37B are schematic cross-sectional views illustrating a practical liquid lens 44 according to Embodiment 19. FIG. 35 is a schematic cross-sectional view taken along the line A-A of FIG. 33B, and FIGS. 36A to 36C and FIGS. 37A and 37B are schematic cross-sectional views taken along the line C-C of FIG. 35. The schematic cross-sectional view taken along the line B-B of FIG. 35 is the same as that shown in FIG. 33B.

The liquid lens 44 includes: (A) a housing 50 including a first side member 51, a second side member 52 that is opposite to the first side member 51, a third side member 53 that connects one end the first side member 51 and one end of the second side member 52, a fourth side member 54 that connects the other end of the first side member 51 and the other end of the second side member 52, a top plate 55 that is attached to the top surfaces of the first side member 51, the second side member 52, the third side member 53, and the fourth side member 54, and a bottom plate 56 that is attached to the bottom surfaces of the first side member 51, the second side member 52, the third side member 53, the fourth side member 54; and (B) (M−1) partition wall members 57 that are provided in parallel between the first side member 51 and the second side member 52.

In the liquid lens 44 according to Example 19, M (=5) lens housings 58 ($58_1$, $58_2$, $58_3$, $58_4$, and $58_5$) are arranged in parallel. Each of the lens housings 58 ($58_1$, $58_2$, $58_3$, $58_4$, and $58_5$) is filled with the first liquid 65 and the second liquid 66 forming the liquid lens, which is a cylindrical lens with an axis line extending in parallel to the direction (the z direction) in which the partition wall member 57 extends.

The first lens housing $58_1$ includes the first side member 51, the third side member 53, the first partition wall member 57, the fourth side member 54, the top plate 55, and the bottom plate 56. A first electrode 61 is provided on the inner surface of the top plate 55 forming the first lens housing $58_1$. A second electrode 62 is provided on the inner surface of the first side member 51 forming the first lens housing $58_1$. A third electrode 63 is provided on the inner surface of the first partition wall member 57 forming the first lens housing $58_1$.

An (m+1)-th lens housing $58_{(m+1)}$ includes an m-th (m=1, 2, . . . , M−2) partition wall member 57, the third side member 53, an (m+1)-th partition wall member 57, the fourth side member 54, the top plate 55, and the bottom plate 56. The first electrode 61 is provided on the inner surface of the top plate 55 forming the (m+1)-th lens housing $58_{(m+1)}$. The second electrode 62 is provided on the inner surface of the m-th partition wall member 57 forming the (m+1)-th lens housing $58_{(m+1)}$. The third electrode 63 is provided on the inner surface of the (m+1)-th partition wall member 57 forming the (m+1)-th lens housing $58_{(m+1)}$.

An M-th lens housing $58_M$ (=$58_5$) includes an (M−1)-th partition wall member 57, the third side member 53, the second side member 52, the fourth side member 54, the top plate 55, and the bottom plate 56. The first electrode 61 is provided on the inner surface of the top plate 55 forming the M-th lens housing $58_M$ (=$58_5$). The second electrode 62 is provided on the inner surface of the (M−1)-th partition wall member 57 forming the M-th lens housing $58_M$ (=$58_5$). The third electrode 63 is provided on the inner surface of the second side member 52 forming the M-th lens housing $58_M$ (=$58_5$).

In the example shown in the drawings, the first electrode 61 is provided for each lens housing. However, one first electrode 61 may be provided on the inner surface of the top plate 55.

In the liquid lens 44 according to Example 19, a water-repellent treatment is performed on the surface of each of the first side member 51, the second side member 52, and the partition wall member 57 where at least the interface between the first liquid 65 and the second liquid 66 is located. In addition, the bottom surface of the partition wall member 57 extends to the bottom plate 56, and the top surface of the partition wall member 57 extends to the top plate 55. The outer shape of the housing 50 is a rectangle having a long side in the z direction and a short side in the y direction. Light is incident on the bottom plate 56 and is emitted from the top plate 55.

The first liquid 65 and the second liquid 66 are insoluble and unmixed, and the interface between the first liquid 65 and the second liquid 66 form a lens surface. The first liquid 65 has conductivity, and the second liquid 66 has an insulating property. The first electrode 61 is brought into contact with the first liquid 65, the second electrode 62 is brought into contact with the first liquid 65 and the second liquid 66 through an insulating film 64, and the third electrode 63 is brought into contact with the first liquid 65 and the second liquid 66 through the insulating film 64. In addition, the top plate 55, the bottom plate 56, and the first electrode 61 are made of a material that is transparent with respect to light that is incident on the liquid lens 44.

Specifically, the top plate 55, the bottom plate 56, the first side member 51, the second side member 52, the third side member 53, the fourth side member 54, and the partition wall member 57 are made of glass or a resin, such as an acrylic resin. The first liquid 65 having conductivity is made of a lithium chloride aqueous solution and has a density of 1.06 grams/cm$^3$ and a refractive index of 1.34. The second liquid 66 having an insulating property is made of silicon oil (TSF437 manufactured by Momentive Performance Materials Japan LLC) and has a density of 1.02 grams/cm$^3$ and a refractive index of 1.49. The first electrode 61 is made of ITO, and the second electrode 62 and the third electrode 63 are metal electrodes made of, for example, gold, aluminum, copper, or silver. The insulating film 64 is made of poly-para-xylene or a metal oxide, such as tantalum oxide or titanium dioxide. A water-repellent-treated layer (not shown) is formed on the insulating film 64. The water-repellent-treated layer is made of poly-para-xylene or a fluorinated polymer. It is preferable that a hydrophilic treatment be performed on the surface of the first electrode 61 and a water-repellent treatment be performed on the inner surface of the third side member 53 or the fourth side member 54.

In Example 19, in order to configure the optical system 112 or 254, two liquid lenses 44 shown in FIG. 35 overlap each other. Specifically, the liquid lenses 44 overlap each other such that the y direction of the lower liquid lens 44 and the y direction of the upper liquid lens 44 are perpendicular to each other and the z direction of the lower liquid lens 44 and the z direction of the upper liquid lens 44 are perpendicular to each other. Then, for example, the two liquid lenses 44 overlapping each other are arranged in the optical system 112 shown in FIG. 1 such that the y direction of the lower liquid lens 44 is parallel to the X-axis direction and the x direction thereof is parallel to the Y-axis direction.

The first electrode 61, the second electrode 62, and the third electrode 63 have a configuration and structure in which they are connected to an external control circuit through a connection unit (not shown) and are supplied with desired voltages. When voltages are applied to the first electrode 61, the second electrode 62, and the third electrode 63, the lens surface formed by the interface between the first liquid 65 and the second liquid 66 changes from a downward convex state shown in FIG. 36A to an upward convex state shown in FIG. 36B. The state of the lens surface changes depending on the voltages applied to the electrodes 61, 62, and 63 on the basis of a Lippman-Young's equation. In the example shown in FIG. 36B, the same voltage is applied to the second electrode 62 and the third electrode 63. Therefore, the shape of the liquid lens, which is formed in the lens housing, when it is cut along the xy plane is symmetric with respect to the optical axis of the liquid lens. The above-mentioned control may be performed for the upper liquid lens 44 of the two liquid lenses 44 overlapping each other.

Figure 37A:
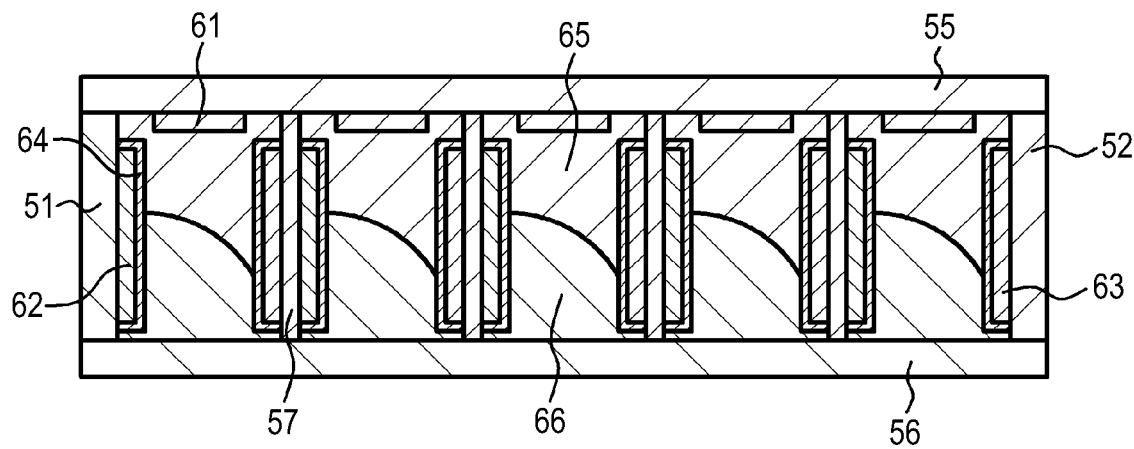
FIGS. 37A and 37B are schematic cross-sectional views illustrating the behavior of the liquid lens according to Example 19 taken along the line C-C of FIG. 35.
Figure 37B:
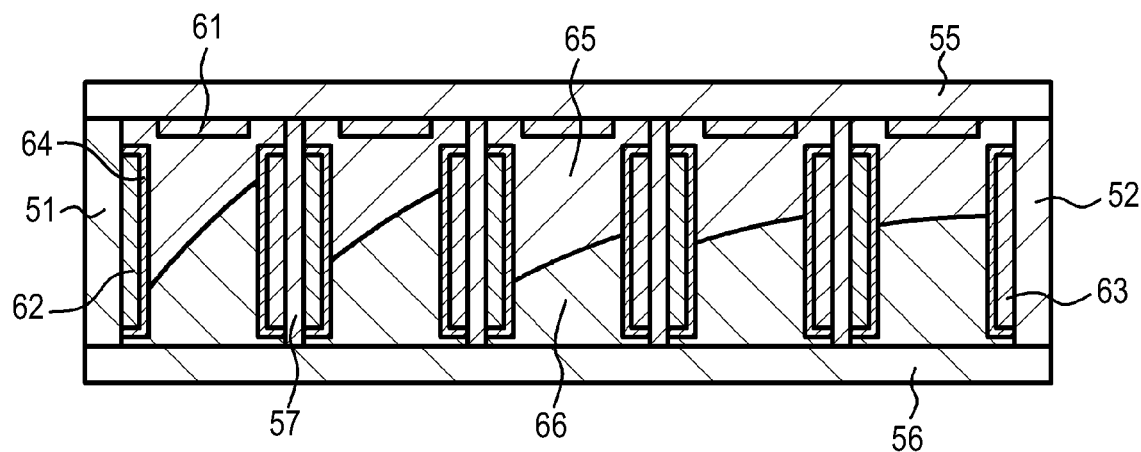

In addition, FIG. 36C and FIGS. 37A and 37B show states when different voltages are applied to the second electrode 62 and the third electrode 63. In these states, the shape of the liquid lens, which is formed in the lens housing, when it is cut along the xy plane is asymmetric with respect to the optical axis of the liquid lens. In the state shown in FIG. 36C, a Fresnel lens is configured as the liquid lens 44. The above-mentioned control may be performed for the upper liquid lens 44 of the two liquid lenses 44 overlapping each other.

In the states shown in FIGS. 37A and 37B, the optical axis of the liquid lens is moved in the y direction (the X-axis direction) that is perpendicular to the z direction. In the states shown in FIGS. 37A and 37B, the traveling direction of light emitted from the liquid lens 44 can be changed, or the inclination of the optical axis of the liquid lenses 44 as a whole with respect to the x direction can be controlled. In other words, the above-mentioned control can be performed on the lower liquid lens 44 of the two liquid lenses 44 overlapping each other to move the optical axis of the liquid lens in the X-axis direction, or to incline the optical axis of the liquid lens with respect to the Y-axis direction. The optical power of the liquid lens can be changed depending on the potential difference between the second electrode 62 and the third electrode 63. In the state shown in FIG. 37A, the same voltage is applied to the second electrodes 62, and the same voltage is applied to the third electrodes 63. On the other hand, in the state shown in FIG. 37B, different voltages are applied to the second electrode 62 and the third electrode 63, and the liquid lenses 44 form a kind of Fresnel lens as a whole.

When voltages are applied to the first electrode 61, the second electrode 62, and the third electrode 63 such that the cylinder lens has optical power, the optical power of the cylinder lens in the xz plane (or a plane parallel to the xz plane) is substantially zero, and the optical power of the cylinder lens in the xy plane has a finite value. The "optical axis of the liquid lenses as a whole" is a line connecting the centers of curvature of two virtual optical surfaces of a virtual lens (one lens as a whole of the liquid lenses 44) that is acquired as a whole of the liquid lenses 44 when the liquid lens 44 is cut along the xy plane.

The second electrodes 62 may be connected to a common wiring line, the third electrodes 63 may be connected to a common wiring line, the same voltage may be applied to the second electrodes 62, and the same voltage may be applied to the third electrodes 63. Alternatively, the second electrodes 62 may be connected to a common wiring line, and the third electrodes 63 may be connected to individual wiring lines so as to be individually supplied with different voltages. The third electrodes 63 may be connected to a common wiring line and the second electrodes 62 may be connected to individual wiring lines so as to be individually supplied with difference voltages. All of the second electrodes 62 and the third electrodes 63 may be connected to individual wiring lines so as to be individually supplied with different voltages.

Example 20

Example 20 relates to the 2D-th display apparatus according to the embodiment of the present disclosure. In the display apparatus according to Example 20, an optical system 112 or 254 forming at least one image display device (in Example 20, each of two image display devices for the right eye and the left eye) includes a liquid prism 45. The liquid prism 45 is operated to adjust a convergence angle (the intersection angle between the horizontal plane and a main beam), depending on the observation position of the observer. The liquid prism 45 forming a portion of the optical system 112 or 254 is a known liquid prism using an electrowetting phenomenon. The liquid prism 45 can be operated to change the angle of the optical axis of the optical system 112 or 254 with respect to the YZ plane. In this structure, the YZ plane incident angle of parallel light which is emitted from the optical system 112 or 254 and is then incident on the optical device 120 or 320 with respect to the optical device 120 or 320 is changed. That is, the angle of the optical axis of the optical system 112 or 254 with respect to the YZ plane is changed.

Figure 33C:
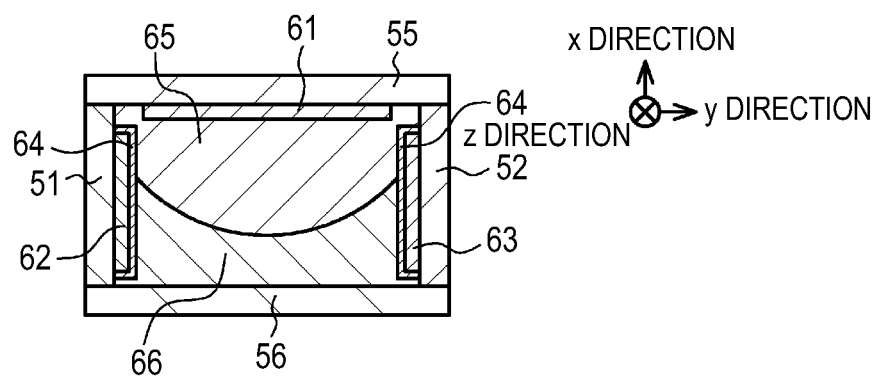
FIG. 33C is a schematic cross-sectional view illustrating the principled liquid lens taken along the line C-C of FIG. 33A.
Figure 38:
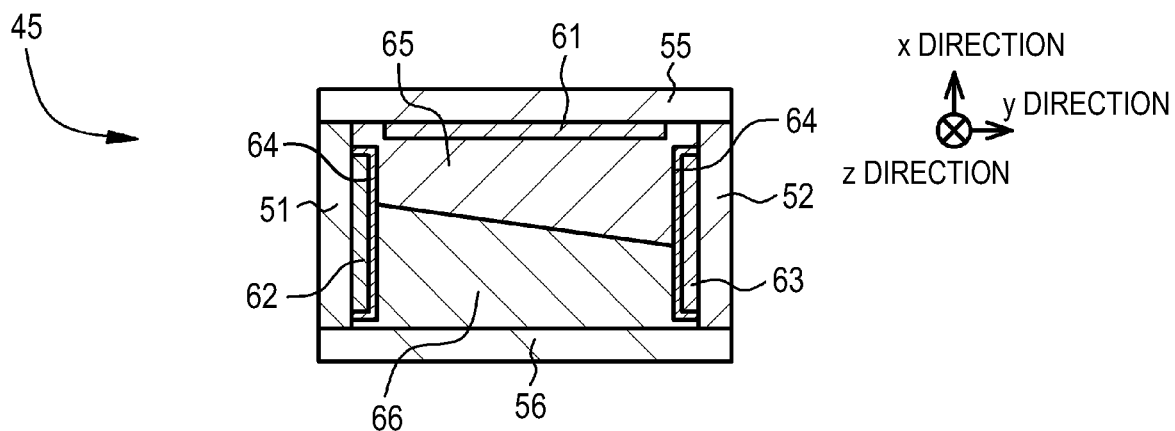
FIG. 38 is a conceptual diagram illustrating a liquid prism according to Example 20.

As shown in the conceptual diagram of FIG. 38, the configuration and structure of the liquid prism 45 may be the same as those of the principled liquid lens shown in FIGS. 33A to 33C and thus the detailed description thereof will not be repeated. The liquid prism 45 differs from the principled liquid lens in that a lens surface is not formed at the interface between the first liquid 65 and the second liquid 66, and the prism has a flat inclined surface. This configuration can be achieved by appropriately selecting the first liquid 65 and the second liquid 66. For example, the liquid prism 45 may be arranged between the optical system 112 and the light guide plate 121 in the display apparatus shown in FIG. 1 such that the y direction is parallel to the X-axis direction and the x direction is parallel to the Y-axis direction.

Example 21

Example 21 is a modification of the display apparatus according to each of Examples 17 to 20. In a display apparatus according to Example 21, the input of an image signal (character data, an input image signal, or input image data) to an image forming device 111 (111A and 111B) or 211 forming at least one image display device (in Example 21, each of two image display devices 100, 200, 300, 400, or 500 for the right eye and the left eye) is controlled to accurately adjust the convergence angle depending on the observation position of the observer, in addition to the adjustment of the convergence angle in Examples 17 to 20, or to adjust the position of the image displayed on an optical device forming the at least one image display device depending on the observation position of the observer. In Example 21, both the adjustment of the convergence angle and the adjustment of the position of the image depending on the observation position of the observer are performed. However, only one of them may be performed.

Specifically, a test image signal is transmitted to the control device 18 wirelessly (by wire according to circumstances). Then, the control device 18 performs a process for image display on the image signal and the image forming device 111 or 211 generates an image (caption) on the basis of the test image signal. Finally the image reaches both eyes of the observer (audience) wearing the display apparatus through the optical system 112 or 254 and the optical device 120, 320, or 520.

Then, the image displayed on the optical device 120, 320, or 520 is moved in the horizontal and vertical directions and is rotated by the control device 18, specifically, by using a switch (not shown) provided in the control device 18 such that the images displayed by the image display devices 100, 200, 300, 400, or 500 for the left eye and the right eye coincide (overlap) with a desired position (for example, a desired position on the stage or a screen). In other words, for example, the image displayed on the optical device 120, 320, or 520 is moved in the horizontal and vertical directions and is rotated such that the point "A" shown in FIG. 14 is the desired position. As such, the switch provided in the control device 18 is operated to control (correct) the image signal. That is, a display position correction signal is generated in the control device 18 and is added to the image signal.

A state in which the images displayed by the image display devices 100, 200, 300, 400, or 500 for the left and right eyes deviate from the desired position in the horizontal direction is the same as that shown in FIG. 19A. A state in which the images deviate from the desired position in the vertical direction is the same as that shown in FIG. 19B. A state in which the images are rotated and deviate from the desired position is the same as that shown in FIG. 19C.

Therefore, the same operation and process as those in Example 9 may be performed in order to move the images (characters). In this way, it is possible to control the position of the image displayed on the optical device 120, 320, or 520 forming at least one image display device 100, 200, 300, 400, or 500 and adjust the mutual positions of two images formed by two image display devices 100, 200, 300, 400, or 500. That is, it is possible to perform both the precise adjustment of the convergence angle and the adjustment of the position of the image depending on the observation position of the observer. In addition to the image signal input to the image forming device 111 or 211, observation position information (distance information) for the distance from the observer (display apparatus) to the observation target is transmitted from the outside to the display apparatus. An example of the conceptual diagram illustrating this signal format is the same as that shown in FIG. 20B.

As such, when the image display position is shifted a distance corresponding to a desired number of pixels from a predetermined position, it is possible to improve the adjustment accuracy of the convergence angle. In other words, the input of the image signal to the image forming devices 111 or 211 forming two image display devices 100, 200, 300, 400, or 500 for the right eye and the left eye can be controlled on the basis of the display position correction signal to accurately adjust the convergence angle according to the distance from the display apparatus to the observation target. As a result, it is possible to accurately adjust the distance between the observation target and the observer (audience) and the virtual image distance of the image (caption) displayed by the image display device to be equal to each other.

In Example 21 or Example 22, which will be described below, the size of a display screen (image display region) displayed on the optical device, the angle of view of the display screen (image display region), and the resolution of the display screen may be changed depending on the observation position of the observer and the distance between the observation target and the display apparatus under the control of the control device 18.

Example 22

Example 22 is a modification of the display apparatus according to each of Examples 17 to 21. The basic configuration and structure of a display apparatus according to Example 22 may be the same as those of the display apparatus according to each of Examples 17 to 20 and thus the description thereof will not be repeated.

In the display apparatus according to Example 22, after a predetermined period of time has elapsed from the input of an image signal to an image forming device, the formation of an image by the image forming device is stopped. In order to stop the formation of the image by the image forming device, that is, in order to change the mode of the display apparatus to, for example, the power saving mode, a signal indicating the image display time of the image display device or a signal for instructing the image forming device to stop the formation of the image is added to the image signal.

An example of the image signal in Example 22 is the same as that shown in FIG. 18B and data "TIME", which is a signal indicating the image display time of the image display device, is added to the image signal in Example 17 shown in FIG. 18A. The control device 18 performs the same process and operation as those in Example 10. As such, in the display apparatus according to Example 22, after a predetermined period of time has elapsed from the input of the image signal to the image forming device, the formation of an image by the image forming device is stopped. That is, after a predetermined period of time has elapsed, the operation mode of the display apparatus changes to, for example, the power saving mode. Therefore, it is possible to prevent the unnecessary power consumption of the display apparatus.

The display apparatuses according to Examples 13 to 16 can be applied to the display apparatuses according to Examples 17 to 22. In this case, the display apparatuses correspond to the 3A-th to 3D-th display apparatuses according to the embodiments of the present disclosure.

The preferred examples of the present disclosure have been described above, but the present disclosure is not limited to the above-described examples. The configuration and structure of the display apparatuses (head-mounted displays) and the image display devices according to the above-described examples are illustrative, and may be appropriately changed. For example, a surface relief hologram (see U.S. Patent No. 20040062505 A1) may be arranged on the light guide plate. In the optical device 320, the diffraction grating device may be a transmissive diffraction grating device, or one of the first deflection unit and the second deflection unit may be a reflective diffraction grating device and the other deflection unit may be a transmissive diffraction grating device. Alternatively, the diffraction grating device may be a reflective blazed diffraction grating device.

The light control device may be removably provided in a region of the optical device from which light is emitted. As such, in order to provide the light control device so as to be removable, for example, the light control device may be attached to the optical device by screws made of transparent plastic and may be connected to a control circuit (for example, which is included in the control device 18 for controlling the image forming device) for controlling the transmittance of the light control device through a connector and wiring lines.

In Examples 7 and 8, a liquid crystal shutter may be used as the light control device according to circumstances. In Examples 1 to 8, an electrodeposition-type (electrodeposition and electric field deposition) optical shutter based on an electrodeposition and disassociation phenomenon generated by the reversible redox reaction of metal (for example, silver particles) may be used as the light control device, according to circumstances. Specifically, $Ag^+$ and $I^-$ are dissolved in an organic solvent and an appropriate voltage is applied to the electrode to reduce $Ag^+$, thereby precipitating Ag. In this way, the transmittance of the light control device is reduced. On the other hand, Ag is oxidized and dissolved as $Ag^+$, thereby increasing the transmittance of the light control device. Alternatively, an optical shutter using a change in the color of the material generated by the redox reaction of an electrochromic material may be used as the light control device according to each of Examples 1 to 8, according to circumstances. Specifically, so-called transparent solid electrodes are used as the first electrode and the second electrode and a first electrochromic material layer and a second electrochromic material layer are interposed between the first electrode and the second electrode. For example, the first electrochromic material layer is made of a Prussian blue complex and the second electrochromic material layer is made of a nickel-substituted Prussian blue complex. Alternatively, an optical shutter that controls transmittance using an electrowetting phenomenon may be used as the light control device according to each of Examples 1 to 8, according to circumstances. Specifically, the first electrode is patterned into a comb shape, a so-called transparent solid electrode is used as the second electrode, and an insulating first liquid and a conductive second liquid are filled between the first electrode and the second electrode. Then, a voltage is applied between the first electrode and the second electrode to change the shape of the interface formed by the first liquid and the second liquid from, for example, a planar shape to a curved shape. In this way, it is possible to control transmittance.

The configuration and structure of the moving device, the rotating device, the liquid lens, and the liquid prism according to Examples 17 to 22 are illustrative and may be appropriately changed. For example, the display apparatus according to Example 17 and the display apparatus according to Example 22 may be combined with each other.

Figure 39:
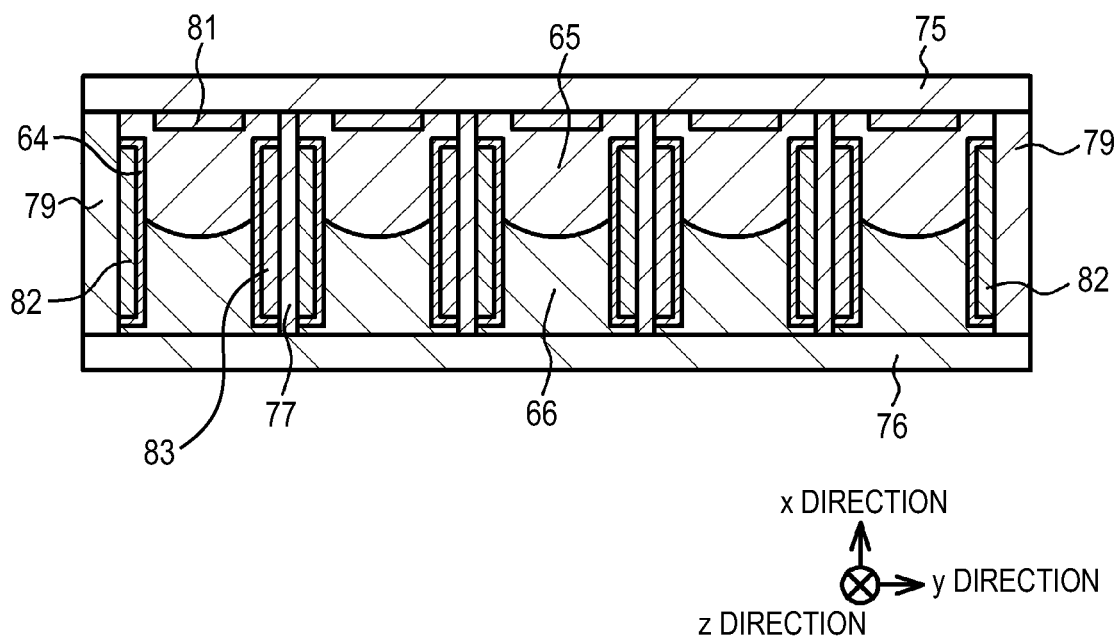
FIG. 39 is a schematic cross-sectional view illustrating a Fresnel-lens-type liquid lens for changing the focal length of an optical system.
Figure 40:
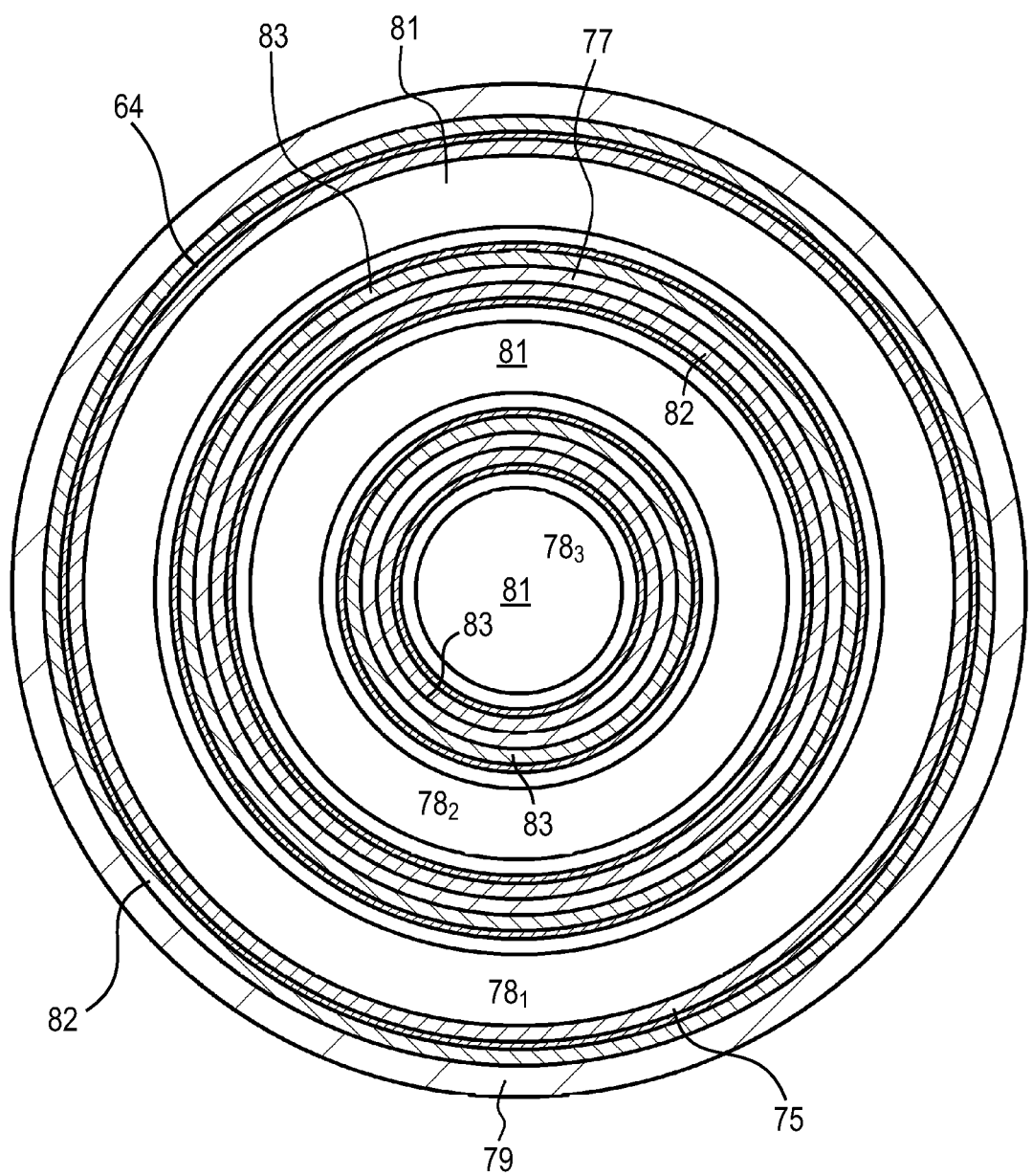
FIG. 40 is a schematic plan view illustrating the Fresnel-lens-type liquid lens for changing the focal length of the optical system.

The optical system 112 or 254 may include a liquid lens in order to bring the optical system 112 or 254 into focus on the point "A" in FIG. 14, that is, in order to change the focal length of the optical system 112 or 254, in addition to adjusting the convergence angle. FIG. 39 is a schematic cross-sectional view illustrating the liquid lens and FIG. 40 is a plan view illustrating the liquid lens. The liquid lens is a Fresnel lens and ring-shaped lens housings are concentrically arranged.

That is, the liquid lens includes: (A) a housing including a so-called endless outer wall member 79, a top plate 75 that is attached to the top surface of the outer wall member 79, and a bottom plate 76 that is attached to the bottom surface of the outer wall member 79; and (B) (N−1) partition wall members 77 that do not have an end and are arranged concentrically with the outer wall member 79. The outer shape of the housing is a circle. In addition, the liquid lens includes a central lens housing that are surrounded by (N−1) annular lens housings and (N−1)-th partition wall members 77. In the example shown in the drawings, N is 3. Each lens housing 78 ($78_1$, $78_2$, or $78_3$) is filled with a first liquid 65 and a second liquid 66 forming the liquid lens.

The first lens housing (annular lens housing) $78_1$ includes the outer wall member 79, the first partition wall member 77, the top plate 75, and the bottom plate 76. A first electrode (hereinafter, simply referred to as a "first electrode 81") forming the liquid lens is provided on the inner surface of the top plate 75 forming the first lens housing $78_1$. A second electrode (hereinafter, simply referred to as a "second electrode 82") forming the liquid lens is provided on the inner surface of the outer wall member 79 forming the first lens housing $78_1$. A third electrode (hereinafter, simply referred to as a "third electrode 83") forming the liquid lens is provided on the inner surface of the first partition wall member 77 forming the first lens housing $78_1$.

An (n+1)-th lens housing (annular lens housing) $78_{(n+1)}$ includes an n-th (where n=1, 2, . . . , N−2) partition wall member 77, an (n+1)-th partition wall member 77, the top plate 75, and the bottom plate 76. The first electrode 81 is provided on the inner surface of the top plate 75 forming the (n+1)-th lens housing $78_{(n+1)}$. The second electrode 82 is provided on the inner surface of the n-th partition wall member 77 forming the (n+1)-th lens housing $78_{(n+1)}$. The third electrode 83 is provided on the inner surface of the (n+1)-th partition wall member 77 forming the (n+1)-th lens housing $78_{(n+1)}$.

The first electrode 81 is provided on the inner surface of the top plate 75 forming the central lens housing $78_3$ corresponding to an N-th lens housing $78_N$. The third electrode 83 is provided on the inner surface of the (N−1)-th partition wall member 77 forming the central lens housing 78₃.

In the example shown in the drawings, the first electrode 81 is provided for each lens housing. However, one first electrode 81 may be provided on the inner surface of the top plate 75.

In the liquid lens, similarly to Example 19, a water-repellent treatment is performed on the surface of each of the outer wall member 79 and the partition wall member 77 which are disposed at the interface between at least the first liquid 65 and the second liquid 66. Light is incident on the bottom plate 76 and is emitted from the top plate 75. In each of the lens housings 78₁, 78₂, and 78₃, different voltages are applied to the second electrode 82 and the third electrode 83 to change the optical power of the liquid lens. Alternatively, in each of the lens housings 78₁, 78₂, and 78₃, different voltages are applied to the second electrode 82 and the third electrode 83 to make the liquid lens function as a Fresnel lens as a whole.

The image display devices according to Examples 1 to 22 may be changed as follows.

Figure 41:
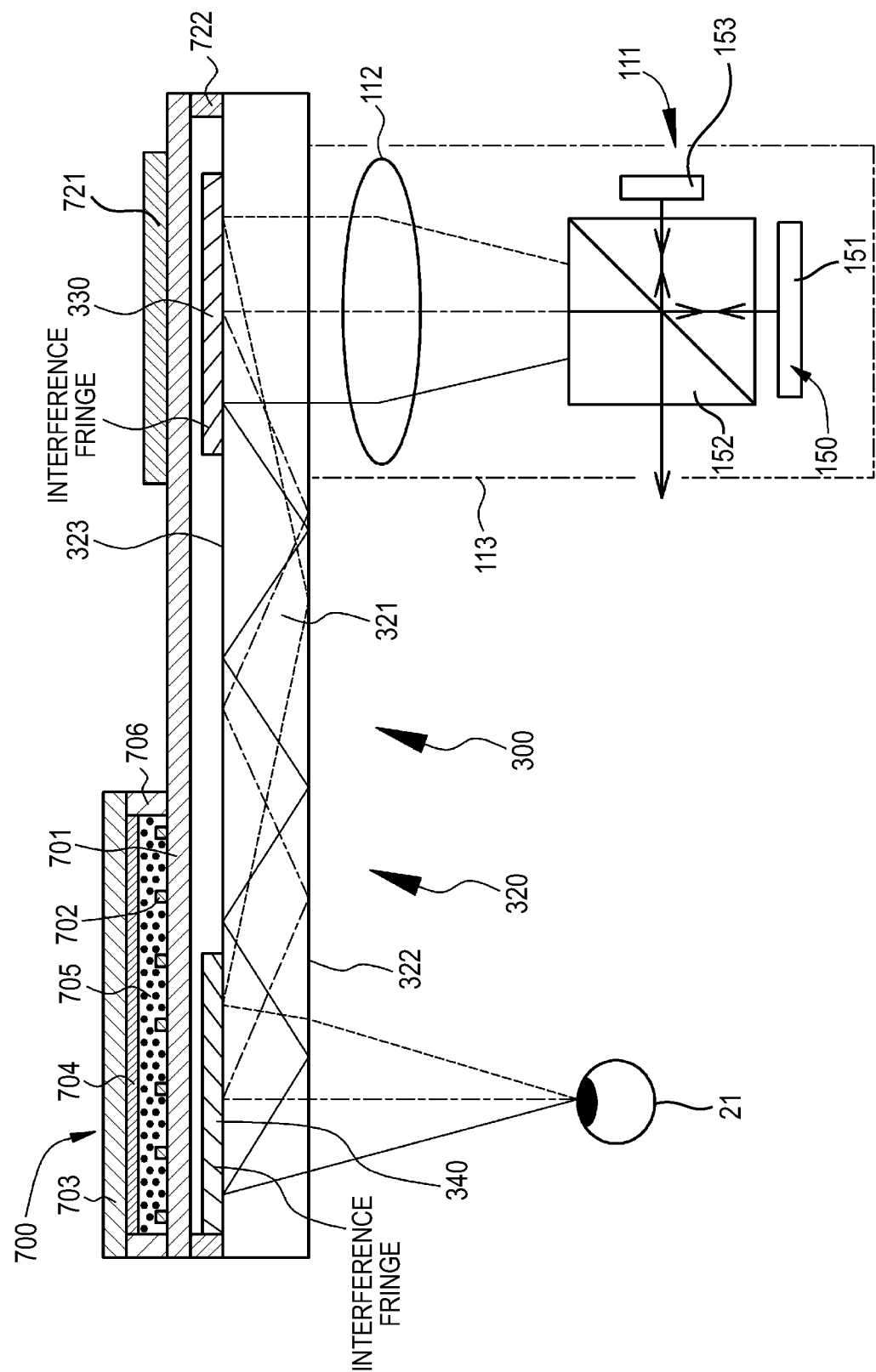
FIG. 41 is a conceptual diagram illustrating an image display device in a modification of the display apparatus according to Example 3.

That is, FIG. 41 is a conceptual diagram illustrating a modification of the image display device in the display apparatus according to Example 3. As shown in FIG. 41, for example, a light shielding member 721 which prevents a reduction in light use efficiency due to the leakage of light to the outside of a light guide plate 321 is formed on a surface of the first substrate 701 which does not face a first diffraction grating member 330.

Figure 42:
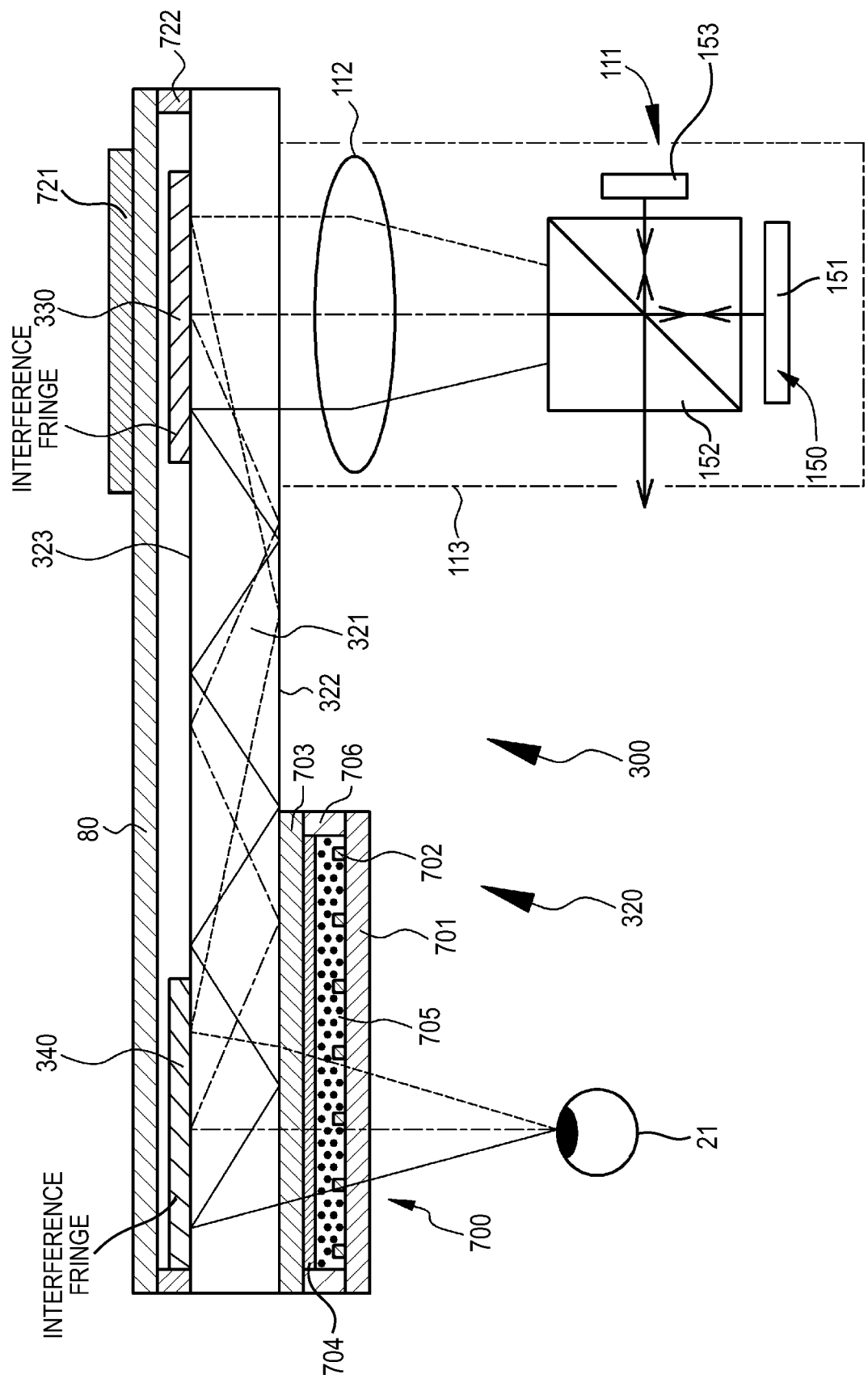
FIG. 42 is a conceptual diagram illustrating an image display device in another modification of the display apparatus according to Example 3.

FIG. 42 is a conceptual diagram illustrating a modification of the image display device in the display apparatus according to Example 3. As shown in FIG. 42, a protective substrate 720 is formed to have a length equal to that of a light guide plate 321 and the protective substrate 720 is fixed to the light guide plate 321 by a sealing member 722. The sealing member 722 may be arranged at the outer edge of the protective substrate 720. In addition, a light shielding member 721 which prevents a reduction in light use efficiency due to the leakage of light to the outside of the light guide plate 321 is formed on a surface of the protective substrate 720 which does not face a first diffraction grating member 330. A light control device 700 is provided between the light guide plate 321 and the observer.

Figure 43:
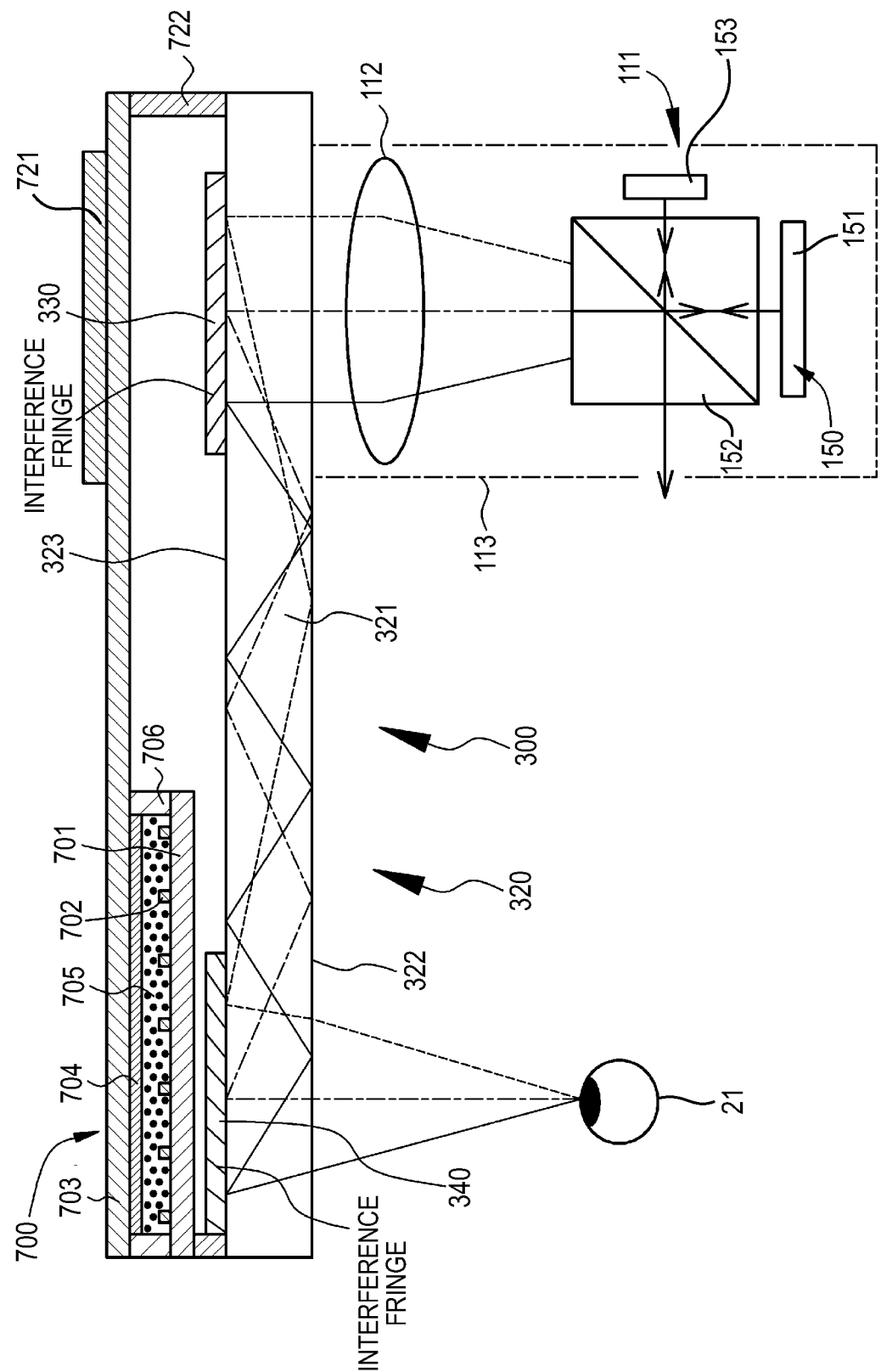
FIG. 43 is a conceptual diagram illustrating an image display device in still another modification of the display apparatus according to Example 3.

FIG. 43 is a conceptual diagram illustrating a modification of the image display device in the display apparatus according to Example 3. As shown in FIG. 43, for example, a second substrate 703 of a light guide device 700 is formed to have a length equal to that of a light guide plate 321 and the second substrate 703 of the light guide device 700 is fixed to a light guide plate 321 by a sealing member 722. The sealing member 722 may be arranged at the outer edge of the second substrate 703. In addition, a light shielding member 721 which prevents a reduction in light use efficiency due to the leakage of light to the outside of the light guide plate 321 is formed on a surface of the second substrate 703 which does not face a first diffraction grating member 330.

Figure 44:
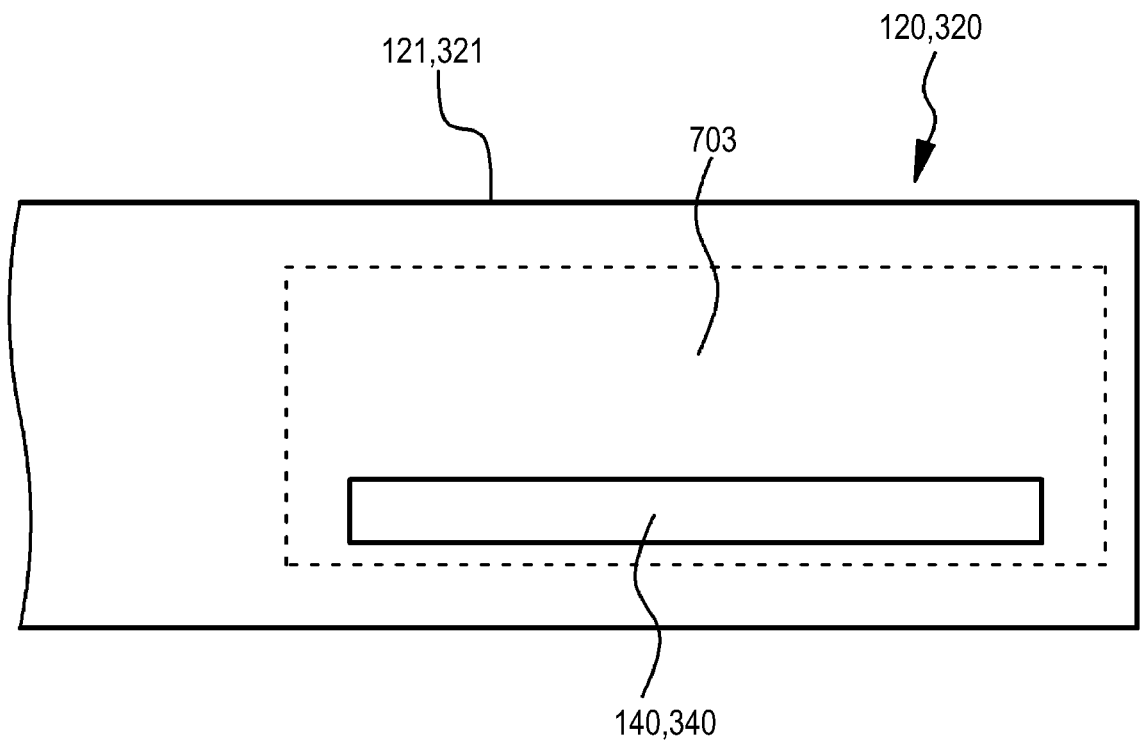
FIG. 44 is a schematic diagram illustrating an optical device and a light control device in yet another modification of the display apparatus according to Example 1 or 3, as viewed from the front side.
Figure 45:
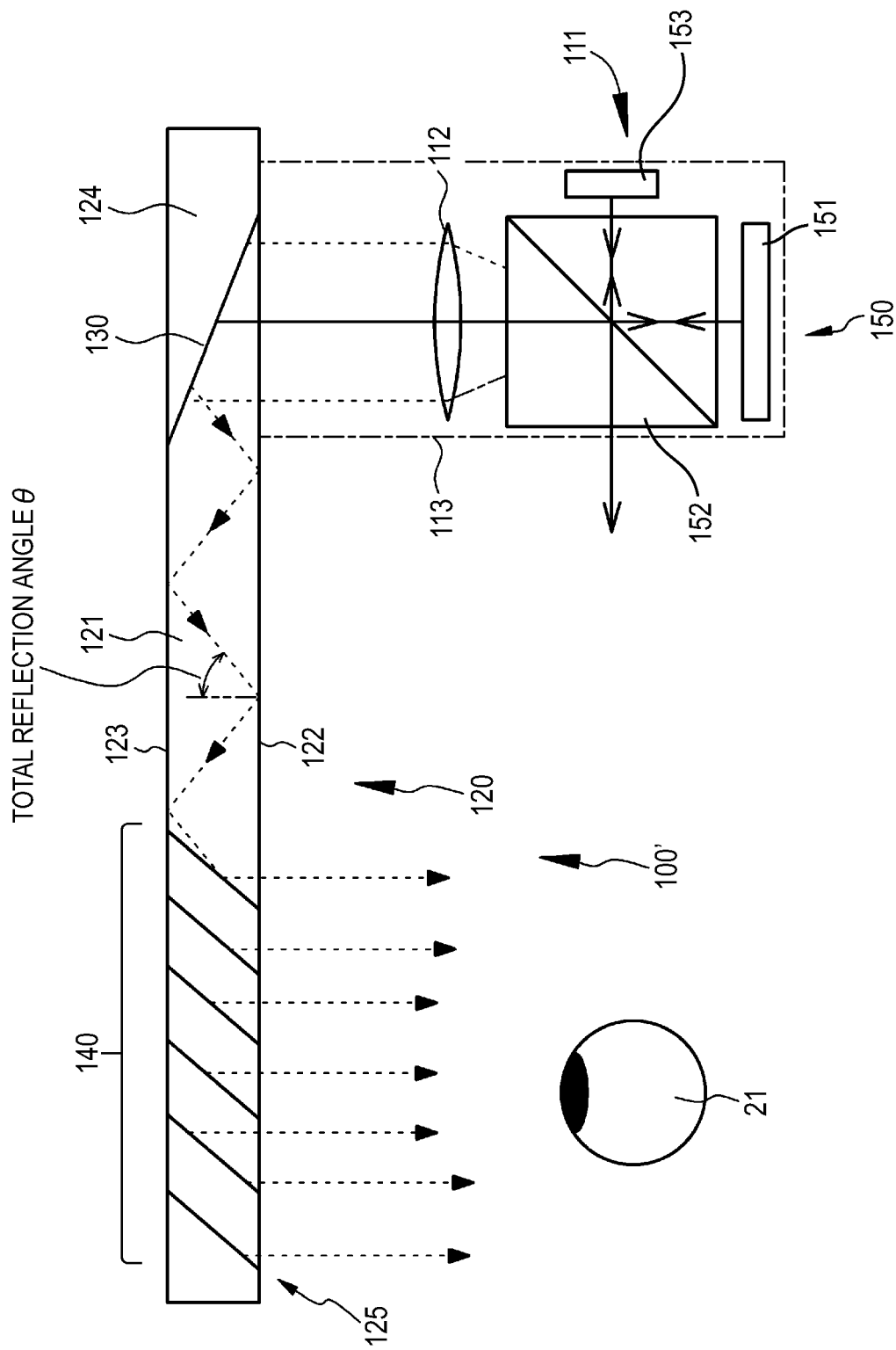
FIG. 45 is a conceptual diagram illustrating an image display device in a display apparatus according to the related art.

FIG. 44 is a schematic diagram illustrating the optical device and the light control device in the display apparatus according to Example 1 or 3, as viewed from the front side. As shown in FIG. 44, for example, the light control device 700 may be provided in the projection image of the second deflection unit 140 or 340. For example, an explanation or closed caption related to a video that is synchronized with the video, various explanations for an observation target in a play or Kabuki, a Noh play, a Kyogen play, an opera, a music concert, a ballet, various theatrical performances, an amusement park, an art museum, a tourist site, a resort, a tour guide, and the like, and explanations for the content, the state of progress, the background, and the like thereof may be displayed in the optical device 120 or 320 facing the light control device 700.

The present disclosure may be implemented as the following configurations.

[1]<<Display Apparatus: First Embodiment of the Present Disclosure>>

A display apparatus including: (i) a glasses-type frame that is mounted on the head of an observer; and (ii) an image display device that is attached to the frame. The image display device includes: (A) an image forming device; and (B) an optical device on which light emitted from the image forming device is incident, in which the light is guided, and from which the light is emitted. A light control device that adjusts the amount of external light incident from the outside is provided in a region of the optical device from which light is emitted. The light control device includes: two opposite transparent substrates; electrodes that are provided on the substrates; and an electrophoretic dispersion liquid that is sealed between the two substrates.

[2] The display apparatus according to [1], which further includes an illuminance sensor (environmental illuminance measuring sensor) that measures the illuminance of an environment in which the display apparatus is located. The transmittance of the light control device may be controlled on the basis of the measurement result of the illuminance sensor (environmental illuminance measuring sensor).

[3] The display apparatus according to [1] or [2], which further includes an illuminance sensor (environmental illuminance measuring sensor) that measures the illuminance of an environment in which the display apparatus is located. The brightness of an image formed by the image forming device is controlled on the basis of the measurement result of the illuminance sensor (environmental illuminance measuring sensor).

[4] The display apparatus according to any one of [1] to [3], which further includes a second illuminance sensor (transmitted light illuminance measuring sensor) that measures illuminance on the basis of light which passes through the light control device from an external environment. The transmittance of the light control device is controlled on the basis of the measurement result of the second illuminance sensor (transmitted light illuminance measuring sensor).

[5] The display apparatus according to any one of [1] to [4], which further includes a second illuminance sensor (transmitted light illuminance measuring sensor) that measures illuminance on the basis of light which passes through the light control device from an external environment. The brightness of the image formed by the image forming device is controlled on the basis of the measurement result of the second illuminance sensor (transmitted light illuminance measuring sensor).

[6] The display apparatus according to [4] or [5], wherein the second illuminance sensor (transmitted light illuminance measuring sensor) is arranged closer to the observer than the optical device.

[7]<<Display Apparatus: Second Embodiment of the Present Disclosure>>

A display apparatus including: (i) a glasses-type frame that is mounted on the head of an observer; and (ii) an image display device that is attached to the frame. The image display device includes: (A) an image forming device; and (B) an optical device on which light emitted from the image forming device is incident, in which the light is guided, and from which the light is emitted. A light control device that adjusts the amount of external light incident from the outside is provided in a region of the optical device from which light is emitted. The display apparatus further includes an illuminance sensor (environmental illuminance measuring sensor) that measures the illuminance of an environment in which the display apparatus is located. The transmittance of the light control device is controlled on the basis of the measurement result of the illuminance sensor (environmental illuminance measuring sensor).

[8]<<Display Apparatus: Third Embodiment of the Present Disclosure>>

A display apparatus including: (i) a glasses-type frame that is mounted on the head of an observer; and (ii) an image display device that is attached to the frame. The image display device includes: (A) an image forming device; and (B) an optical device on which light emitted from the image forming device is incident, in which the light is guided, and from which the light is emitted. A light control device that adjusts the amount of external light incident from the outside is provided in a region of the optical device from which light is emitted. The display apparatus further includes an illuminance sensor (environmental illuminance measuring sensor) that measures the illuminance of an environment in which the display apparatus is located. The brightness of an image formed by the image forming device is controlled on the basis of the measurement result of the illuminance sensor (environmental illuminance measuring sensor).

[9]<<Display Apparatus: Fourth Embodiment of the Present Disclosure>>

A display apparatus including: (i) a glasses-type frame that is mounted on the head of an observer; and (ii) an image display device that is attached to the frame. The image display device includes: (A) an image forming device; and (B) an optical device on which light emitted from the image forming device is incident, in which the light is guided, and from which the light is emitted. A light control device that adjusts the amount of external light incident from the outside is provided in a region of the optical device from which light is emitted. The display apparatus further includes an illuminance sensor (transmitted light illuminance measuring sensor) that measures illuminance on the basis of light which passes through the light control device from an external environment. The transmittance of the light control device is controlled on the basis of the measurement result of the illuminance sensor (transmitted light illuminance measuring sensor).

[10]<<Display Apparatus: Fifth Embodiment of the Present Disclosure>>

A display apparatus including: (i) a glasses-type frame that is mounted on the head of an observer; and (ii) an image display device that is attached to the frame. The image display device includes: (A) an image forming device; and (B) an optical device on which light emitted from the image forming device is incident, in which the light is guided, and from which the light is emitted. A light control device that adjusts the amount of external light incident from the outside is provided in a region of the optical device from which light is emitted. The display apparatus further includes an illuminance sensor (transmitted light illuminance measuring sensor) that measures illuminance on the basis of light which passes through the light control device from an external environment. The brightness of an image formed by the image forming device is controlled on the basis of the measurement result of the illuminance sensor (transmitted light illuminance measuring sensor).

[11] The display apparatus according to [9] or [10], wherein the illuminance sensor (transmitted light illuminance measuring sensor) is arranged closer to the observer than the optical device.

[12] The display apparatus according to any one of [1] to [11], wherein the maximum transmittance of the light control device is equal to or greater than 50% and the minimum transmittance of the light control device is equal to or less than 30%.

[13] The display apparatus according to any one of [2], [3], [7], and [8], wherein when the measurement result of the illuminance sensor (environmental illuminance measuring sensor) is equal to or greater than a predetermined value, the transmittance of the light control device is equal to or less than a predetermined value.

[14] The display apparatus according to any one of [4], [5], [6], [9], [10], and [11], wherein when the measurement result of the illuminance sensor (transmitted light illuminance measuring sensor) is equal to or greater than a predetermined value, the transmittance of the light control device is equal to or less than a predetermined value.

[15] The display apparatus according to any one of [2], [3], [7], and [8], wherein when the measurement result of the illuminance sensor (transmitted light illuminance measuring sensor) is equal to or less than a predetermined value, the transmittance of the light control device is equal to or greater than a predetermined value.

[16] The display apparatus according to any one of [4], [5], [6], [9], [10], and [11], wherein when the measurement result of the illuminance sensor (transmitted light illuminance measuring sensor) is equal to or less than a predetermined value, the transmittance of the light control device is equal to or greater than a predetermined value.

[17] The display apparatus according to any one of [1] to [14], wherein the light control device imparts a desired color to the light passing through the light control device.

[18] The display apparatus according to [17], wherein the color imparted by the light control device is variable.

[19] The display apparatus according to [17], wherein the color imparted by the light control device is fixed.

[20] The display apparatus according to any one of [1] to [19], wherein the light control device is removably provided in the region of the optical device from which light is emitted.

[21] The display apparatus according to any one of [1] to [20], wherein the optical device includes: (a) a light guide plate in which incident light propagates while being totally reflected and from which the light is emitted; (b) a first deflection unit that deflects the light incident on the light guide plate so as to be totally reflected in the light guide plate; and (c) a second deflection unit that deflects the light, which propagates in the light guide plate while being totally reflected, a plurality of times so as to be emitted from the light guide plate.

[22] The display apparatus according to [21], wherein the second deflection unit is disposed in a projection image of the light control device.

[23] The display apparatus according to [22], wherein the second deflection unit is covered with one of the two substrates forming the light control device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A display apparatus comprising:
a glasses-type frame; and
an image display device attached to the frame,
wherein the image display device includes
an image forming device, and
an optical device,
wherein a light control device adjusts an amount of external light incident from outside the optical device, wherein the light control device is provided in a region of the optical device from which light is emitted,
wherein the light control device includes:
a first transparent substrate and a second transparent substrate, the first transparent substrate opposite the second transparent substrate,
a first transparent electrode and a second transparent electrode provided on the first transparent substrate and the second transparent substrate, respectively, wherein the first transparent electrode is patterned in a shape and the second transparent electrode is not patterned in the shape, and
an electrophoretic dispersion liquid sealed between the first transparent substrate and the second transparent substrate, wherein the electrophoretic dispersion liquid comprises a plurality of electrophoretic particles and a dispersion medium, wherein a color of the electrophoretic particles is different from a color of the dispersion medium, and
wherein the optical device includes
a light guide plate in which light emitted from the image forming device propagates while being totally reflected, wherein the light guide plate and the first transparent substrate are of substantially equal lengths,
wherein the light is guided by the light guide plate, and
wherein the light is emitted from the optical device;
a first deflection section that deflects light incident on the light guide plate, wherein the first deflection section is one of a light reflecting film and a diffraction grating; and
a second deflection section that deflects the light which propagates in the light guide plate while being totally reflected, wherein the second deflection section is covered with one or both of the first transparent substrate and the second transparent substrate.

2. The display apparatus according to claim 1, further comprising:
an illuminance sensor, wherein the illuminance sensor measures an illuminance of an environment in which the display apparatus is located,
wherein a transmittance of the light control device is controlled based on a measurement result of the illuminance sensor.

3. The display apparatus according to claim 2,
wherein, when the measurement result of the illuminance sensor is equal to or greater than a first predetermined value, the transmittance of the light control device is equal to or less than a second predetermined value different from the first predetermined value.

4. The display apparatus according to claim 2,
wherein, when the measurement result of the illuminance sensor is equal to or less than a first predetermined value, the transmittance of the light control device is equal to or greater than a second predetermined value different from the first predetermined value.

5. The display apparatus according to claim 1, further comprising:
an illuminance sensor, wherein the illuminance sensor measures an illuminance of an environment in which the display apparatus is located,
wherein a brightness of an image formed by the image forming device is controlled based on a measurement result of the illuminance sensor.

6. The display apparatus according to claim 1, further comprising:
an illuminance sensor, wherein the illuminance sensor measures illuminance of light passing through the light control device from an external environment,
wherein a transmittance of the light control device is controlled based on a measurement result of the illuminance sensor.

7. The display apparatus according to claim 6,
wherein the illuminance sensor is arranged closer to an observer than the optical device.

8. The display apparatus according to claim 1, further comprising:
an illuminance sensor, wherein the illuminance sensor measures illuminance of light passing through the light control device from an external environment,
wherein a brightness of an image formed by the image forming device is controlled based on a measurement result of the illuminance sensor.

9. The display apparatus according to claim 1,
wherein a maximum transmittance of the light control device is equal to or greater than 50% and a minimum transmittance of the light control device is equal to or less than 30%.

10. The display apparatus according to claim 1,
wherein the light control device imparts a desired color to light passing through the light control device.

11. The display apparatus according to claim 10, wherein the color imparted by the light control device is variable.

12. The display apparatus according to claim 10, wherein the color imparted by the light control device is fixed.

13. The display apparatus according to claim 1,
wherein the light control device is removably provided in the region of the optical device from which light is emitted.

14. The display apparatus according to claim 1, wherein the first deflection section is a light reflecting film.

15. The display apparatus according to claim 1, wherein the first deflection section is a diffraction grating.

16. A display apparatus comprising:
a glasses-type frame;
an image display device that is attached to the frame; and
an illuminance sensor that measures an illuminance of an environment in which the display apparatus is located,
wherein the image display device includes
an image forming device, and
an optical device,
wherein a light control device adjusts an amount of external light incident from outside the optical device, wherein the light control device is provided in a region of the optical device from which light is emitted,
wherein the light control device includes
a first transparent substrate and a second transparent substrate, the first transparent substrate opposite the second transparent substrate, a first transparent electrode and a second transparent electrode provided on the first transparent substrate and the second transparent substrate, respectively, wherein the first transparent electrode is patterned in a shape and the second transparent electrode is not patterned in the shape, and an electrophoretic dispersion liquid sealed between the first transparent substrate and the second transparent substrate, wherein the electrophoretic dispersion liquid comprises a plurality of electrophoretic particles and a dispersion medium, wherein a color of the electrophoretic particles is different from a color of the dispersion medium, wherein a transmittance of the light control device is controlled based on a measurement result of the illuminance sensor, and wherein the optical device includes a light guide plate in which light emitted from the image forming device propagates while being totally reflected, wherein the light guide plate and the first transparent substrate are of substantially equal lengths, wherein the light guide plate and the first transparent substrate are of substantially equal lengths, wherein the light is guided by the light guide plate, and wherein the light is emitted from the optical device;

a sealing member arranged along edges of the first transparent substrate and the light guide plate and at an edge of the first transparent substrate, wherein the sealing member separates the first transparent substrate and the light guide plate by a gap;

a first deflection section that deflects light incident on the light guide plate, wherein the first deflection section is one of a light reflecting film and a diffraction grating; and a second deflection section that deflects the light which propagates in the light guide plate while being totally reflected, wherein the second deflection section is covered with one or both of the first transparent substrate and the second transparent substrate.

17. A display apparatus comprising:
a glasses-type frame;
an image display device that is attached to the frame; and
an illuminance sensor that measures an illuminance of an environment in which the display apparatus is located,
wherein the image display device includes
an image forming device, and
an optical device,
wherein a light control device adjusts an amount of external light incident from outside the optical device, wherein the light control device is provided in a region of the optical device from which light is emitted,
wherein the light control device includes
a first transparent substrate and a second transparent substrate, the first transparent substrate opposite the second transparent substrate,
a first transparent electrode and a second transparent electrode provided on the first transparent substrate and the second transparent substrate, respectively, wherein the first transparent electrode is patterned in a shape and the second transparent electrode is not patterned in the shape, and
an electrophoretic dispersion liquid sealed between the first transparent substrate and the second transparent substrate, wherein the electrophoretic dispersion liquid comprises a plurality of electrophoretic particles and a dispersion medium, wherein a color of the electrophoretic particles is different from a color of the dispersion medium, wherein a brightness of an image formed by the image forming device is controlled based on a measurement result of the illuminance sensor, and
wherein the optical device includes
a light guide plate in which light emitted from the image forming device propagates while being totally reflected, wherein the light guide plate and the first transparent substrate are of substantially equal lengths, wherein the light is guided by the light guide plate, and wherein the light is emitted from the optical device;
a sealing member arranged along edges of the first transparent substrate and the light guide plate, wherein the sealing member separates the first transparent substrate and the light guide plate by a gap;
a first deflection section that deflects light incident on the light guide plate, wherein the first deflection section is one of a light reflecting film and a diffraction grating; and
a second deflection section that deflects the light which propagates in the light guide plate while being totally reflected, wherein the second deflection section is covered with one or both of the first transparent substrate and the second transparent substrate.

18. A display apparatus comprising:
a glasses-type frame;
an image display device that is attached to the frame; and
an illuminance sensor,
wherein the image display device includes
an image forming device, and
an optical device,
wherein a light control device adjusts an amount of external light incident from outside the optical device, wherein the light control device is provided in a region of the optical device from which light is emitted,
wherein the light control device includes
a first transparent substrate and a second transparent substrate, the first transparent substrate opposite the second transparent substrate,
a first transparent electrode and a second transparent electrode provided on the first transparent substrate and the second transparent substrate, respectively, wherein the first transparent electrode is patterned in a shape and the second transparent electrode is not patterned in the shape, and
an electrophoretic dispersion liquid sealed between the first transparent substrate and the second transparent substrate, wherein the electrophoretic dispersion liquid comprises a plurality of electrophoretic particles and a dispersion medium, wherein a color of the electrophoretic particles is different from a color of the dispersion medium,
wherein the illuminance sensor measures illuminance based on light which passes through the light control device from an external environment,
wherein a transmittance of the light control device is controlled based on a measurement result of the illuminance sensor, and
wherein the optical device includes
a light guide plate in which light emitted from the image forming device propagates while being totally reflected, wherein the light guide plate and the first transparent substrate are of substantially equal lengths, wherein the light is guided by the light guide plate, and wherein the light is emitted from the optical device;

a sealing member arranged along edges of the first transparent substrate and the light guide plate, wherein the sealing member separates the first transparent substrate and the light guide plate by a gap;

a first deflection section that deflects light incident on the light guide plate, wherein the first deflection section is one of a light reflecting film and a diffraction grating; and a second deflection section that deflects the light which propagates in the light guide plate while being totally reflected, wherein the second deflection section is covered with one or both of the first transparent substrate and the second transparent substrate included in the light control device.

19. A display apparatus comprising:

a glasses-type frame;

an image display device that is attached to the frame; and an illuminance sensor, wherein the image display device includes
an image forming device, and
an optical device,
wherein a light control device adjusts an amount of external light incident from outside the optical device, wherein the light control device is provided in a region of the optical device from which light is emitted, and wherein the illuminance sensor measures illuminance based on light which passes through the light control device from an external environment,
wherein the light control device includes
a first transparent substrate and a second transparent substrate, the first transparent substrate opposite the second transparent substrate,
a first transparent electrode and a second transparent electrode provided on the first transparent substrate and the second transparent substrate, respectively, wherein the first transparent electrode is patterned in a shape and the second transparent electrode is not patterned in the shape, and
an electrophoretic dispersion liquid sealed between the first transparent substrate and the second transparent substrate, wherein the electrophoretic dispersion liquid comprises a plurality of electrophoretic particles and a dispersion medium, wherein a color of the electrophoretic particles is different from a color of the dispersion medium, wherein a brightness of an image formed by the image forming device is controlled based on a measurement result of the illuminance sensor, and wherein the optical device includes a light guide plate in which light emitted from the image forming device propagates while being totally reflected, wherein the light guide plate and the first transparent substrate are of substantially equal lengths, wherein the light is guided by the light guide plate, and wherein the light is emitted from the optical device;

a sealing member arranged along edges of the first transparent substrate and the light guide plate, wherein the sealing member separates the first transparent substrate and the light guide plate by a gap;

a first deflection section that deflects light incident on the light guide plate, wherein the first deflection section is one of a light reflecting film and a diffraction grating; and a second deflection section that deflects the light which propagates in the light guide plate while being totally reflected, wherein the second deflection section is covered with one or both of the first transparent substrate and the second transparent substrate included in the light control device.

20. The display apparatus according to claim 19, wherein the first deflection section is a light reflecting film.

* * * * *